(12) United States Patent
Kamon et al.

(10) Patent No.: US 8,799,979 B2
(45) Date of Patent: Aug. 5, 2014

(54) ELECTRONIC APPARATUS AND METHOD FOR TURNING OFF FIREWALL OF ELECTRONIC APPARATUS

(75) Inventors: Hidekazu Kamon, Kanagawa (JP); Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 400 days.

(21) Appl. No.: 12/733,919

(22) PCT Filed: Sep. 29, 2008

(86) PCT No.: PCT/JP2008/067606
§ 371 (c)(1),
(2), (4) Date: Mar. 25, 2010

(87) PCT Pub. No.: WO2009/044691
PCT Pub. Date: Apr. 9, 2009

(65) Prior Publication Data
US 2010/0251326 A1    Sep. 30, 2010

(30) Foreign Application Priority Data
Oct. 5, 2007 (JP) ................................. 2007-261615

(51) Int. Cl.
*H04N 7/173* (2011.01)
*H04N 7/20* (2006.01)
*H04N 7/16* (2011.01)

(52) U.S. Cl.
USPC .......................................... 725/133; 725/147

(58) Field of Classification Search
None
See application file for complete search history.

(56) References Cited

U.S. PATENT DOCUMENTS

| 7,225,282 B1 | 5/2007 | Lyle |
| 7,254,832 B1 * | 8/2007 | Christie, IV ................... 726/11 |
| 7,394,499 B2 | 7/2008 | Okamoto et al. |
| 2002/0026503 A1 * | 2/2002 | Bendinelli et al. ............ 709/220 |
| 2008/0120675 A1 * | 5/2008 | Morad et al. .................. 725/120 |

FOREIGN PATENT DOCUMENTS

| WO | WO-02/078336 A1 | 10/2002 |
| WO | WO-2007/007546 A1 | 1/2007 |

OTHER PUBLICATIONS

"PC to TV Yugo no Deep Impact", ASCII, vol. 30, No. 4, Apr. 1, 2006, p. 84.
Supplementary European Search Report EP 08835355, dated Mar. 28, 2012.

* cited by examiner

*Primary Examiner* — Brian T Pendleton
*Assistant Examiner* — Jean D Saint Cyr
(74) *Attorney, Agent, or Firm* — Lerner, David, Littenberg, Krumholz & Mentlik, LLP

(57) ABSTRACT

[Object] To increase the usability for users without decreasing the security level.
[Solving Means] A personal computer (PC) 10 is connected to a television receiver (TV) 30 using an HDMI cable 1. When a video signal is transmitted from the PC 10 to the TV 30, a TMDS channel in the HDMI cable 1 is used. A high-speed data line that performs bi-directional communication using predetermined lines of the HDMI cable 1 (e.g., a reserve line and an HPD line) is provided. In PC 10, a firewall is set. When, for example, being connected to the PC 10, the TV 30 transmits a firewall turn-off command to the PC 10. Alternatively, when, for example, performing data transmission using the high-speed data line provided between the TV 30 and the PC 10, the TV 30 transmits a firewall turn-off command to the PC 10. The security level and connectivity can be maintained without troublesome setting performed by the user and, therefore, the usability for users can be increased.

17 Claims, 26 Drawing Sheets

FIG. 8

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved (N.C. on device) |
| 16 | SDA |
| 18 | +5V Power |

FIG. 16

| Byte# | 7 | 6 | 5 | 4 | 3 | 2 | 1 | 0 |
|---|---|---|---|---|---|---|---|---|
| 0 | Vendor-specific tag code (=3) | | | | | Length (=N) | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | Reserved (0) | DVI-Dual |
| 7 | Max_TMDS_Clock | | | | | | | |
| 8 | Latency | | Full Duplex | Half Duplex | Reserved (0) | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...N | Reserved (0) | | | | | | | |

ELECTRONIC APPARATUS AND METHOD FOR TURNING OFF FIREWALL OF ELECTRONIC APPARATUS

CROSS-REFERENCES TO RELATED APPLICATIONS

The present application is a national phase entry under 35 U.S.C. §371 of International Application No. PCT/JP2008/067606 filed Sep. 29, 2008, published on Apr. 9, 2009 as WO 2009/044691 A1, which claims priority from Japanese Patent Application No. JP 2007-261615 filed in the Japanese Patent Office on Oct. 5, 2007.

TECHNICAL FIELD

The present invention relates to an electronic apparatus and a method for turning off a firewall of the electronic apparatus.

In particular, the present invention relates to an electronic apparatus including a communication unit that performs bi-directional communication using a predetermined line of a transmission paths for receiving a baseband video signal from an external apparatus and a command transmitting unit that transmits a command for turning off a firewall against the communication unit to the external apparatus in order to maintain connection between the electronic apparatus and the external apparatus without degrading the security level of the external apparatus and increase the operability of a user.

Furthermore, the present invention relates to an electronic apparatus that includes a communication unit that performs bi-directional communication using a predetermined line of a transmission paths for receiving a baseband video signal from an external apparatus and that maintains connection between the electronic apparatus and the external apparatus without degrading the security level of the external apparatus and increases the operability of a user by turning off a firewall against the external apparatus when receiving a firewall turn-off command from the external apparatus and completing a turn-off mode of the firewall against the external apparatus when receiving a firewall turn-off completion command from the external apparatus.

BACKGROUND ART

In some cases, for example, an electronic apparatus, such as a television receiver, is connected to a personal computer. In general, when data is exchanged at high speed between a personal computer and a television receiver through Ether connection, the connectivity is significantly degraded due to a firewall set in the personal computer for a security purpose and, therefore, the high-speed data transfer is often disrupted.

However, if the entire firewall is turned off in order to maintain the connectivity, there may be a risk that the security level of the personal computer is significantly decreased.

Alternatively, in order to solve these problems, a skilled and experienced operator needs to perform the following troublesome operation. That is, when data is transferred, the operator manually turns off an optimal and minimal firewall. After the data is transferred at high speed while maintaining the security, the operator completes the turning off of the firewall. However, this method is not user-friendly and, therefore, general users cannot easily use this method.

In recent years, for example, the HDMI (High Definition Multimedia Interface) has been in widespread use as a communication interface used for transmitting a digital video signal, that is, non-compression (baseband) video signal and a digital audio signal associated with the video signal from, for example, a personal computer, a DVD (Digital Versatile Disc) recorder, a settop box, or another AV source (Audio Visual source) to a television receiver, a projector, or another display. For example, Patent Document 1 describes the detailed specification of the HDMI standard.

Patent Document 1: WO2002/078336

DISCLOSURE OF INVENTION

Problems to be Solved by the Invention

As noted above, for example, in an AV system in which an electronic apparatus, such as a television receiver, is connected to a personal computer, when data is exchanged between the personal computer and the television receiver using Ether connection at high speed, the connectivity is frequently and significantly degraded due to a firewall set in the personal computer and, therefore, the high-speed data transfer is often disrupted.

It is an object of the present invention to maintain connectivity without degrading the security and increase the operability of a user.

Means for Solving the Problems

According to an aspect of the present invention, an electronic apparatus is provided. The electronic apparatus is characterized by a signal receiving unit configured to receive a video signal from an external apparatus via a transmission path using a plurality of channels and a differential signal, a communication unit configured to perform bi-directional communication using predetermined lines forming the transmission path, and a command transmitting unit configured to transmit, to the external apparatus, a firewall turn-off command for requesting turning off of a firewall against the communication unit.

According to the present invention, in addition to the signal receiving unit configured to receive a video signal via a transmission path using a plurality of channels and a differential signal, the communication unit configured to perform bi-directional communication using predetermined lines forming the transmission path is provided. The communication unit performs data transmission with the external apparatus. For example, the predetermined lines are a reserve line and an HPD line forming an HDMI cable.

The command transmitting unit configured to transmit, to the external apparatus, a firewall turn-off command for requesting turning off of a firewall against the communication unit is provided. For example, the firewall turn-off command is transmitted using a control data line of the transmission path.

According to the present invention, for example, the electronic apparatus may include a connection detecting unit configured to detect that the electronic apparatus is connected to the external apparatus via the transmission path. When the connection detecting unit detects that the electronic apparatus is connected to the external apparatus, the command transmitting unit may transmit the firewall turn-off command to the external apparatus. In this case, when the electronic apparatus is connected to the external apparatus via a transmission path, a firewall of the external apparatus against the communication unit is turned off and, therefore, the connectivity can be maintained. Thus, data transmission can be performed using the communication unit.

In addition, according to the present invention, for example, when a power-off operation is performed, the command transmitting unit may transmit, to the external apparatus, a firewall turn-off completion command for requesting completion of turning off of the firewall against the communication unit. In this case, the external apparatus cancels the turning off of the firewall against the communication unit and, therefore, the security level can be maintained.

In addition, according to the present invention, the command transmitting unit may transmit the firewall turn-off command to the external apparatus when the electronic apparatus performs data transmission using the communication unit, and the command transmitting unit may transmit, to the external apparatus, a firewall turn-off completion command for requesting completion of turning off of the firewall against the communication unit when the data transmission is completed. In this case, when the electronic apparatus performs data transmission using the communication unit, the firewall of the external apparatus against the communication unit is turned off and, therefore, the connectivity can be maintained. Thus, the communication unit can perform data transmission with the external apparatus.

According to another aspect of the present invention, an electronic apparatus is provided. The electronic apparatus is characterized by including a signal transmitting unit configured to transmit a video signal to an external apparatus via a transmission path using a plurality of channels and a differential signal, a communication unit configured to perform bi-directional communication using predetermined lines forming the transmission path, a firewall setting unit for setting up a firewall, and a command receiving unit configured to receive a command from the external apparatus. The firewall setting unit turns off the firewall against the external apparatus when a firewall turn-off command is received by the command receiving unit, and the firewall setting unit cancels the turning off of the firewall against the external apparatus when a firewall turn-off completion command is received by the command receiving unit.

According to the invention, the electronic apparatus further includes the communication unit configured to perform bi-directional communication using predetermined lines forming the transmission path in addition to the signal transmitting unit configured to transmit a video signal to an external apparatus via a transmission path using a plurality of channels and a differential signal. For example, the predetermined lines are a reserve line and an HPD line forming an HDMI cable.

The communication unit allows data transmission with the external apparatus. When a firewall turn-off command is received, a firewall against the external apparatus is turned off. In addition, when a firewall turn-off completion command is received, turning off of firewall against the external apparatus is canceled.

In this case, the firewall against the external apparatus is turned off from when the firewall turn-off command is received to when the firewall turn-off completion command is received. Accordingly, the connectivity is maintained and, therefore, data transmission between the communication unit and the external apparatus can be performed.

According to the invention, for example, the electronic apparatus may further include a connection detecting unit configured to detect whether the external apparatus is connected to the electronic apparatus via the transmission path. When the firewall is turned off for the external apparatus and if the firewall setting unit detects that the external apparatus is not connected to the electronic apparatus, the firewall setting unit may cancel the turning off of the firewall against the external apparatus. In this case, when the firewall is turned off for the external apparatus and if the external apparatus is disconnected from the electronic apparatus without a completion operation of completing the turning off of the firewall, the turning off of the firewall against the external apparatus is automatically canceled.

Advantageous Effects

According to the present invention, an electronic apparatus is provided. The electronic apparatus includes a communication unit that performs bi-directional communication using predetermined lines forming the transmission path for receiving a baseband video signal from an external apparatus. The electronic apparatus further includes a command transmitting unit that transmits, to the external apparatus, a firewall turn-off command for requesting turning off of a firewall against the communication unit. Accordingly, the connectivity with an external apparatus can be maintained without decreasing the security level of the external apparatus, and the usability for users can be increased.

Furthermore, according to the present invention, an electronic apparatus is provided. The electronic apparatus includes a communication unit that performs bi-directional communication using predetermined lines forming the transmission path for transmitting a baseband video signal to an external apparatus. Upon receiving a firewall turn-off command from the external apparatus, the electronic apparatus turns off a firewall against the external apparatus. Upon receiving a firewall turn-off completion command from the external apparatus, the electronic apparatus cancels the turning off of a firewall against the external apparatus. Accordingly, the connectivity with an external apparatus can be maintained without decreasing the security level, and the usability for users can be increased.

BRIEF DESCRIPTION OF DRAWINGS

FIG. 8 illustrates the pin assignment (Type A) of the HDMI terminal.

FIG. 16 illustrates the structure of an E-EDID Vendor Specific Data Block.

EXPLANATION OF REFERENCE NUMERALS

1 HDMI cable, 5 AV system, 10 personal computer, 11 HDMI terminal, 12 HDMI transmitter, 12A high-speed data line interface, 13 CPU, 22 Ethernet interface, 30 television receiver, 31 HDMI terminal, 32 HDMI receiver, 32A high-speed data line interface, 42 display panel, 51 CPU, 54 Ethernet interface

BEST MODES FOR CARRYING OUT THE INVENTION

Figure 1:
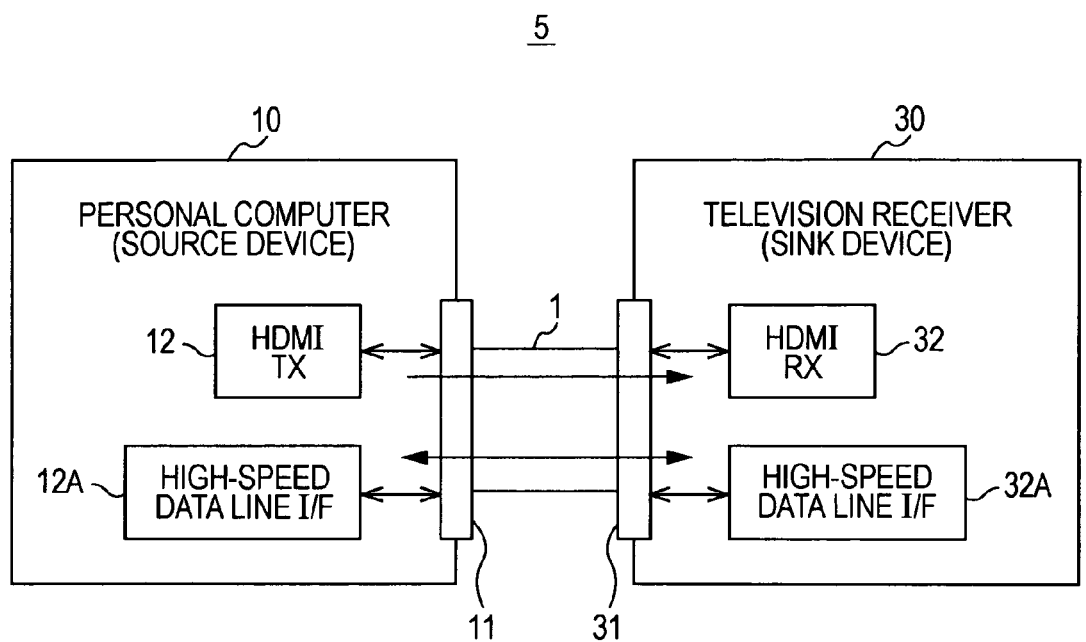
FIG. 1 is a block diagram illustrating an exemplary configuration of an AV system according to an embodiment of the present embodiment.

Embodiments of the present invention are described with reference to the accompanying drawings. FIG. 1 illustrates an exemplary configuration of an AV (Audio Visual) system 5 according to an embodiment of the present invention.

The AV system 5 includes a personal computer (PC) 10 serving as a source device and a television receiver (TV) 30 serving as a sink device. The television receiver 30 is connected to the personal computer 10 via an HDMI cable 1.

The personal computer 10 includes an HDMI terminal 11 having an HDMI transmitter (HDMI TX) 12 and a high-speed data line interface 12A connected thereto. The television receiver 30 includes an HDMI terminal 31 having an HDMI receiver (HDMI RX) 32 and a high-speed data line interface 32A connected thereto. One end of the HDMI cable 1 is connected to the HDMI terminal 11 of the personal computer 10, while the other end of the HDMI cable 1 is connected to the HDMI terminal 31 of the television receiver 30.

In the AV system 5 shown in FIG. 1, the personal computer 10 can transmit a baseband video signal to the television receiver 30 using a TMDS (Transition Minimized Differential Signaling) channel of the HDMI. In such a case, the baseband video signal is supplied from the HDMI transmitter 12 of the personal computer 10 to the HDMI receiver 32 of the television receiver 30 via the HDMI cable 1.

In addition, in the AV system 5 shown in FIG. 1, data can be exchanged between the personal computer 10 and the television receiver 30 via a high-speed data line using an Ether IP packet. In such a case, data is exchanged between the high-speed data line interface 12A of the personal computer 10 and the high-speed data line interface 32A of the television receiver 30 via the HDMI cable 1.

Note that, as noted above, although a firewall is set in the personal computer 10, the firewall can be turned off for the television receiver 30 connected thereto via the HDMI cable 30 as needed. Thus, data can be exchanged using the high-speed data line. The sequence of turning off of the firewall is described in more detail below.

Figure 2:
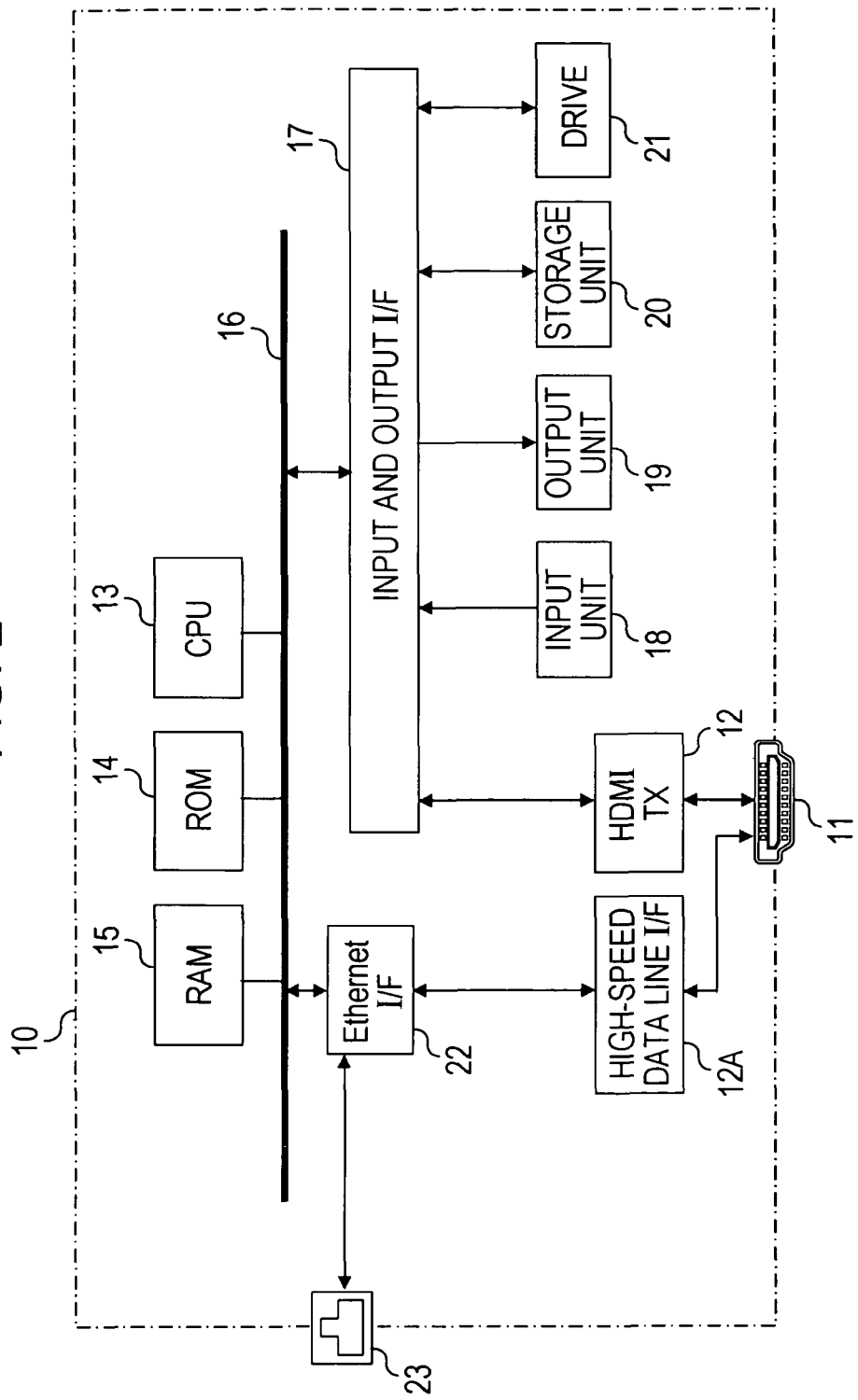
FIG. 2 is a block diagram illustrating an exemplary configuration of a personal computer (a source device) of the AV system.

FIG. 2 illustrates an exemplary configuration of the personal computer 10.

The personal computer 10 includes the HDMI terminal 11, the HDMI transmitter 12, the high-speed data line interface 12A, a CPU (Central Processing Unit) 13, a ROM (Read Only Memory) 14, a RAM (Random Access Memory) 15, a bus 16, an input and output interface 17, an input unit 18, an output unit 19, a storage unit 20, a drive 21, an Ethernet interface (Ethernet I/F) 22, and a network terminal 23. Note that "Ethernet" is a registered trademark.

In the personal computer 10, the CPU 13, the ROM 14, and the RAM 15 are connected to one another using the bus 16. In addition, the input and output interface 17 is connected to the bus 16. The input unit 18, the output unit 19, the storage unit 20, the drive 21, and the HDMI transmitter (HDMI TX) 12 is connected to the input and output interface 17.

The input unit 18 is formed from, for example, a keyboard, a mouse, and a microphone. The output unit 19 is formed from, for example, a display and a speaker. The storage unit 20 is formed from, for example, an HDD (Hard Disk Drive) or a nonvolatile memory. The drive 21 drives a removable medium, such as a magnetic disk, an optical disk, a magneto-optical disk, or a memory card.

In addition, the Ethernet interface 22 is connected to the bus 16. The network terminal 23 and the high-speed data line interface 12A are connected to the Ethernet interface 22. The high-speed data line interface 12A is a bi-directional communication interface that uses predetermined lines of the HDMI cable 1 (a reserve line and an HPD line in this embodiment). The high-speed data line interface 12A is described in more detail below.

In the personal computer 10 having the configuration as shown in FIG. 2, the CPU 13 loads a program stored in, for example, the storage unit 20 into the RAM 15 via the input and output interface 17 and the bus 16. Thus, a series of processes are performed, as described below.

Figure 3:
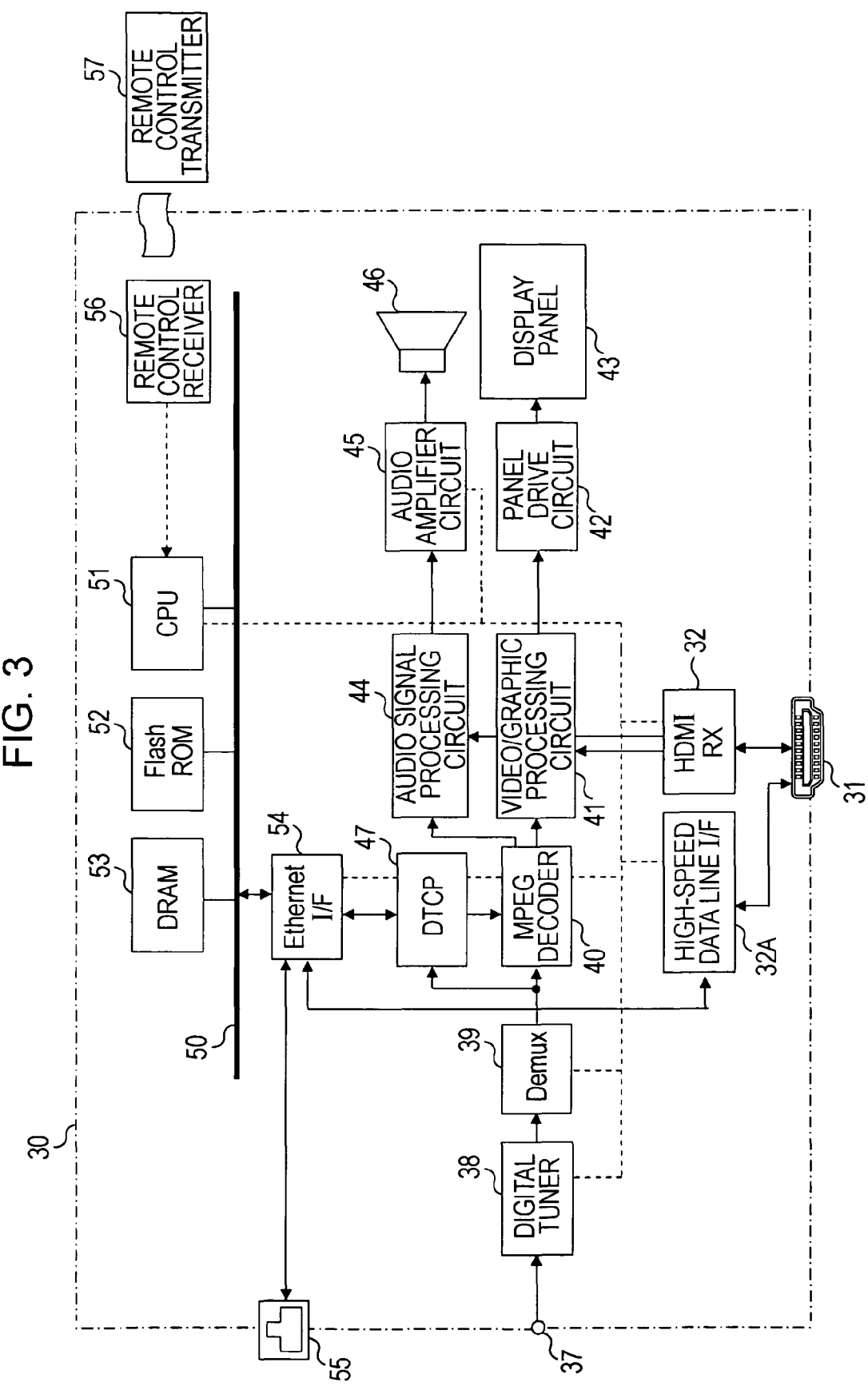
FIG. 3 is a block diagram illustrating an exemplary configuration of a personal computer (a source device) of the AV system.

FIG. 3 illustrates an exemplary configuration of the television receiver 30. The television receiver 30 includes the HDMI terminal 31, the HDMI receiver 32, the high-speed data line interface 32A, an antenna terminal 37, a digital tuner 38, a demultiplexer 39, an MPEG (Moving Picture Expert Group) decoder 40, a video/graphic processing circuit 41, a panel drive circuit 42, a display panel 43, an audio signal processing circuit 44, an audio amplifier circuit 45, a speaker 46, a DTCP (Digital Transmission Content Protection) circuit 47, an internal bus 50, a CPU 51, a flash ROM 52, a DRAM 53, an Ethernet interface (Ethernet I/F) 54, a network terminal 55, a remote control receiver 56, and a remote control transmitter 57.

A television broadcast signal received by a receiving antenna (not shown) is input to the antenna terminal 37. The digital tuner 38 processes the television broadcast signal input to the antenna terminal 37 and outputs a particular transport stream corresponding to a channel selected by a user. The demultiplexer 39 extracts a partial TS (Transport Stream) (a TS packet of video data and a TS packet of audio data) corresponding to the channel selected by the user from the transport stream acquired by the digital tuner 38.

In addition, the demultiplexer 39 extracts PSI/SI (Program Specific Information/Service Information) from the transport stream acquired by the digital tuner 38 and outputs the PSI/SI to the CPU 51. A plurality of channels are multiplexed in the transport stream acquired by the digital tuner 38. By acquiring packet ID (PID) information on the channel from the PDI/SI (PAT/PMT), the demultiplexer 39 can perform the processing for extracting the partial TS of the channel from the transport stream.

The MPEG decoder 40 decodes a video PES (Packetized Elementary Stream) packet formed from the TS packets of the video data acquired by the demultiplexer 39 and acquires video data. In addition, the MPEG decoder 40 decodes an audio PES packet formed from the TS packets of the audio data acquired by the demultiplexer 39 and acquires audio data. Note that the MPEG decoder 40 acquires the video data and audio data by decoding the video and audio PES packets decoded by the DTCP circuit 47 as needed.

The video/graphic processing circuit 41 performs, for example, a multi-screen process and a graphic data overlay process on the video data acquired by the MPEG decoder 40 as needed. The panel drive circuit 42 drives the display panel 43 using video data output from the video/graphic processing circuit 41. For example, the display panel 43 is formed from an LCD (Liquid Crystal Display) or a PDP (Plasma Display Panel). The audio signal processing circuit 44 performs a necessary process, such as a D/A conversion process, on the audio data acquired by the MPEG decoder 40. The audio amplifier circuit 45 amplifies the audio signal output from the audio signal processing circuit 44 and supplies the amplified audio signal to the speaker 46.

The DTCP circuit 47 encrypts the partial TS extracted by the demultiplexer 39 as needed. In addition, the DTCP circuit 47 decrypts encrypted data supplied from the network terminal 55 or the high-speed data line interface 32A to the Ethernet interface 54.

The CPU 51 controls all of the components of the television receiver 30. The flash ROM 52 stores control software and data. The DRAM 53 serves as a work area of the CPU 51. The CPU 51 loads the software and data read from the flash ROM 52 into the DRAM 53 and starts the software. Thus, the CPU 51 controls the components of the television receiver 30. The remote control receiver 56 receives a remote control signal (remote control code) transmitted from the remote control transmitter 57 and supplies the remote control signal to the CPU 51. The CPU 51, the flash ROM 52, the DRAM 53, and the Ethernet interface 54 are connected to the internal bus 50.

The HDMI receiver (HDMI sink) 32 receives baseband video (image) data and audio data supplied to the HDMI terminal 31 through communication that complies with the HDMI. The HDMI receiver 32 is described in more detail below. The high-speed data line interface 32A is an interface that performs bi-directional communication using predetermined lines of the HDMI cable (a reserve line and an HPD line in this embodiment). The high-speed data line interface 32A is described in more detail below.

The operation performed by the television receiver 30 shown in FIG. 3 is briefly described.

A television broadcast signal input to the antenna terminal 37 is supplied to the digital tuner 38. The digital tuner 38 processes the television broadcast signal and outputs a predetermined transport stream corresponding to the channel selected by the user. Thereafter, the predetermined transport stream is supplied to the demultiplexer 39. The demultiplexer 39 extracts, from the transport stream, a partial TS (a TS packet of video data and a TS packet of audio data) corresponding to the channel selected by the user. The extracted partial TS is supplied to the MPEG decoder 40.

The MPEG decoder 40 decodes the video PES packet formed from the TS packet of the video data. Thus, the MPEG decoder 40 can acquire video data. The video data is subjected to, for example, a multi-screen process and a graphic data overlay process performed by the video/graphic processing circuit 41 as needed. Thereafter, the video data is supplied to the panel drive circuit 42. Thus, an image corresponding to the channel selected by the user is displayed on the display panel 43.

In addition, the MPEG decoder 40 decodes the audio PES packet formed from the TS packets of the audio data. Thus, the MPEG decoder 40 can acquire audio data. The audio data is subjected to a necessary process, such as a D/A conversion process, performed by the audio signal processing circuit 44. Furthermore, the audio data is amplified by the audio amplifier circuit 45 and is supplied to the speaker 46. Thus, sound corresponding to the channel selected by the user is output from the speaker 46.

When a television broadcast signal is received and if a partial TS extracted by the demultiplexer 39 is transmitted to a network or the high-speed data line formed from predetermined lines of an HDMI cable described below, the partial TS is encrypted by the DTCP circuit 47. Thereafter, the partial TS is supplied to the network terminal 55 or the high-speed data line interface 32A via the Ethernet interface 54.

The remote control receiver 56 receives remote control code (a remote control signal) transmitted from the remote control transmitter 57. Thereafter, the remote control code is supplied to the CPU 51. The CPU 51 controls the components of the television receiver 30 in accordance with the remote control code.

Note that the encrypted partial TS supplied from the network terminal 55 to the Ethernet interface 54 or from the HDMI terminal 31 to the Ethernet interface 54 via the high-speed data line interface 32A is decrypted by the DTCP circuit 47. Thereafter, the partial TS is supplied to the MPEG decoder 40. Subsequently, operations that are the same as those performed when, as described above, the television broadcast signal is received are performed. Thus, an image is displayed on the display panel 43, and sound is output from the speaker 46.

In addition, the HDMI receiver 32 acquires the video (image) data and audio data input to the HDMI terminal 31 via an HDMI cable. The video data and audio data are supplied to the video/graphic processing circuit 41 and the audio signal processing circuit 44, respectively. Subsequently, operations that are the same as those performed when, as described above, the television broadcast signal is received are performed. Thus, an image is displayed on the display panel 43, and sound is output from the speaker 46.

Figure 4:
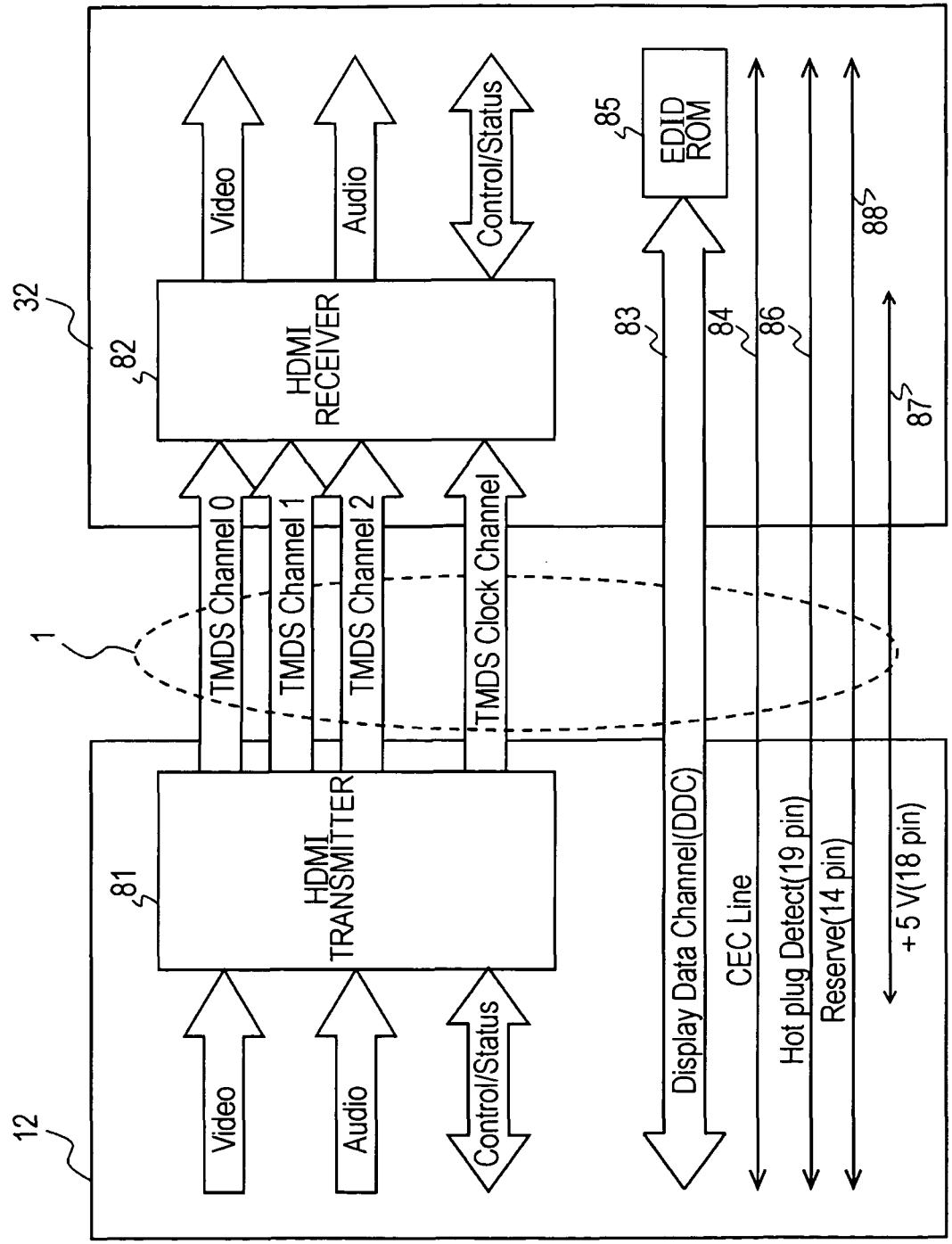
FIG. 4 is a block diagram illustrating exemplary configurations of an HDMI transmitter (an HDMI source) and an HDMI receiver (an HDMI sink).

FIG. 4 illustrates exemplary configurations of the HDMI transmitter (the HDMI source) 12 of the personal computer 10 and the HDMI receiver (the HDMI sink) 32 of the television receiver 30 in the AV system 5 shown in FIG. 1.

The HDMI transmitter 12 unidirectionally transmits, to the HDMI sink 32 using a plurality of channels, a differential signal corresponding to pixel data of an uncompressed image of one screen during an effective video period (hereinafter also referred to as an "active video period") representing a period from one vertical synchronization signal to the next vertical synchronization signal excluding horizontal blanking intervals and a vertical blanking interval. In addition, the HDMI transmitter 12 unidirectionally transmits, to the HDMI sink 32 using a plurality of channels, at least differential signals corresponding to the audio data, control data, and auxiliary data associated with the image during the horizontal blanking intervals or the vertical blanking interval.

That is, the HDMI source 12 includes a transmitter 81. For example, the transmitter 81 converts the pixel data of an uncompressed image into a differential signal corresponding to the image data. Thereafter, the transmitter 81 unidirectionally and serially transmits, using a plurality of channels, that is, three TMDS channels #0, #1, and #2, the differential signal to the HDMI sink 32 connected to the transmitter 81 using the HDMI cable 1.

In addition, the transmitter 81 converts the audio data, the control data, and the auxiliary data associated with the uncompressed image into corresponding differential signals. Thereafter, the transmitter 81 unidirectionally and serially transmits, using a plurality of channels, that is, three TMDS channels #0, #1, and #2, the differential signals to the HDMI sink 32 connected to the transmitter 81 via the HDMI cable 1.

Furthermore, the transmitter 81 transmits, to the HDMI sink 32 connected thereto using the HDMI cable 1, a pixel clock synchronized with the pixel data transmitted through the three TMDS channels #0, #1, and #2 using a TMDS clock channel. At that time, 10-bit pixel data is transmitted per TMDS channel #i (i=0, 1, or 2) during one pixel clock.

The HDMI sink 32 receives the differential signal corresponding to the pixel data that is unidirectionally transmitted from the HDMI source 12 using a plurality of channels during an active video period. In addition, the HDMI sink 32 receives the differential signals corresponding to the audio data and the control data that are unidirectionally transmitted from the HDMI source 12 using a plurality of channels during horizontal blanking intervals or a vertical blanking interval.

That is, the HDMI sink 32 includes a receiver 82. The receiver 82 receives, using the TMDS channels #0, #1, and #2, the differential signal corresponding to the pixel data that is unidirectionally transmitted from the HDMI source 12 connected thereto using the HDMI cable 1 and the differential signals corresponding to the audio signal and the control signal in synchronization with the pixel clock transmitted from the HDMI source 12 through the TMDS clock channel.

The following transmission channels are used for the HDMI system including the HDMI source 12 and the HDMI sink 32: three TMDS channels #0 to #2 serving as transmission channels for unidirectionally and serially transmitting pixel data and audio data from the HDMI source 12 to the HDMI sink 32 in synchronization with the pixel clock, a TMDS clock channel serving as a transmission channel for transmitting the pixel clock, and transmission channels called a DDC (Display Data Channel) 83 and a CEC line 84.

The DDC 83 is formed from two signal lines (not shown) included in the HDMI cable 1. The DDC 83 is used by the HDMI source 12 to read E-EDID (Enhanced Extended Display Identification Data) from the HDMI sink 32 connected to the HDMI source 12 using the HDMI cable 1.

That is, in addition to the transmitter 81, the HDMI sink 32 includes an EDID ROM (Read Only Memory) 85 that stores the E-EDID representing the performance information regarding the performance (the configuration/capability) of the HDMI sink 32. The HDMI source 12 reads, using the DDC 83, the E-EDID regarding the HDMI sink 32 from the HDMI sink 32 connected to the HDMI source 12 using the HDMI cable 1. Thus, the HDMI source 12 recognizes the setting of the performance of the HDMI sink 32, that is, the format (the profile) of an image supported by an electronic apparatus including the HDMI sink 32 (e.g., RGB, YCbCr4:4:4, or YCbCr4:2:2), for example.

The CEC line 84 is formed from a single signal line (not shown) included in the HDMI cable 1. The CEC line 84 is used to bi-directionally transmit the control data between the HDMI source 12 and the HDMI sink 32. The CEC line 84 forms a control data line.

In addition, the HDMI cable 1 includes a line 86 connected to a pin called HPD (Hot Plug Detect). By using the line 86, a source device can detect connection of a sink device to the source device. Furthermore, the HDMI cable 1 includes a line 87 used for supplying electronic power from the source device to the sink device. Still furthermore, the HDMI cable 1 includes a reserve line 88.

Figure 5:
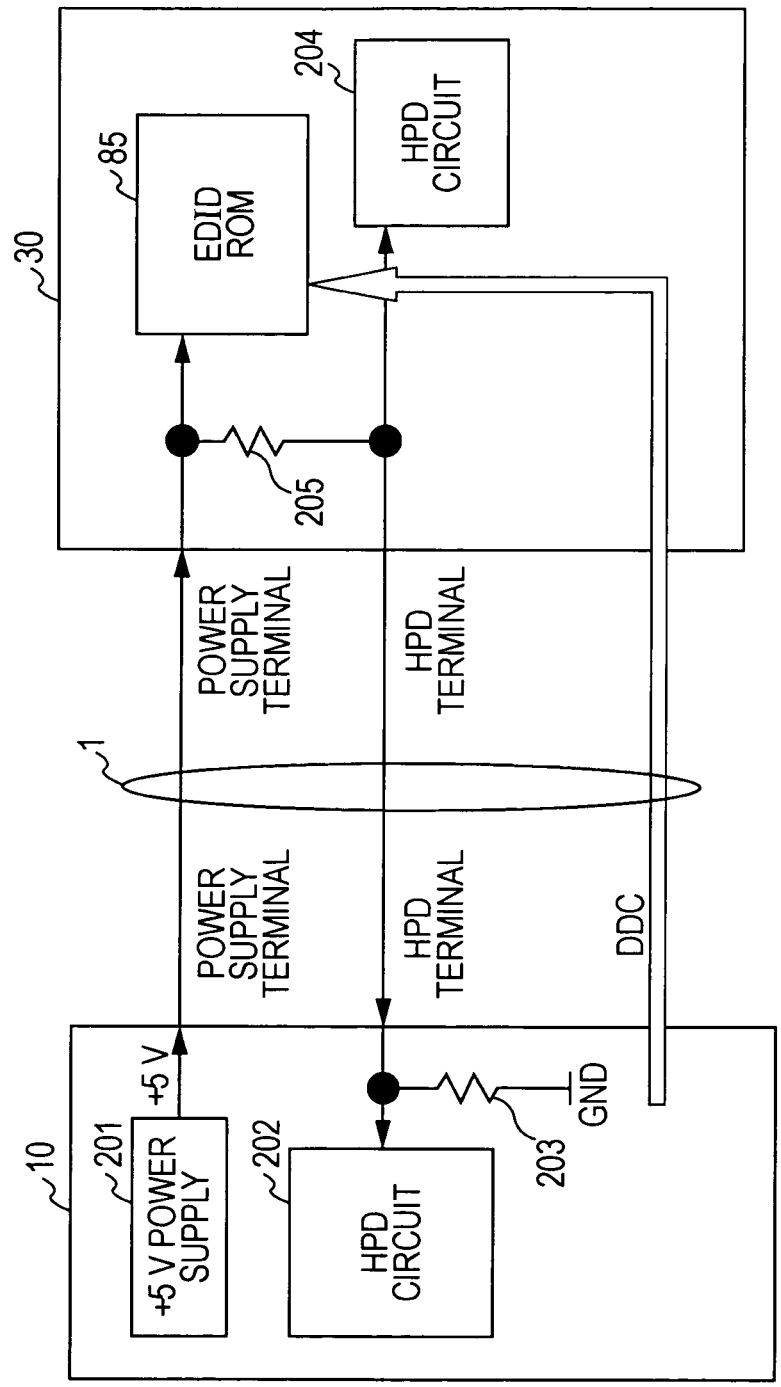
FIG. 5 is a schematic illustration of a peripheral circuit of a power supply terminal (+5V power terminal) and an HPD (Hot Plug Detect) terminal of the personal computer serving as a source device and a peripheral circuit of a power supply terminal and an HPD terminal of the television receiver serving as a sink device.

FIG. 5 is a schematic illustration of a peripheral circuit of a power supply terminal (+5V Power terminal) and an HPD (Hot Plug Detect) terminal of the personal computer 10 serving as a source device and a peripheral circuit of a power supply terminal and an HPD terminal of the television receiver 30 serving as a sink device.

The personal computer 10 includes a power supply unit 201 that generates +5V power and supplies the power to the power supply terminal (+5V power terminal) and an HPD circuit 202 connected to the HPD terminal. Note that the HPD terminal of the personal computer 10 is connected to ground via, for example, a pull-down resistor 203 of 47 kΩ.

In addition, the television receiver 30 includes an HPD circuit 204 connected to the HPD terminal. Note that, in the television receiver 30, power for readout is supplied from the power supply terminal (+5V power terminal) to an EDID ROM 85. In addition, in the television receiver 30, a resistor 205 of 1 kΩ, which is determined by the specification, is connected between the power supply terminal (+5V power terminal) and the HPD terminal.

In such a configuration, when the personal computer 10 is connected to the television receiver 30 using the HDMI cable 1, the potential of the HPD terminal of the television receiver 30 is increased due to the +5V power supplied from the power supply unit 201 to the power supply terminal (+5V power terminal) of the television receiver 10. Accordingly, the HPD circuit 204 of the television receiver 30 can detect that the personal computer 10 is connected to the television receiver 30 using the HDMI cable 1. In addition, at that time, the potential of the HPD terminal of the personal computer 10 is increased. Thus, the HPD circuit 202 of the personal computer 10 can detect that the television receiver 30 is connected to the personal computer 10 using the HDMI cable 1.

In addition, at that time, if the HDMI cable 1 is removed from the television receiver 30, the potential of the HPD terminal of the television receiver 30 and the potential of the HPD terminal of the personal computer 10 are decreased. Thus, the HPD circuit 204 of the television receiver 30 and the HPD circuit 202 of the personal computer 10 can detect that the connection is lost.

Figure 6:
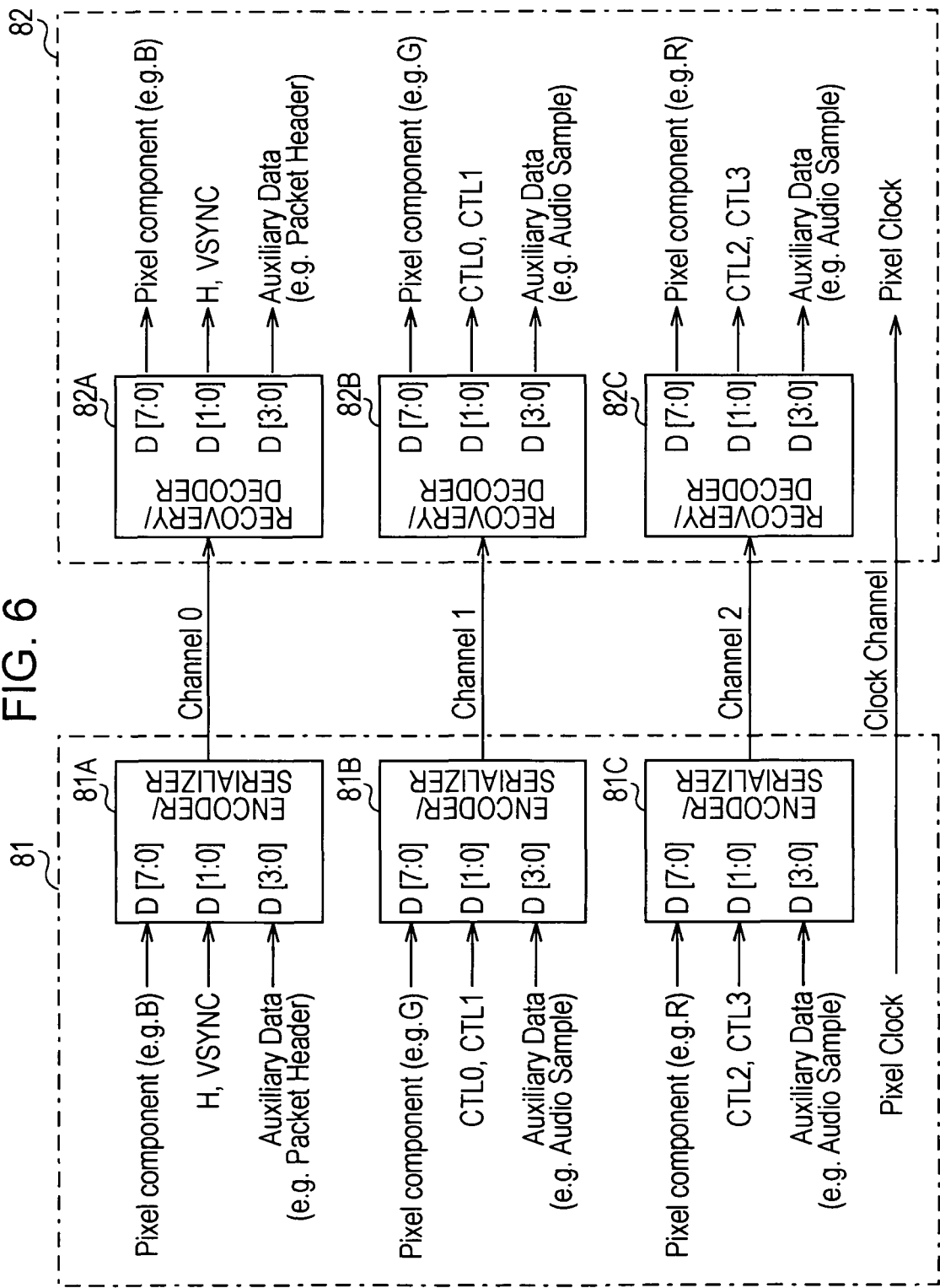
FIG. 6 is a block diagram illustrating exemplary configurations of the HDMI transmitter and the HDMI receiver.

FIG. 6 illustrates exemplary configurations of the HDMI transmitter 81 and the HDMI receiver 82 shown in FIG. 4.

The transmitter 81 includes three encoder/serializers 81A, 81B, and 81C that correspond to the three TMDS channels #0, #1, and #2, respectively. Each of the encoder/serializers 81A, 81B, and 81C encodes the image data, auxiliary data, and control data supplied thereto, converts the data from a parallel format to a serial format, and transmits the data in the form of differential signals. If the image data includes, for example, R (red), G (green), and B (blue) components, the B component is supplied to the encoder/serializer 81A. In addition, the G component is supplied to the encoder/serializer 81B, and the R component is supplied to the encoder/serializer 81C.

Examples of the auxiliary data include audio data and a control packet. The control packet is supplied to, for example, the encoder/serializer 81A, and the audio data is supplied to the encoder/serializers 81B and 81C.

In addition, examples of control data include a 1-bit vertical synchronization signal (VSYNC), a 1-bit horizontal synchronization signal (HSYNC), and 1-bit control bits CTL0, CTL1, CTL2, and CTL3. The vertical synchronization signal and horizontal synchronization signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits the supplied vertical synchronization signal, horizontal synchronization signal, and auxiliary data in a time multiplexed manner. That is, the encoder/serializer 81A converts the B component of the supplied image data into a series of parallel data of 8 bits, which is a fixed bit length. In addition, the encoder/serializer 81A encodes the parallel data into serial data and, subsequently, transmits the serial data via the TMDS channel #0.

Furthermore, the encoder/serializer 81A encodes the supplied 2-bit parallel data of the vertical synchronization signal and horizontal synchronization signal and converts the data into a serial format. Thereafter, the encoder/serializer 81A transmits the serial data via the TMDS channel #0. Still furthermore, the encoder/serializer 81A converts the supplied auxiliary data into a series of O-bit parallel data. Thereafter, the encoder/serializer 81A encodes the parallel data into a serial format and transmits the serial data via the TMDS channel #0.

The encoder/serializer 81B transmits the supplied G component of the image data, control bits CTL0 and CTL1, and auxiliary data in a time multiplexed manner. That is, the encoder/serializer 81B converts the G component of the supplied image data into a series of parallel data of 8 bits, which is a fixed bit length. In addition, the encoder/serializer 81B encodes the parallel data into serial data and, subsequently, transmits the serial data via the TMDS channel #1.

Furthermore, the encoder/serializer 81B encodes the supplied 2-bit parallel data of the control bits CTL0 and CTL1 and converts the data into a serial format. Thereafter, the encoder/serializer 81B transmits the serial data via the TMDS channel #1. Still furthermore, the encoder/serializer 81B converts the supplied auxiliary data into a series of O-bit parallel data. Thereafter, the encoder/serializer 81B encodes the parallel data into a serial format and transmits the serial data via the TMDS channel #1.

The encoder/serializer 81C transmits the supplied R component of the image data, control bits CTL2 and CTL3, and auxiliary data in a time multiplexed manner. That is, the encoder/serializer 81C converts the R component of the supplied image data into a series of parallel data of 8 bits, which is a fixed bit length. In addition, the encoder/serializer 81C encodes the parallel data into serial data and, subsequently, transmits the serial data via the TMDS channel #2.

Furthermore, the encoder/serializer 81C encodes the supplied 2-bit parallel data of the control bits CTL2 and CTL3 and converts the data into a serial format. Thereafter, the encoder/serializer 81C transmits the serial data via the TMDS channel #2. Still furthermore, the encoder/serializer 81C converts the supplied auxiliary data into a series of O-bit parallel data. Thereafter, the encoder/serializer 81C encodes the parallel data into a serial format and transmits the serial data via the TMDS channel #2.

The receiver 82 includes three recovery/decoders 82A, 82B, and 82C that correspond to the three TMDS channels #0, #1, and #2, respectively. Each of the recovery/decoders 82A, 82B, and 82C receives the image data, auxiliary data, and control data in the form of differential signals transmitted thereto via the TMDS channel #0, #1, and #2. In addition, each of the recovery/decoders 82A, 82B, and 82C converts the image data, auxiliary data, and control data from a serial format to a parallel format, decodes the image data, auxiliary data, and control data, and outputs the image data, auxiliary data, and control data.

That is, the recovery/decoder 82A receives the B component of the image data, the vertical synchronization signal, and the horizontal synchronization signal, and the auxiliary data in the form of differential signals transmitted via the TMDS channel #0. Thereafter, the recovery/decoder 82A converts the B component of the image data, the vertical synchronization signal, and the horizontal synchronization signal, and the auxiliary data from a serial format to a parallel format and decodes and outputs the B component of the image data, the vertical synchronization signal, and the horizontal synchronization signal, and the auxiliary data.

The recovery/decoder 82B receives the G component of the image data, the control bits CTL0 and CTL1, and the auxiliary data in the form of differential signals transmitted via the TMDS channel #1. Thereafter, the recovery/decoder 82B converts the G component of the image data, the control bits CTL0 and CTL1, and the auxiliary data from a serial format to a parallel format and decodes and outputs the G component of the image data, the control bits CTL0 and CTL1, and the auxiliary data.

The recovery/decoder 82C receives the R component of the image data, the control bits CTL2 and CTL3, and the auxiliary data in the form of differential signals transmitted via the TMDS channel #2. Thereafter, the recovery/decoder 82C converts the R component of the image data, the control bits CTL2 and CTL3, and the auxiliary data from a serial format to a parallel format and decodes and outputs the R component of the image data, the control bits CTL2 and CTL3, and the auxiliary data.

Figure 7:
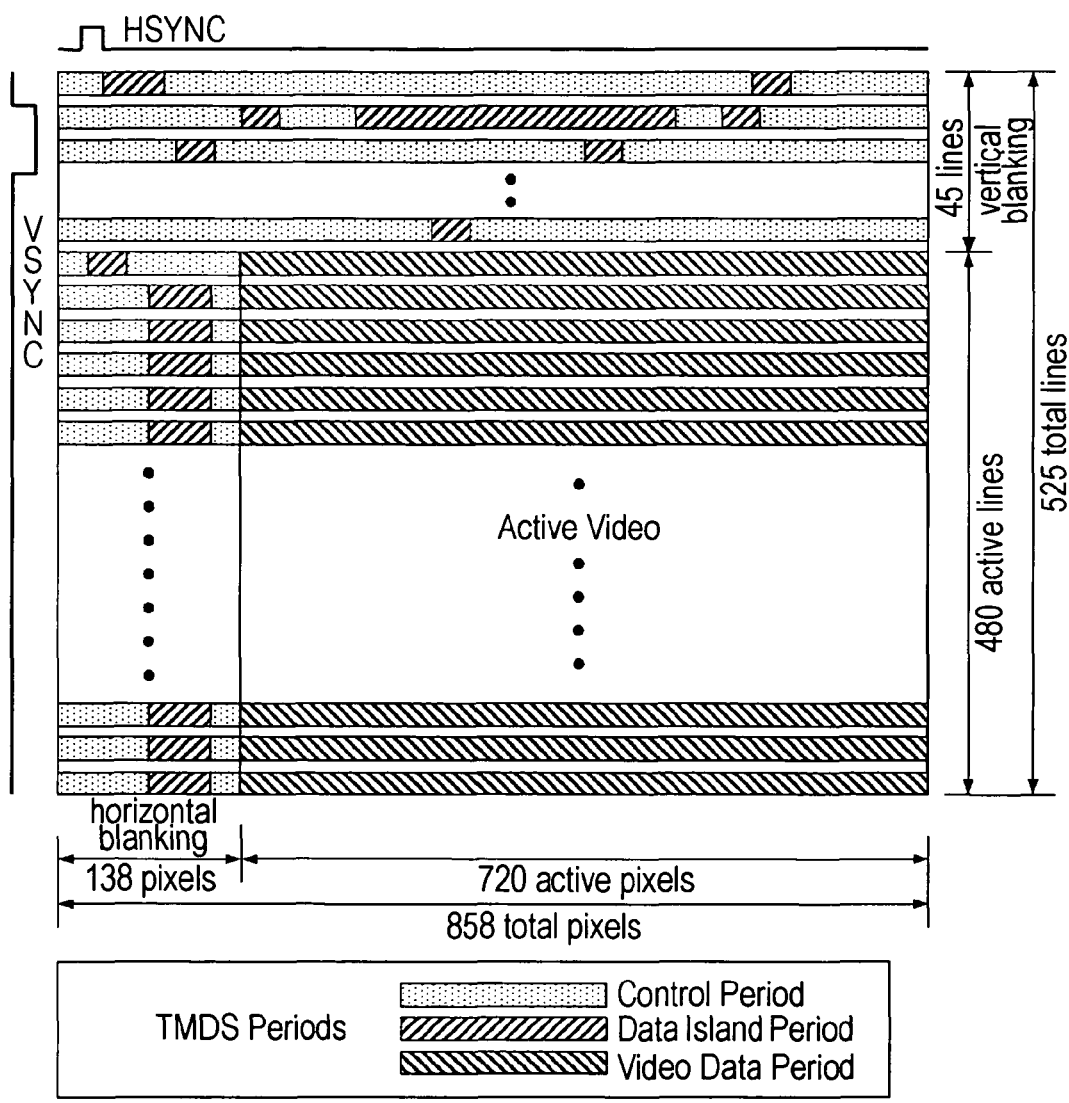
FIG. 7 illustrates the structure of a TMDS transmission data.

FIG. 7 illustrates an example of transmission periods (periods of time) in which a variety of transmission data are transmitted via the three TMDS channel #0, #1, and #2 of the HDMI. Note that FIG. 7 illustrates the periods in which a variety of transmission data are transmitted when a progressive image of 720 (horizontal)×480 (vertical) pixels is transmitted via the TMDS channels #0, #1, and #2.

A video field in which transmission data is transmitted via the three TMDS channel #0, #1, and #2 of the HDMI includes one of the following three types of span in accordance with the type of transmission data: a video data period, a data island period, and a control period.

As used herein, the term "video field period" refers to a period starting from a rising edge (an active edge) of a vertical synchronization signal to a rising edge of the next vertical synchronization signal. The video field period includes a horizontal blanking period, a vertical blanking period, and an active video period representing a period of the video field period excluding the horizontal blanking period and the horizontal blanking period.

The video data period is assigned to the active video period. During the video data period, active pixel data of 720×480 pixels that form image data of one uncompressed screen is transmitted.

The data island period and the control period are assigned to the horizontal blanking period and the vertical blanking period. During the data island period and the control period, auxiliary data is transmitted.

That is, the data island period is assigned to part of the horizontal blanking period and the vertical blanking period. During the data island period, the auxiliary data items that are not associated with a control operation (e.g., an audio data packet) are transmitted.

The control period is assigned to a period in the horizontal blanking period and the vertical blanking period other than the data island period. During the control period, the auxiliary data items that are associated with a control operation (e.g., a vertical synchronization signal, a horizontal synchronization signal, and a control packet) are transmitted.

Note that, in the current HDMI specification, the frequency of a pixel clock transmitted via the TDMS clock channel is, for example, 165 MHz. In such a case, the transfer rate during the data island period is about 500 Mbps.

FIG. 8 illustrates the pin assignment of the HDMI terminals 11 and 31. This pin assignment is called Type-A.

Two differential signal lines used for transmitting differential signals TMDS Data#i+ and TMDS Data#i− of a TMDS channel #i are connected to pins (pins having pin numbers 1, 4 and 7) to which TMDS Data#i+ is assigned and pins (pins having pin numbers 3, 6 and 9) to which TMDS Data#i− is assigned.

In addition, the CEC line 84 for transmitting a CEC signal of control data is connected to a pin having a pin number of 13, and a pin having a pin number 14 is a reserved pin. In addition, a signal line for transmitting a SDA (serial data) signal, such as the E-EDID, is connected to a pin having a pin number 16, and a signal line for transmitting a SCL (serial clock) signal, which is used for transmission/reception synchronization of the SDA signal, is connected to a pin having a pin number 15. The above-described DDC 83 is formed from a line used for transmitting an SDA signal and a line used for transmitting an SCL signal.

Furthermore, as described above, the line 86 used for a source device to detect that a sink device is connected thereto is connected to a pin having a pin number 19. In addition, the line 87 for supplying the power in the above-described manner is connected to a pin having a pin number 18.

Figure 9:
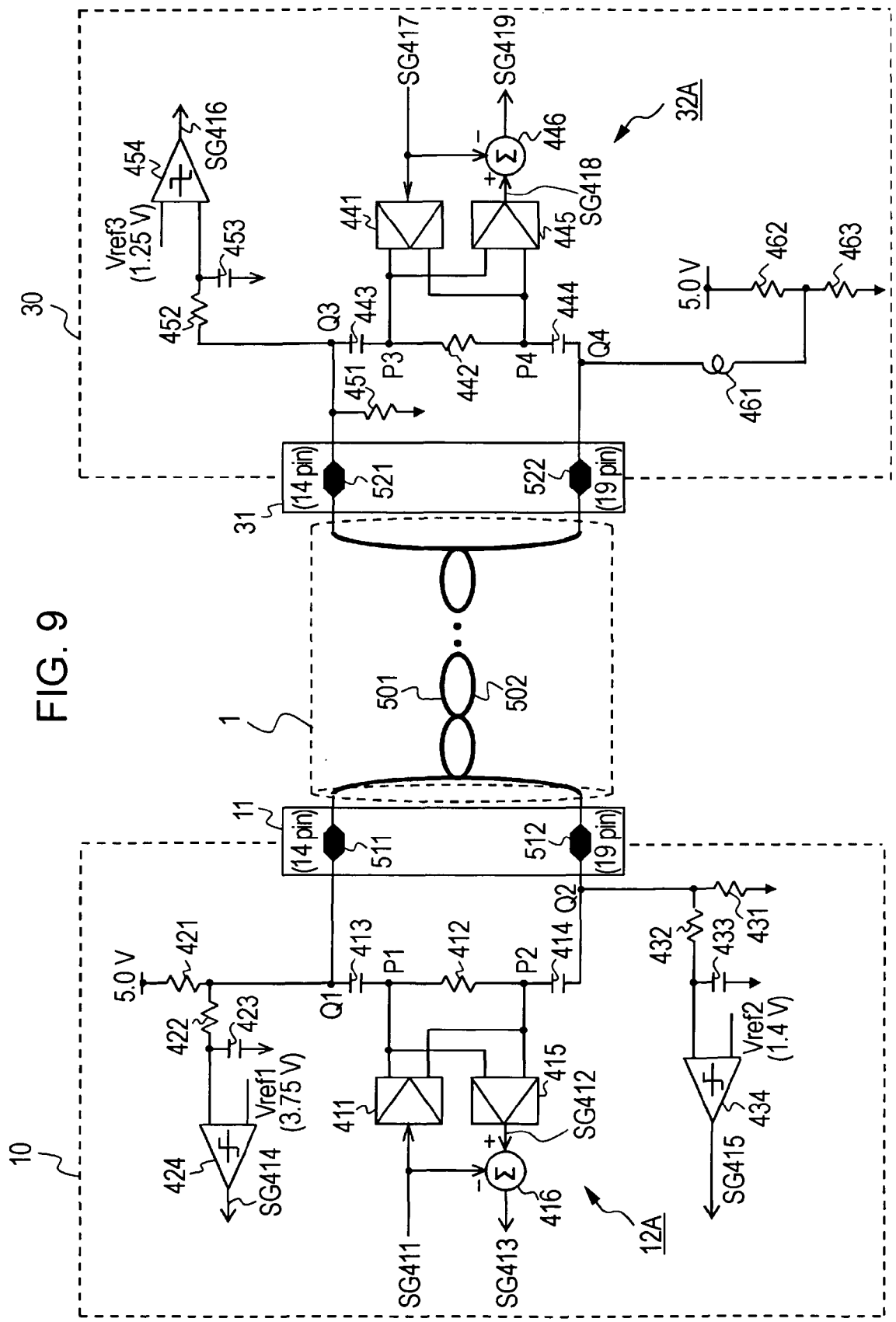
FIG. 9 is a connection diagram illustrating exemplary configurations of a high-speed data line interface of the personal computer and a high-speed data line interface of the television receiver.

FIG. 9 illustrates exemplary configurations of the high-speed data line interface 12A of the personal computer 10 and the high-speed data line interface 32A of the television receiver 30 in the AV system 5 shown in FIG. 1. The interfaces 12A and 32A form a communication unit for performing LAN (Local Area Network) communication. This communication unit performs communication using a pair of differential lines of a plurality of lines that form the HDMI cable 1. In the present embodiment, the differential lines are a reserve line (an Ether-line) corresponding to the Reserve pin (the No. 14 pin) and an HPD line (the Ether+ line) corresponding to the HPD pin (the No. 19 pin).

The personal computer 10 includes a LAN signal transmitter circuit 411, a terminating resistor 412, AC coupling capacitors 413 and 414, a LAN signal receiver circuit 415, a subtracting circuit 416, a pull-up resistor 421, a resistor 422 and a capacitor 423 forming a lowpass filter, a comparator 424, a pull-down resistor 431, a resistor 432 and a capacitor 433 forming a lowpass filter, and a comparator 434. Here, the high-speed data line interface 12A includes the LAN signal transmitter circuit 411, the terminating resistor 412, the AC coupling capacitors 413 and 414, the LAN signal receiver circuit 415, and the subtracting circuit 416.

A series circuit of the pull-up resistor 421, the AC coupling capacitor 413, the terminating resistor 412, the AC coupling capacitor 414, and the pull-down resistor 431 is connected between the power supply line (+5.0 V) and the ground line. A connection point P1 of the AC coupling capacitor 413 and the terminating resistor 412 is connected to the positive output side of the LAN signal transmitter circuit 411 and is connected to the positive input side of the LAN signal receiver circuit 415. In addition, a connection point P2 of the AC coupling capacitor 414 and the terminating resistor 412 is connected to the negative output side of the LAN signal transmitter circuit 411 and is connected to the negative input side of the LAN signal receiver circuit 415. A transmission signal (transmission data) SG411 is supplied to the input side of the LAN signal transmitter circuit 411.

In addition, an output signal SG412 output from the LAN signal receiver circuit 415 is supplied to the positive side terminal of the subtracting circuit 416, while the transmission signal (transmission data) SG411 is supplied to the negative side terminal of the subtracting circuit 416. In the subtracting circuit 416, the transmission signal (transmission data) SG411 is subtracted from the output signal SG412 output from the LAN signal receiver circuit 415. Thus, a reception signal (reception data) SG413 is obtained.

Furthermore, a connection point Q1 of the pull-up resistor 421 and the AC coupling capacitor 413 is connected to the ground line via a series circuit of the resistor 422 and the capacitor 423. Then, the output signal output from a lowpass filter formed at a connection point of the resistor 422 and the capacitor 423 is supplied to one of the input terminals of the comparator 424. In the comparator 424, the output signal output from the lowpass filter is compared with a reference voltage Vref1 (+3.75 V) supplied to the other input terminal. An output signal SG414 output from the comparator 424 is supplied to the CPU 13.

Still furthermore, a connection point Q2 of the AC coupling capacitor 414 and the pull-down resistor 431 is connected to the ground line via a series circuit of the resistor 432 and the capacitor 433. Then, the output signal output from a lowpass filter formed at a connection point of the resistor 432 and the capacitor 433 is supplied to one of the input terminals of the comparator 434. In the comparator 434, the output signal output from the lowpass filter is compared with a reference voltage Vref2 (+1.4 V) supplied to the other input terminal. An output signal SG415 output from the comparator 434 is supplied to the CPU 13.

The television receiver 30 includes a LAN signal transmitter circuit 441, a terminating resistor 442, AC coupling capacitors 443 and 444, a LAN signal receiver circuit 445, a subtracting circuit 446, a pull-down resistor 451, a resistor 452 and a capacitor 453 forming a lowpass filter, a comparator 454, a choke coil 461, and resistors 462 and 463. Here, the high-speed data line interface 32A includes the LAN signal transmitter circuit 441, the terminating resistor 442, the AC coupling capacitors 443 and 444, the LAN signal receiver circuit 445, and the subtracting circuit 446.

A series circuit of the resistor 462 and the resistor 463 is connected between the power supply line (+5.0 V) and the ground line. In addition, a series circuit of the choke coil 461, the AC coupling capacitor 444, the terminating resistor 442, the AC coupling capacitor 443, and the pull-down resistor 451 is connected between a connection point of the resistor 462 and the resistor 463 and the ground line.

A connection point P3 of the AC coupling capacitor 443 and the terminating resistor 442 is connected to the positive output side of the LAN signal transmitter circuit 441 and is connected to the positive input side of the LAN signal receiver circuit 445. In addition, a connection point P4 of the AC coupling capacitor 444 and the terminating resistor 442 is connected to the negative output side of the LAN signal transmitter circuit 441 and is connected to the negative input side of the LAN signal receiver circuit 445. A transmission signal (transmission data) SG417 is supplied to the input side of the LAN signal transmitter circuit 441.

In addition, an output signal SG418 output from the LAN signal receiver circuit 445 is supplied to the positive side terminal of the subtracting circuit 446, while the transmission signal SG417 is supplied to the negative side terminal of the subtracting circuit 446. In the subtracting circuit 446, the transmission signal SG417 is subtracted from the output signal SG418 output from the LAN signal receiver circuit 445. Thus, a reception signal (reception data) SG419 is obtained.

Furthermore, a connection point Q3 of the pull-down resistor 451 and the AC coupling capacitor 443 is connected to the ground line via a series circuit of the resistor 452 and the capacitor 453. Then, the output signal output from a lowpass filter formed at a connection point of the resistor 452 and the capacitor 453 is supplied to one of the input terminals of the comparator 454. In the comparator 454, the output signal output from the lowpass filter is compared with a reference voltage Vref3 (+1.25 V) supplied to the other input terminal. An output signal SG416 output from the comparator 454 is supplied to the CPU 51.

A reserve line 501 and an HPD line 502 contained in the HDMI cable 1 form a differential twisted pair. An end 511 of the reserve line 501 adjacent to the source is connected to the No. 14 pin of the HDMI terminal 11, while an end 521 of the reserve line 501 adjacent to the sink is connected to the No. 14 pin of the HDMI terminal 31. In addition, an end 512 of the HPD line 502 adjacent to the source is connected to the No. 19 pin of the HDMI terminal 11, while an end 522 of the HPD line 502 adjacent to the sink is connected to the No. 19 pin of the HDMI terminal 31.

In the personal computer 10, the above-described connection point Q1 of the pull-up resistor 421 and the AC coupling capacitor 413 is connected to the No. 14 pin of the HDMI terminal 11, while the above-described connection point Q2 of the pull-down resistor 431 and the AC coupling capacitor 414 is connected to the No. 19 pin of the HDMI terminal 11. In addition, in the television receiver 30, the above-described connection point Q3 of the pull-down resistor 451 and the AC coupling capacitor 443 is connected to the No. 14 pin of the HDMI terminal 31, while the above-described connection point Q4 of the choke coil 461 and the AC coupling capacitor 444 is connected to the No. 19 pin of the HDMI terminal 31.

The LAN communication operations performed by the high-speed data line interfaces 12A and 32A having the above-described configurations are described next.

In the personal computer 10, the transmission signal (transmission data) SG411 is supplied to the input side of the LAN signal transmitter circuit 411. The LAN signal transmitter circuit 411 then outputs a differential signal (a positive output signal and a negative output signal) corresponding to the transmission signal SG411. Thereafter, the differential signal output from the LAN signal transmitter circuit 411 is supplied to the connection points P1 and P2 and is transmitted to the television receiver 30 via the pair of lines (the reserve line 501 and the HPD line 502) of the HDMI cable 1.

In addition, in the television receiver 30, the transmission signal SG417 is supplied to the input side of the LAN signal transmitter circuit 441. The LAN signal transmitter circuit 441 then outputs a differential signal (a positive output signal and a negative output signal) corresponding to the transmission signal SG417. Thereafter, the differential signal output from the LAN signal transmitter circuit 441 is supplied to the connection points P3 and P4 and is transmitted to the personal computer 10 via the pair of lines (the reserve line 501 and the HPD line 502) of the HDMI cable 1.

Furthermore, since the input side of the LAN signal receiver circuit 415 is connected to the connection points P1 and P2 in the personal computer 10, a sum signal of the transmission signal corresponding to the differential signal (an electrical current signal) output from the LAN signal transmitter circuit 411 and a reception signal corresponding to the differential signal transmitted from the television receiver 30 as described above can be obtained. The sum signal serves as the output signal SG412 output from the LAN signal receiver circuit 415. In the subtracting circuit 416, the transmission signal (transmission data) SG411 is subtracted from the output signal SG412 output from the LAN signal receiver circuit 415. Accordingly, the output signal SG413 output from the subtracting circuit 416 corresponds to the transmission signal (the transmission data) SG417 transmitted from the television receiver 30.

Still furthermore, since the input side of the LAN signal receiver circuit 445 is connected to the connection points P3 and P4 in the television receiver 30, a sum signal of the transmission signal corresponding to the differential signal (an electrical current signal) output from the LAN signal transmitter circuit 441 and a reception signal corresponding to the differential signal transmitted from the personal computer 10 as described above can be obtained. The sum signal serves as the output signal SG418 output from the LAN signal receiver circuit 445. In the subtracting circuit 446, the transmission signal SG417 is subtracted from the output signal SG418 output from the LAN signal receiver circuit 445. Accordingly, the output signal SG419 output from the subtracting circuit 446 corresponds to the transmission signal (transmission data) SG411 transmitted from the personal computer 10.

In this way, bi-directional LAN communication can be performed between the high-speed data line interface 12A of the personal computer 10 and the high-speed data line interface 32A of the television receiver 30.

According to the example configuration shown in FIG. 9, in an interface that performs video and audio data transmission, exchange and authentication of information regarding a connected device, communication of device control data, and LAN communication using a single HDMI cable 1, the LAN communication is performed through bi-directional communication via a pair of differential transmission lines. In addition, the connection state of the interface is notified by using the DC bias potential of at least one of the transmission lines. Accordingly, spatial separation can be provided without physically using an SCL line and an SDA line for the LAN communication. As a result, this separation allows a circuit for LAN communication to be formed regardless of the electrical specifications defined for the DDC. Thus, stable and reliable LAN communication can be realized at low cost.

Note that, in FIG. 9, in addition to the above-described LAN communication, the HPD line 502 sends, to the personal computer 10 using a DC bias level, a message indicating that the HDMI cable 1 is connected to the television receiver 30. That is, when the HDMI cable 1 is connected to the television receiver 30, the resistors 462 and 463 and the choke coil 461 in the television receiver 30 bias the HPD line 502 via the No. 19 pin of the HDMI terminal 31 so that the HPD line 502 has about 4 V. The personal computer 10 extracts the DC bias of the HPD line 502 using the lowpass filter formed from the resistor 432 and the capacitor 433 and compares the DC bias with the reference voltage Vref2 (e.g., 1.4 V) using the comparator 434.

When the HDMI cable 1 is not connected to the television receiver 30, the voltage of the No. 19 pin of the HDMI terminal 11 is lower than the reference voltage Vref2 due to the presence of the pull-down resistor 431. In contrast, when the HDMI cable 1 is connected to the television receiver 30, the voltage of the No. 19 pin of the HDMI terminal 11 is higher than the reference voltage Vref2. Accordingly, when the HDMI cable 1 is connected to the television receiver 30, the output signal SG415 output from the comparator 434 has a high level. Otherwise, the output signal SG415 output from the comparator 434 has a low level. Thus, the CPU 13 of the personal computer 10 can recognize whether the HDMI cable 1 is connected to the television receiver 30 on the basis of the output signal SG415 output from the comparator 434.

In addition, as shown in FIG. 9, the devices connected to either end of the HDMI cable 1 have a function of mutually recognizing, using the DC bias potential of the reserve line 501, whether the device connected to the other end is a device capable of performing LAN communication (hereinafter referred to as an "e-HDMI compatible device").

As described above, the personal computer 10 pulls up the voltage of the reserve line 501 (+5 V) using the pull-up resistor 421, while the television receiver 30 pulls down the voltage of the reserve line 501 using the pull-down resistor 451. The resistors 421 and 451 are not included in an e-HDMI incompatible device.

As described above, the personal computer 10 compares the DC potential of the reserve line 501 that has passed through the lowpass filter formed from the resistor 422 and the capacitor 423 with the reference voltage Vref1 using the comparator 424. If the television receiver 30 is an e-HDMI compatible device that includes the pull-down resistor 451, the voltage of the reserve line 501 is 2.5 V. However, if the television receiver 30 is an e-HDMI incompatible device that does not include the pull-down resistor 451, the voltage of the reserve line 501 is 5 V due to the presence of the pull-up resistor 421.

Accordingly, when the reference voltage Vref1 is set to, for example, 3.75 V and if the television receiver 30 is an e-HDMI compatible device, the output signal SG414 output from the comparator 424 has a low level. Otherwise, the output signal SG414 output from the comparator 424 has a high level. Thus, the CPU 13 of the personal computer 10 can recognize whether the television receiver 30 is an e-HDMI compatible device or not using the output signal SG414 output from the comparator 424.

Similarly, as described above, using the comparator 454, the television receiver 30 compares the DC potential of the reserve line 501 that has passed through the lowpass filter formed from the resistor 452 and the capacitor 453 with the reference voltage Vref3. If the personal computer 10 is an e-HDMI compatible device that includes the pull-up resistor 421, the voltage of the reserve line 501 is 2.5 V. However, if the personal computer 10 is an e-HDMI incompatible device that does not include the pull-up resistor 421, the voltage of the reserve line 501 is 0 V due to the presence of the pull-down resistor 451.

Accordingly, when the reference voltage Vref3 is set to, for example, 1.25 V and if the personal computer 10 is an e-HDMI compatible device, the output signal SG416 output from the comparator 454 has a high level. Otherwise, the output signal SG416 output from the comparator 454 has a low level. Thus, the CPU 51 of the television receiver 30 can recognize whether the personal computer 10 is an e-HDMI compatible device or not using the output signal SG416 output from the comparator 454.

An exemplary processing sequence of turning off the firewall of the personal computer 10 for the television receiver 30 is described next with reference to FIG. 10. Note that an "Open Request" command is abbreviated as "Open RQ", a "Close Request" command is abbreviated as "Close RQ", a "Close Response" is abbreviated as "Close Res", and an "IP Address" is abbreviated as "IP_AD". This abbreviation is also applied to FIG. 12 described below.

(a) When the personal computer 10 is connected to the television receiver 30 using the HDMI cable 1, the +5V power is supplied from the power supply terminal (the +5V Power terminal) of the personal computer 10 to the power supply terminal (the +5V Power terminal) of the television receiver 30 via the HDMI cable 1 (refer to FIG. 5). (b) Accordingly, the HPD terminal of the television receiver 30 and the HPD terminal of the personal computer 10 have about +5 V. Thus, the television receiver 30 and the personal computer 10 detect that they are connected to each other using the HDMI cable 1.

Figure 11:
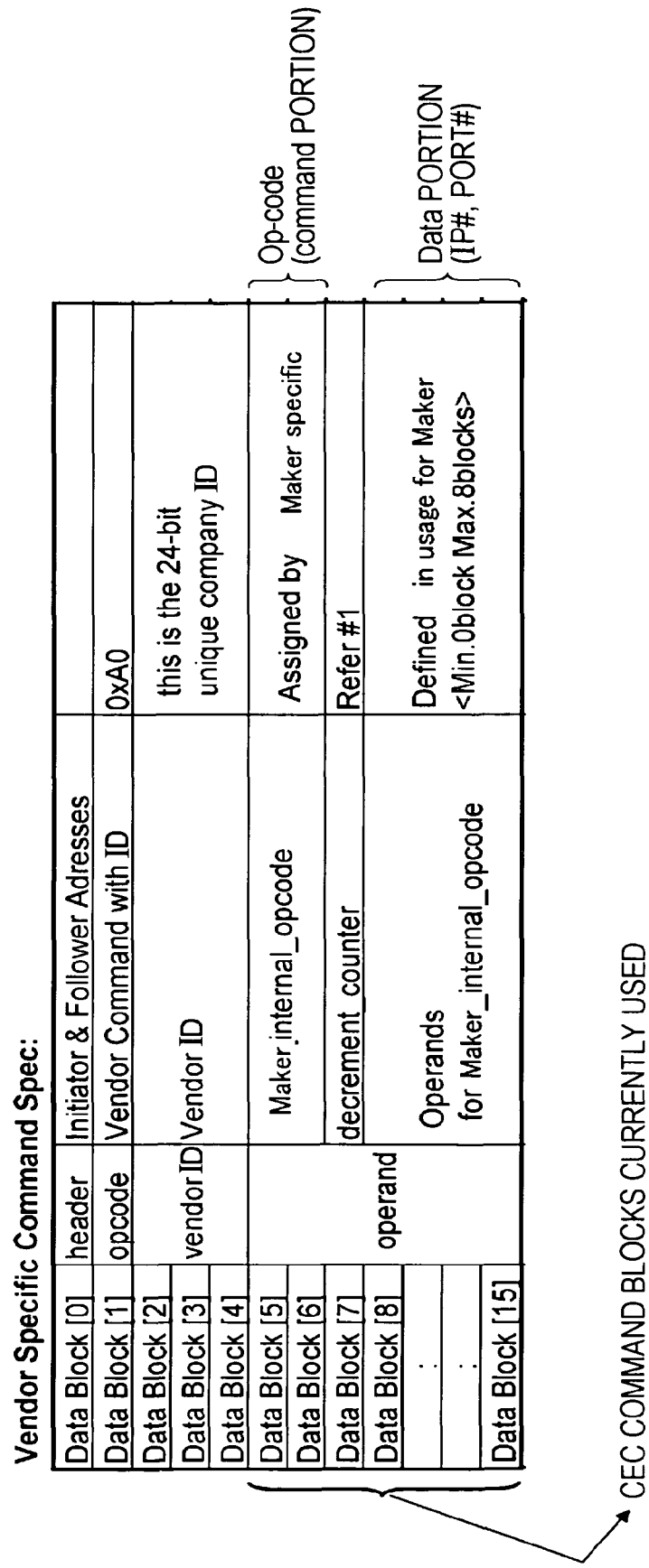
FIG. 11 illustrates a CEC command set.

(c) The CPU 51 of the television receiver 30 transmits a CEC Firewall turn-off command to the personal computer 10 using the CEC line of the HDMI cable 1. At that time, for example, as shown in FIG. 11, an OP code of a command set specific to Vender <Maker> in Vender Specific Command is used. This command contains the IP address (IP AD) of the television receiver 30 and the port number (Port#) to be opened in the data portion thereof.

(d) The CPU 13 of the personal computer 10 receives the CEC Firewall turn-off command from the television receiver 30 and appropriately performs a Firewall open process. That is, the CPU 13 removes access restriction on the IP address contained in the CEC Firewall turn-off command. In addition, the CPU 13 opens the port having a port number contained in the CEC Firewall turn-off command. (e) Thereafter, upon completion of the Firewall open process, the personal computer 10 transmits a CEC turn-off response command to the television receiver 30 using the CEC line of the HDMI cable 1.

(f) The CPU 51 of the television receiver 30 receives the CEC turn-off response command from the personal computer 10 and recognizes that transmission of a signal using the high-speed data line (the Ether line) is enabled. (g) Thereafter, the CPU 51 performs data communication using the high-speed data line.

Subsequently, when the personal computer 10 is powered on (including a standby mode) and if the power switch of the television receiver 30 is pressed and a power-off process starts, (h) the CPU 51 of the television receiver 30 transmits a CEC Firewall turn-off completion command to the personal computer 10 using the CEC line of the HDMI cable 1.

(i) The CPU 13 of the personal computer 10 receives the CEC Firewall turn-off completion command from the television receiver 30. (j) Immediately after the CPU 13 receives the CEC Firewall turn-off completion command, the CPU 13 transmits a CEC turn-off completion response command to the television receiver 30. (k) The CPU 51 of the television receiver 30 receives the CEC turn-off completion response command from the personal computer 10 and completes the sequence of firewall turn-off processes. Note that after completing such a sequence of firewall turn-off processes, the television receiver 30 starts an actual power-off process.

(m) After a period of time sufficient for the television receiver 30 to receive the CEC turn-off completion response command has elapsed, the CPU 13 of the personal computer 10 cancels turning off of the firewall and performs a Firewall close process. In the Firewall close process, the port that has been open in order to turn off the firewall is closed, and access restriction is resumed on the IP address that has been accessible.

Figure 10:
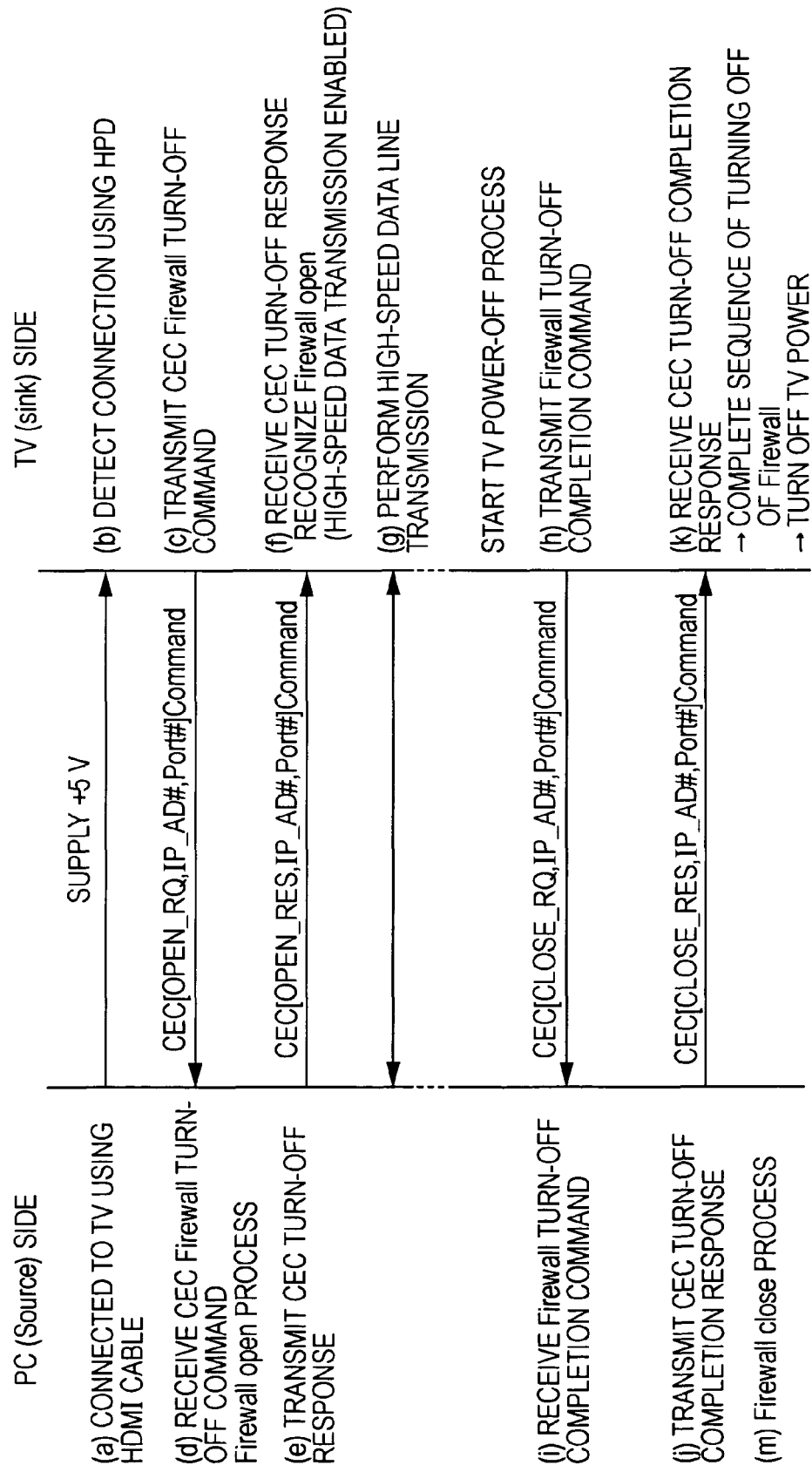
FIG. 10 illustrates an exemplary processing sequence of turning off a firewall of the personal computer against the television receiver.

According to the firewall turn-off sequence illustrated in FIG. 10, the firewall of the personal computer 10 against the television receiver 30 is automatically turned off when the television receiver 30 is connected to the personal computer 10 using the HDMI cable 1. Thus, the connectivity can be maintained, and data transmission from the television receiver 30 to the personal computer 10 via the HDMI cable 1 is enabled. In addition, according to the firewall turn-off sequence illustrated in FIG. 10, when the firewall of the personal computer 10 against the television receiver 30 is turned off and if the television receiver 30 is powered off, turning off of the firewall is automatically canceled.

Another example of the sequence of processes to turn off the firewall of the personal computer 10 against the television receiver 30 is described next with reference to FIG. 12.

(a) When the personal computer 10 is connected to the television receiver 30 using the HDMI cable 1, the +5V power is supplied from the power supply terminal (the +5V Power terminal) of the personal computer 10 to the power supply terminal (the +5V Power terminal) of the television receiver 30 via the HDMI cable 1 (refer to FIG. 5). (b) Accordingly, the HPD terminal of the television receiver 30 and the HPD terminal of the personal computer 10 have about +5 V. Thus, the television receiver 30 and the personal computer 10 detect that they are connected to each other using the HDMI cable 1.

(c) When receiving a request for data transmission using the high-speed data line (the Ether Line), (d) the CPU 51 of the television receiver 30 transmits a CEC Firewall turn-off command to the personal computer 10 using the CEC line of the HDMI cable 1. This command contains the IP address (IP AD) of the television receiver 30 and the port number (Port#) to be opened in the data portion thereof.

(e) The CPU 13 of the personal computer 10 receives the CEC Firewall turn-off command from the television receiver 30 and appropriately performs a Firewall open process. That is, the CPU 13 removes access restriction on the IP address contained in the CEC Firewall turn-off command. In addition, the CPU 13 opens the port having a port number contained in the CEC Firewall turn-off command. (f) Thereafter, upon completion of the Firewall open process, the personal computer 10 transmits a CEC turn-off response command to the television receiver 30 using the CEC line of the HDMI cable 1.

(g) The CPU 51 of the television receiver 30 receives the CEC turn-off response command from the personal computer 10 and recognizes that transmission of a signal using the high-speed data line (the Ether line) is enabled. (h) Thereafter, the CPU 51 performs data communication using the high-speed data line.

(i) Upon completion of data transmission, (j) the CPU 51 of the television receiver 30 transmits a CEC Firewall turn-off completion command to the personal computer 10 using the CEC line of the HDMI cable 1.

(k) The CPU 13 of the personal computer 10 receives the CEC Firewall turn-off completion command from the television receiver 30. (m) Immediately after the CPU 13 receives the CEC Firewall turn-off completion command, the CPU 13 transmits a CEC turn-off completion response command to the television receiver 30. (n) The CPU 51 of the television receiver 30 receives the CEC turn-off completion response command from the personal computer 10 and completes the sequence of firewall turn-off processes.

(p) After a period of time sufficient for the television receiver 30 to receive the CEC turn-off completion response command has elapsed, the CPU 13 of the personal computer 10 cancels turning off of the firewall and performs a Firewall close process. In the Firewall close process, the port that has been open in order to turn off the firewall is closed, and access restriction is resumed on the IP address that has been accessible.

Figure 12:
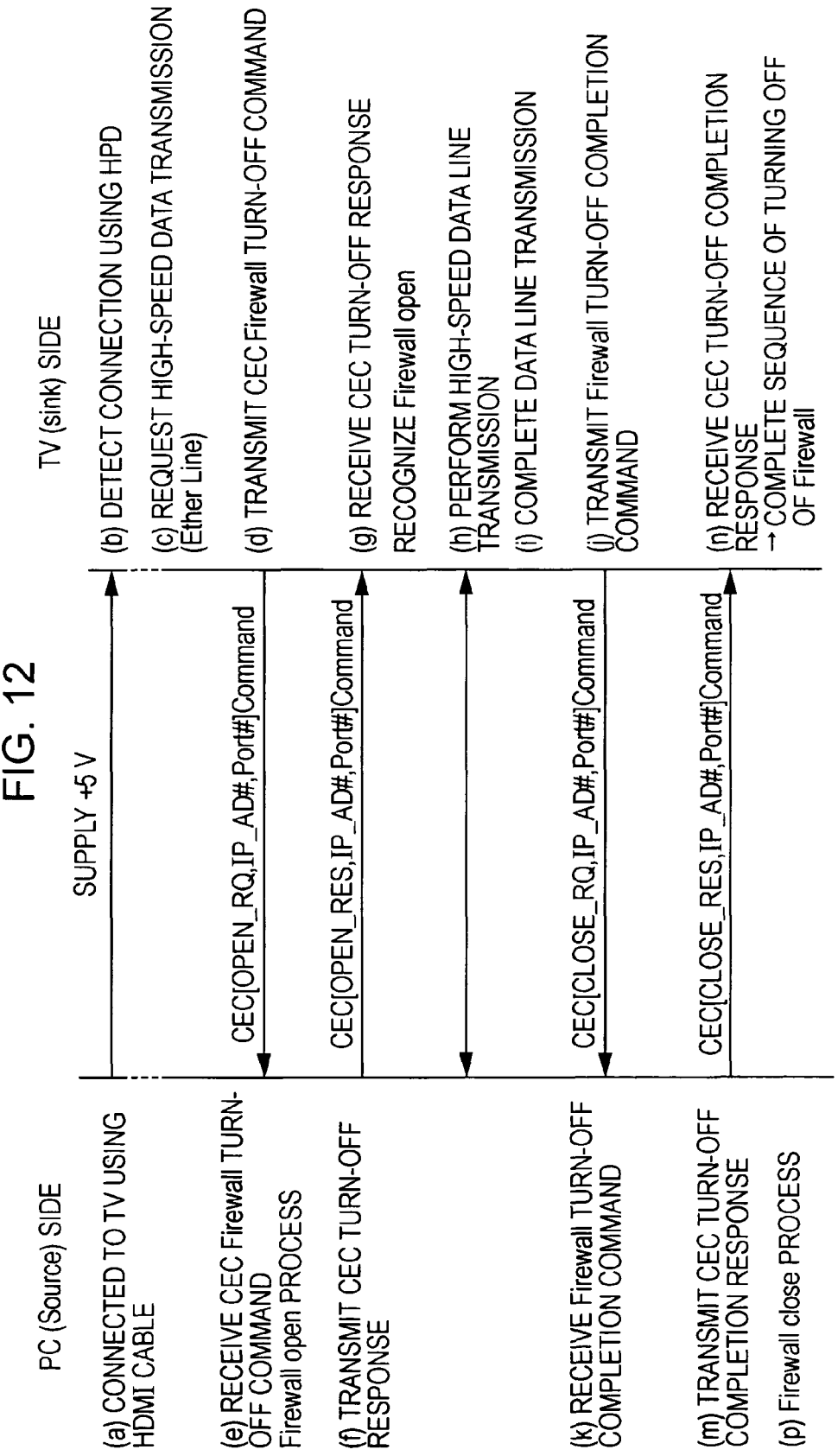
FIG. 12 illustrates a different processing sequence of turning off a firewall of the personal computer against the television receiver.

According to the firewall turn-off sequence illustrated in FIG. 12, upon receiving a request for data transmission using the high-speed data line, the firewall of the personal computer 10 against the television receiver 30 is automatically turned off. Thus, data transmission using the high-speed data line is enabled. In addition, according to the firewall turn-off sequence illustrated in FIG. 12, upon completion of when the firewall of the personal computer 10 against the television receiver 30 is turned off and if the television receiver 30 is powered off, turning off of the firewall is automatically canceled.

Note that, in the sequence of processes for turning off the firewall illustrated in FIG. 12, the sequence of transmission of the CEC Firewall turn-off command starts from the side of the television receiver 30 (refer to FIG. 12(*d*)). However, the sequence of transmission of the CEC Firewall turn-off command may start from the side of the personal computer 10.

Upon receiving a request for data transmission using the high-speed data line, the CPU 13 of the personal computer 10 transmits, to the television receiver 30, a CEC Firewall turn-off command with an IP address and a port number being Null. Upon receiving this CEC Firewall turn-off command, the CPU 51 of the television receiver 30 sets required IP address and port number in the CEC Firewall turn-off command and returns the CEC Firewall turn-off command to the personal computer 10. Subsequently, the same sequence as that illustrated in FIG. 12 is performed.

In addition, when, as described above, the sequence of transmission of the CEC Firewall turn-off command is started from the side of the personal computer 10, the CPU 13 of the personal computer 10 may transmit, to the television receiver 30, a command to instruct the television receiver 30 to start the sequence of transmission of the CEC Firewall turn-off command (e.g., a CEC [open sequence start] Command) instead of transmitting a CEC Firewall turn-off command with an IP address and a port number being Null.

As described above, according to the sequence of transmission of a CEC Firewall turn-off command illustrated in FIGS. 10 and 12, by transmitting a CEC Firewall turn-off command from the television receiver 30 to the personal computer 10, the firewall of the personal computer 10 is automatically and appropriately turned off. Thus, the security and connectivity can be maintained without complicated setting performed by a user. Accordingly, the operability for the user can be increased.

In addition, according to the processing sequence of turning off a firewall illustrated in FIGS. 10 and 12, when the television receiver 30 is connected to the personal computer 10 using the HDMI cable 1, or the personal computer 10 receives a data transmission request using a high-speed data line, the firewall of the personal computer 10 against the television receiver 30 is automatically turned off. Accordingly, the firewall can be turned off at a right time.

Although not illustrated in the sequence of turning off the firewall illustrated in FIGS. 10 and 12, when the firewall of the personal computer 10 against the television receiver 30 is turned off and if connection between the personal computer 10 and the television receiver 30 is disconnected due to abnormal termination of a Firewall close process, the personal computer 10 can detect that the connection is disconnected by detecting HPD. Upon detecting disconnection from the television receiver 30, the personal computer 10 performs the Firewall close process.

In addition, while the foregoing description has been made with reference to firewall turn-off setting in which port setting and IP address setting are performed, only necessary setting (one of port setting and IP address setting) may be performed. In addition, in order to increase the security level, the television receiver 30 may change the port number used for requesting turning off of the firewall to an appropriate number every time communication is started.

In addition, while the sequence of turning off the firewall illustrated in FIGS. 10 and 12 has been described with reference to the case in which the data portion of the CEC Firewall turn-off command contains the IP address and the port number, the following operations may be added in order to increase the security level of the turn-off command transmitted from the television receiver 30 to the personal computer 10 via the CEC line:

(1) In addition to the IP address and the port number, the MAC address, for example, may be added to the data transmitted via the CEC line. Furthermore, combinations thereof may be changed.

(2) Since the information in the CEC line is transmitted to all devices connected to the television receiver 30, it is necessary to take precautions when turn-off data is transmitted. Accordingly, in order to increase the security level (in order to prevent spoofing and schemes), one of the following operations may be further added:

(a) validating only a Firewall turn-off command that has been authenticated, (b) encrypting turn-off data to be transmitted, (c) immediately after Ether connection is established, transmitting port-change data using the ether line and performing stream transmission mainly using that portion, that is, using port setting via the CEC line for introduction to Ether, and (d) changing and turning off the port with the DTCP-IP of the ether line being activated instead of using the CEC line, and (e) performing the above-described operations (a) to (d) at the same time.

Note that, in the AV system 5 shown in FIG. 1, the communication unit that performs bi-directional communication is formed using the reserve line (the Ether-line) and the HPD line (the Ether+ line) of the HDMI cable 1 (refer to FIG. 9). However, the configuration of the communication unit that performs bi-directional communication is not limited thereto. An example of a different configuration is described below. In the following example, the personal computer 10 serves as a source device, and the television receiver 30 serves as a sink device.

Figure 13:
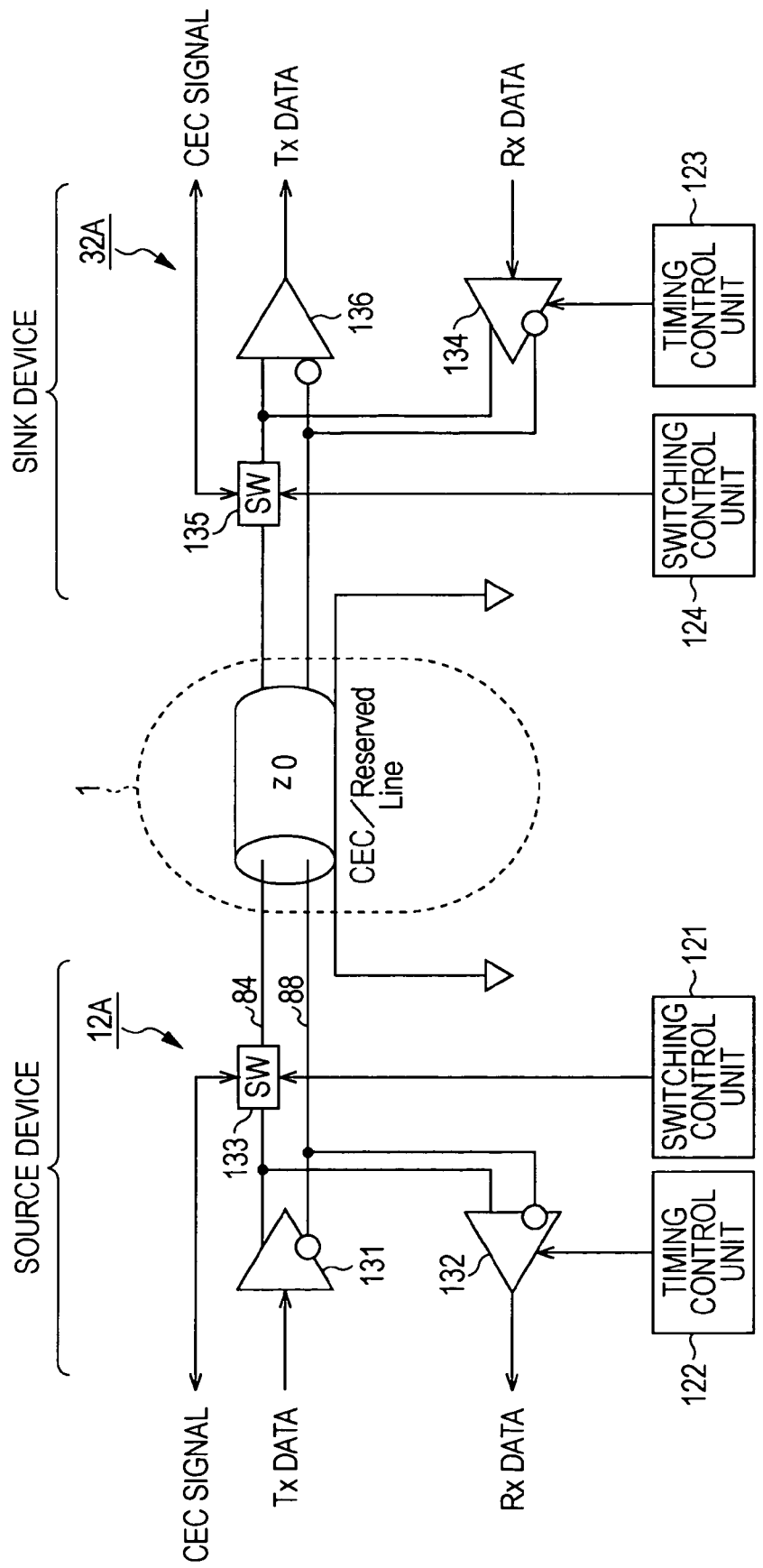
FIG. 13 is a connection diagram illustrating a different example of configurations of the high-speed data line interface of the personal computer and the television receiver.

FIG. 13 illustrates an example in which half-duplex IP communication is performed using the CEC line 84 and the reserve line 88. Note that the same numbering will be used in referring to FIG. 13 as was utilized above in describing FIG. 4. Accordingly, the descriptions thereof are not repeated as appropriate.

The high-speed data line interface 12A of a source device includes a conversion unit 131, a decoding unit 132, a switch 133, a switching control unit 121, and a timing control unit 122. The conversion unit 131 receives Tx data representing data transmitted from the source device to a sink device through bi-directional IP communication performed between the source device and the sink device.

For example, the conversion unit 131 is formed from a differential amplifier. The conversion unit 131 converts the supplied Tx data into a differential signal including two constituent signals. In addition, the conversion unit 131 transmits the differential signal obtained through the conversion to the sink device via the CEC line 84 and the reserve line 88. That is, the conversion unit 131 supplies one of the constituent signals of the differential signal obtained through the conversion to the switch 133 using the CEC line 84 and, more specifically, a signal line that is included in the source device and that is connected to the CEC line 84 of the HDMI cable 1. In addition, the conversion unit 131 supplies the other constituent signal of the differential signal to the sink device using the reserve line 88 and, more specifically, a signal line that is included in the source device and that is connected to the reserve line 88 and the reserve line 88 of the HDMI cable 1.

For example, the decoding unit 132 is formed from a differential amplifier. The input terminals of the decoding unit 132 are connected to the CEC line 84 and the reserve line 88. Under the control of the timing control unit 122, the decoding unit 132 receives a differential signal transmitted from the sink device via the CEC line 84 and the reserve line 88, that is, a differential signal formed from the constituent signal on the CEC line 84 and the constituent signal on the reserve line 88. Thereafter, the decoding unit 132 decodes the differential signal into the Rx data (the original data) and outputs the Rx data. As used herein, the term "Rx data" refers to data transmitted from a sink device to a source device through bi-directional IP communication between the source device and the sink device.

When data is transmitted, the switch 133 receives the CEC signal output from the control unit (the CPU) of the source device or the constituent signal of a differential signal corresponding to the Tx data output from the conversion unit 131. When data is received, the switch 133 receives the CEC signal output from the sink device or the constituent signal of a differential signal corresponding to the Rx data output from the sink device. Under the control of the switching control unit 121, the switch 133 selects one of the CEC signal output from the control unit (the CPU) and the CEC signal output from the sink device or one of the constituent signal of the differential signal corresponding to the Tx data and the constituent signal of the differential signal corresponding to the Rx data. Thereafter, the switch 133 outputs the selected signal.

That is, when the source device transmits data to the sink device, the switch 133 selects one of the CEC signal supplied from the control unit (the CPU) and the constituent signal supplied from the conversion unit 131 and transmits the selected one of the CEC signal and the constituent signal to the sink device via the CEC line 84.

In addition, when the source device receives data transmitted from the sink device, the switch 133 receives one of the CEC signal transmitted from the sink device via the CEC line 84 and the constituent signal of a differential signal corresponding to the Rx data and supplies the received one of the CEC signal and the constituent signal to the control unit (CPU) or the decoding unit 132.

The switching control unit 121 controls the switch 133 so that the switch 133 is switched to select one of the signals supplied to the switch 133. The timing control unit 122 controls timing at which the decoding unit 132 receives the differential signal.

In addition, the high-speed data line interface 32A of the sink device includes a conversion unit 134, a decoding unit 136, a switch 135, a switching control unit 124, and a timing control unit 123. For example, the conversion unit 134 is formed from a differential amplifier. Rx data is supplied to the conversion unit 134. Under the control of the timing control unit 123, the conversion unit 134 converts the supplied Rx data into a differential signal including two constituent signals. Thereafter, the conversion unit 134 transmits the differential signal obtained through the conversion to the source device via the CEC line 84 and the reserve line 88.

That is, the conversion unit 134 supplies one of the constituent signals of the differential signal obtained through the conversion to the switch 135 using the CEC line 84 and, more specifically, a signal line that is included in the sink device and that is connected to the CEC line 84 of the HDMI cable 1. In addition, the conversion unit 134 supplies the other constituent signal of the differential signal to the source device using the reserve line 88 and, more specifically, a signal line that is included in the sink device and that is connected to the reserve line 88 and the reserve line 88 of the HDMI cable 1.

When data is received, the switch 135 receives the CEC signal supplied from the source device or the constituent signal of a differential signal corresponding to the Tx data supplied from the source device. When data is transmitted, the switch 135 receives the constituent signal of a differential signal corresponding to the Rx data supplied from the conversion unit 134 or the CEC signal supplied from the control unit (the CPU) of the sink device. Under the control of the switching control unit 124, the switch 135 selects one of the CEC signal received from the source device and the CEC signal received from the control unit (the CPU) or one of the constituent signal of the differential signal corresponding to the Tx data and the constituent signal of the differential signal corresponding to the Rx data.

That is, when the sink device transmits data to the source device, the switch 135 selects one of the CEC signal supplied from the control unit (the CPU) of the sink device and the constituent signal supplied from the conversion unit 134 and transmits the selected one of the CEC signal and the constituent signal to the source device via the CEC line 84.

In addition, when the sink device receives data from the source device, the switch 135 receives one of the CEC signal transmitted from the source device via the CEC line. 84 and the constituent signal of the differential signal corresponding to the Tx data. Thereafter, the switch 135 transmits the selected one of the CEC signal and the constituent signal to the control unit (the CPU) or the decoding unit 136.

For example, the decoding unit 136 is formed from a differential amplifier. The input terminals of the decoding unit 136 are connected to the CEC line 84 and the reserve line 88. The decoding unit 136 receives a differential signal transmitted from the source device via the CEC line 84 and the reserve line 88, that is, a differential signal formed from the constituent signal on the CEC line 84 and the constituent signal on the reserve line 88. Thereafter, the decoding unit 136 decodes the differential signal into an original Tx data and outputs the Tx data.

The switching control unit 124 controls the switch 135 so that the switch 135 is switched to select one of the signals supplied to the switch 135. The timing control unit 123 controls timing at which the conversion unit 134 transmits the differential signal.

Figure 14:
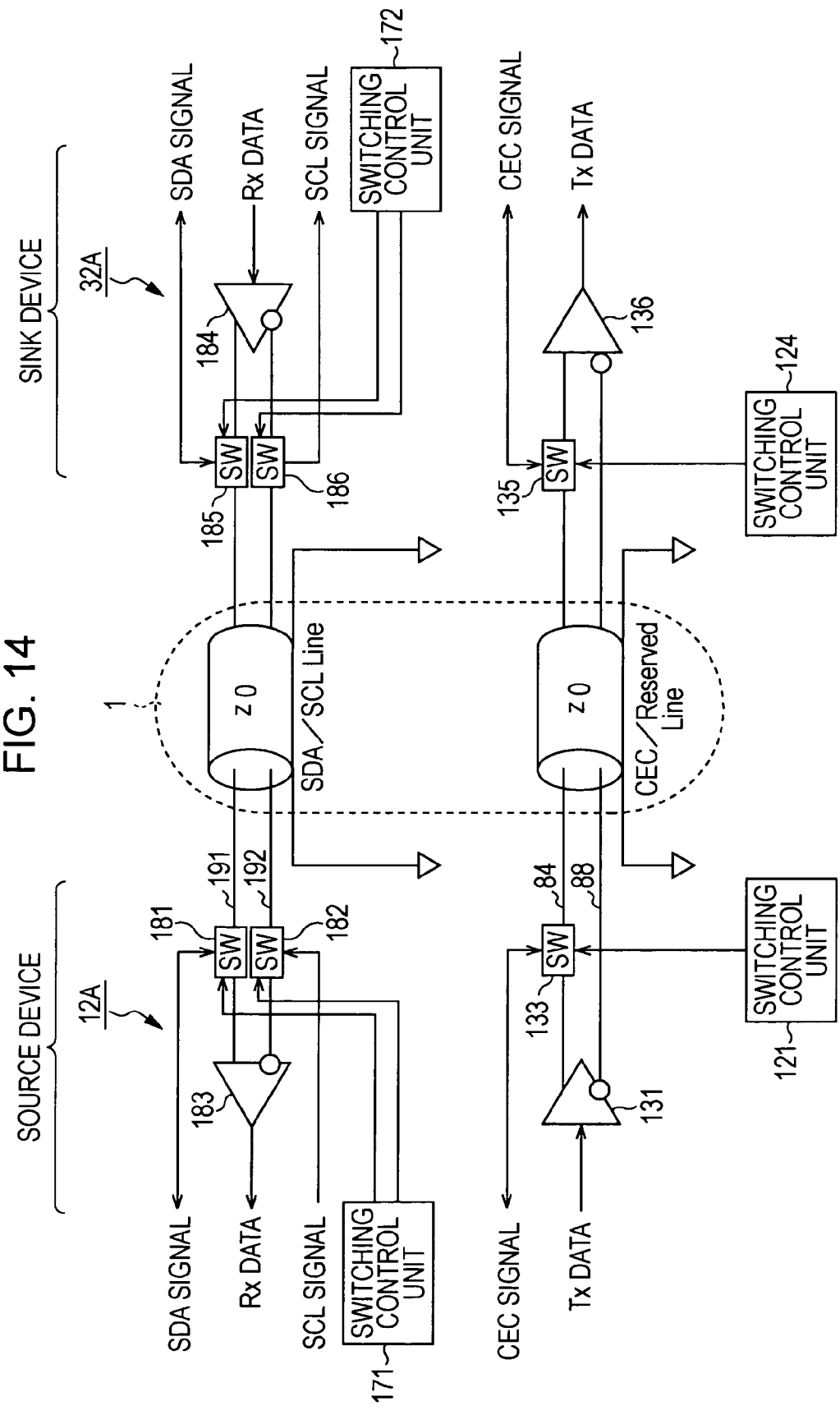
FIG. 14 is a connection diagram illustrating a different example of configurations of the high-speed data line interface of the personal computer and the television receiver.

FIG. 14 illustrates an example in which full-duplex IP communication is performed using a pair consisting of the CEC line 84 and the reserve line 88 and a pair consisting of a signal line through which the SDA signal is transmitted (an SDA line) and a signal line through which the SCL signal is transmitted (an SCL line). Note that the same numbering will be used in referring to FIG. 14 as was utilized above in describing FIG. 13. Accordingly, the descriptions thereof are not repeated as appropriate.

The high-speed data line interface 12A of the source device includes a conversion unit 131, a switch 133, a switch 181, a switch 182, a decoding unit 183, a switching control unit 121, and a switching control unit 171.

When data is transmitted, the switch 181 receives an SDA signal supplied from the control unit (the CPU) of the source device. When data is received, the switch 181 receives an SDA signal supplied from the sink device or the constituent signal of a differential signal corresponding to Rx data supplied from the sink device. Under the control of the switching control unit 171, the switch 181 selects one of the SDA signal received from the control unit (the CPU) and the SDA signal received from the sink device or the constituent signal of a differential signal corresponding to the Rx data. Thereafter, the switch 181 outputs the selected signal.

That is, when the source device receives data transmitted from the sink device, the switch 181 receives one of the SDA signal transmitted from the sink device via an SDA line 191 serving as a signal line that transmits the SDA signal and the constituent signal of the differential signal corresponding to the Rx data. Thereafter, the switch 181 supplies one of the received SDA signal and the constituent signal to the control unit (the CPU) or the decoding unit 183.

In addition, when the source device transmits data to the sink device, the switch 181 transmits the SDA signal supplied from the control unit (the CPU) to the sink device via the SDA line 191. Alternatively, at that time, the switch 181 transmits nothing to the sink device.

When data is transmitted, the switch 182 receives the SCL signal supplied from the control unit (the CPU) of the source device. When data is received, the switch 182 receives the constituent signal of the differential signal corresponding to the Rx data supplied from the sink device. Under the control of the switching control unit 171, the switch 182 selects one of the SCL signal and the constituent signal of the differential signal corresponding to the Rx data and outputs the selected signal.

That is, when the source device receives data transmitted from the sink device, the switch 182 receives the constituent signal of the differential signal corresponding to the Rx data transmitted from the sink device via an SCL line 192 serving as a signal line that transmits the SCL signal and supplies the received constituent signal to the decoding unit 183. Alternatively, at that time, the switch 182 receives nothing.

In addition, when the source device transmits data to the sink device, the switch 182 transmits the SCL signal supplied from the control unit (the CPU) of the source device to the sink device via the SCL line 192. Alternatively, at that time, the switch 182 transmits nothing.

For example, the decoding unit 183 is formed from a differential amplifier. The input terminals of the decoding unit 183 are connected to the SDA line 191 and the SCL line 192. The decoding unit 183 receives a differential signal transmitted from the sink device via the SDA line 191 and the SCL line 192, that is, a differential signal formed from the constituent signal on the SDA line 191 and the constituent signal on the SCL line 192. Thereafter, the decoding unit 183 decodes the differential signal into the Rx data (the original data) and outputs the Rx data.

The switching control unit 171 controls the switch 181 and the switch 182 so that each of the switch 181 and the switch 182 selects one of the supplied signals.

In addition, the high-speed data line interface 32A of the sink device includes a conversion unit 184, a switch 135, a switch 185, a switch 186, a decoding unit 136, a switching control unit 172, and a switching control unit 124.

For example, the decoding unit 184 is formed from a differential amplifier. The conversion unit 184 receives the supplied Rx data. The conversion unit 184 converts the supplied Rx data into a differential signal including two constituent signals. In addition, the conversion unit 184 transmits the differential signal obtained through the conversion to the source device via the SDA line 191 and the SCL line 192. That is, the conversion unit 184 supplies one of the constituent signals of the differential signal obtained through the conversion to the source device via the switch 185 and supplies the other constituent signal to the source device via the switch 186.

When data is transmitted, the switch 185 receives one of the supplied constituent signal of the differential signal corresponding to the Rx data received from the conversion unit 184 and the SDA signal supplied from the control unit (the CPU) of the sink device. When data is received, the switch 185 receives the SDA signal supplied from the source device. Under the control of the switching control unit 172, the switch 185 selects one of the SDA signal received from the control unit (the CPU) and the SDA signal received from the source device or the constituent signal of the differential signal corresponding to the Rx data. Thereafter, the switch 185 outputs the selected signal.

That is, when the sink device receives data transmitted from the source device, the switch 185 receives the SDA signal transmitted from the source device via the SDA line 191 and supplies the received SDA signal to the control unit (the CPU). Alternatively, at that time, the switch 185 receives nothing.

In addition, when the sink device transmits data to the source device, the switch 185 transmits one of the SDA signal supplied from the control unit (the CPU) and the constituent signal supplied from the conversion unit 184 to the source device via the SDA line 191.

When data is transmitted, the switch 186 receives the constituent signal of a differential signal corresponding to the Rx data supplied from the conversion unit 184. When data is received, the switch 186 receives the SCL signal supplied from the source device. Under the control of the switching control unit 172, the switch 186 selects one of the constituent signal of a differential signal corresponding to the Rx data and the SCL signal and outputs the selected signal.

That is, when the sink device receives data transmitted from the source device, the switch 186 receives the SCL signal transmitted from the source device via the SCL line 192 and supplies the received SCL signal to the control unit (the CPU). Alternatively, at that time, the switch 186 receives nothing.

In addition, when the sink device transmits data to the source device, the switch 186 transmits the constituent signal supplied from the conversion unit 184 to the source device via the SCL line 192. Alternatively, at that time, the switch 186 transmits nothing.

The switching control unit 172 controls the switch 185 and the switch 186 so that each of the switch 185 and the switch 186 selects one of the supplied signals.

Note that when the source device and the sink device perform IP communication with each other, it is determined by the configurations of the source device and the sink device whether half-duplex communication or full-duplex communication is available. Accordingly, by referring to the E-EDID received from the sink device, the source device determines whether it should perform half-duplex communication, full-duplex communication, or bi-directional communication through exchange of the CEC signal.

Figure 15:
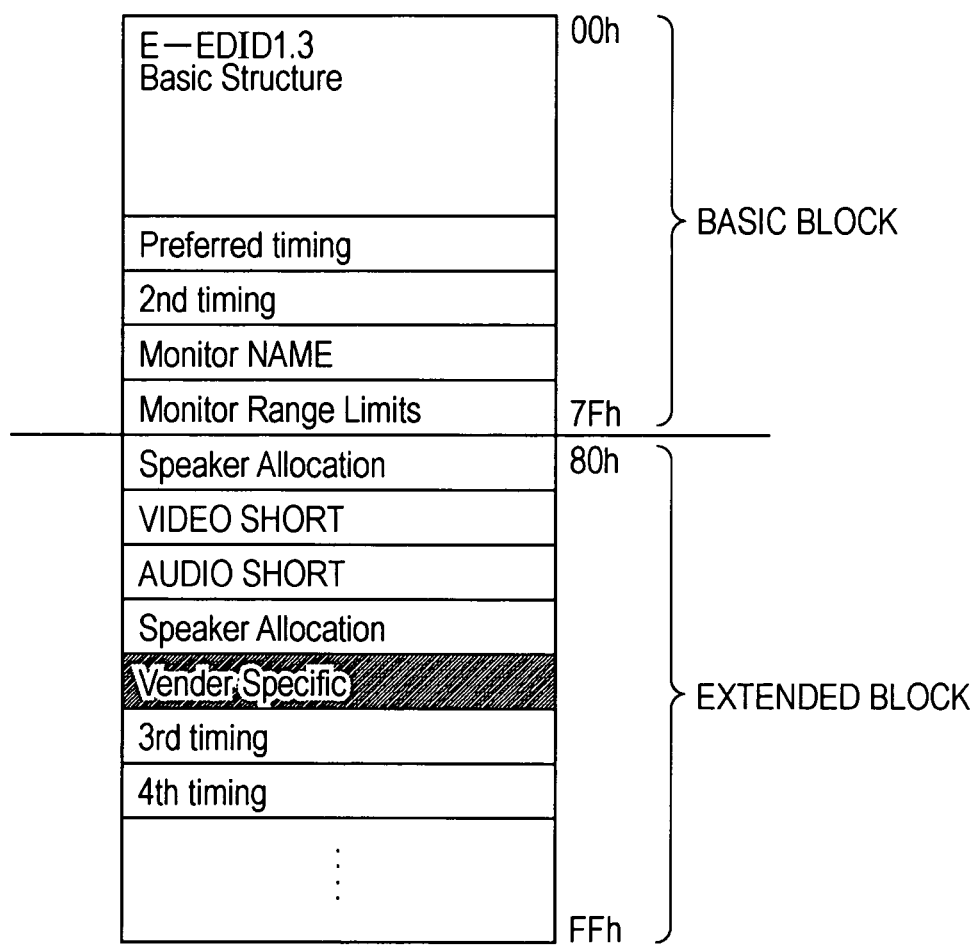
FIG. 15 illustrates the structure of E-EDID received by a source device.

For example, as shown in FIG. 15, the E-EDID received by the source device includes a basic block and an extended block.

Data defined by "E-EDID1.3 Basic Structure" of the E-EDID1.3 standard is placed at the head of the base block of E-EDID, followed by timing information identified by "Preferred timing" for maintaining compatibility with existing EDID and timing information identified by "2nd timing" different from "Preferred timing" for maintaining compatibility with existing EDID.

In addition, in the base block, "2nd timing" is followed by information indicating a display device name identified by "Monitor NAME" and information identified by "Monitor Range Limits" indicating the numbers of displayable pixels when the aspect ratios are 4:3 and 16:9.

In contrast, at the head of the extension block, information on right and left speakers represented by "Speaker Allocation" is placed, followed by: data identified by "VIDEO SHORT" describing information on a displayable image size, a frame rate, interlace or progressive, and data describing an aspect ratio; data identified by "AUDIO SHORT" describing information on a playable audio codec method, a sampling frequency, a cut-off frequency range, the number of codec bits and the like; and information identified by "Speaker Allocation" on right and left speakers.

In addition, in the extension block, "Speaker allocation" is followed by data identified by "Vender Specific" and defined by each vendor, timing information identified by "3rd timing" for maintaining compatibility with existing EDID, and timing information identified by "4th timing" for maintaining compatibility with existing EDID.

Furthermore, data identified by "Vender Specific" has a data structure shown in FIG. 16. That is, the data identified by "Vender Specific" includes 0th to Nth one-byte blocks.

In the 0th block located at the head of the data identified by "Vender Specific", the following information is placed: information identified by "Vendor-Specific tag code (=3) serving as a header that indicates the data area of the data "Vender Specific" and information identified by "Length (=N) representative of the length of the data "Vender Specific".

In addition, information identified by "24 bit IEEE Registration Identifier(0x000C03)LSB first" indicating the number "0x000003" registered for HDMI (R) is placed in the 1st to 3rd blocks. Information representative of the 24-bit physical address (indicated by "A", "B", "C" and "D") of a sink device is placed in the 4th and 5th blocks.

The following information is placed in the 6th block: a flag identified by "Supports-AI" indicating a function that the sink device supports; information identified by "DC-48 bit", "DC-36 bit" and "DC-30 bit" each indicating the number of bits per pixel; a flag identified by "DC-Y444" indicating whether the sink device supports transmission of an image of YCbCr 4:4:4; and a flag identified by "DVI-Dual" indicating whether the sink device supports a dual digital visual interface (DVI).

Furthermore, information identified by "Max-TMDS-Clock" representative of the highest frequency of a TMDS pixel clock is placed in the 7th block. Still furthermore, the following flags are placed in the 8th block: a flag identified by "Latency" indicating presence/absence of delay information regarding video and sound, a full duplex flag identified by "Full Duplex" indicating whether full duplex communication is available, and a half duplex flag identified by "Half Duplex" indicating whether half duplex communication is available.

Here, for example, the full duplex flag that is set (e.g., set to "1") indicates that the sink device has a capability of conducting full duplex communication, that is, the sink device has the configuration shown in FIG. 14, whereas the full duplex flag that is reset (e.g., set to "0") indicates that the sink device does not have a capability of conducting full duplex communication.

Similarly, the half duplex flag that is set (e.g., set to "1") indicates that the sink device has a capability of conducting half duplex communication, i.e., the sink device has the configuration shown in FIG. 13, whereas the half duplex flag that is reset (e.g., set to "0") indicates that the sink device does not have a capability of conducting half duplex communication.

In addition, delay time data of a progressive image identified by "Video Latency" is placed in the 9th block of the data identified by "Vender Specific". Delay time data, identified by "Audio Latency", of audio signals associated with the progressive image is placed in the 10th block. Furthermore, delay time data, identified by "Interlaced Video Latency", of an interlace image is placed in the 11th block. Delay time data, identified by "Interlaced Audio Latency", of audio signals associated with the interlace image is placed in the 12th block.

In accordance with the full duplex flag and the half duplex flag contained in the E-EDID received from the sink device, the source device determines whether it performs the half duplex communication, full duplex communication, or bi-directional communication through exchange of the CEC signal. Thereafter, the source device performs bi-directional communication with the sink device in accordance with the determination result.

For example, if the source device has the configuration shown in FIG. 13, the source device can perform half duplex communication with the sink device shown in FIG. 13. However, the source device cannot perform half duplex communication with the sink device shown in FIG. 14. Accordingly, when the source device is powered on, the source device starts a communication process and performs bi-directional communication in accordance with the capability of the sink device connected to the source device.

Figure 17:
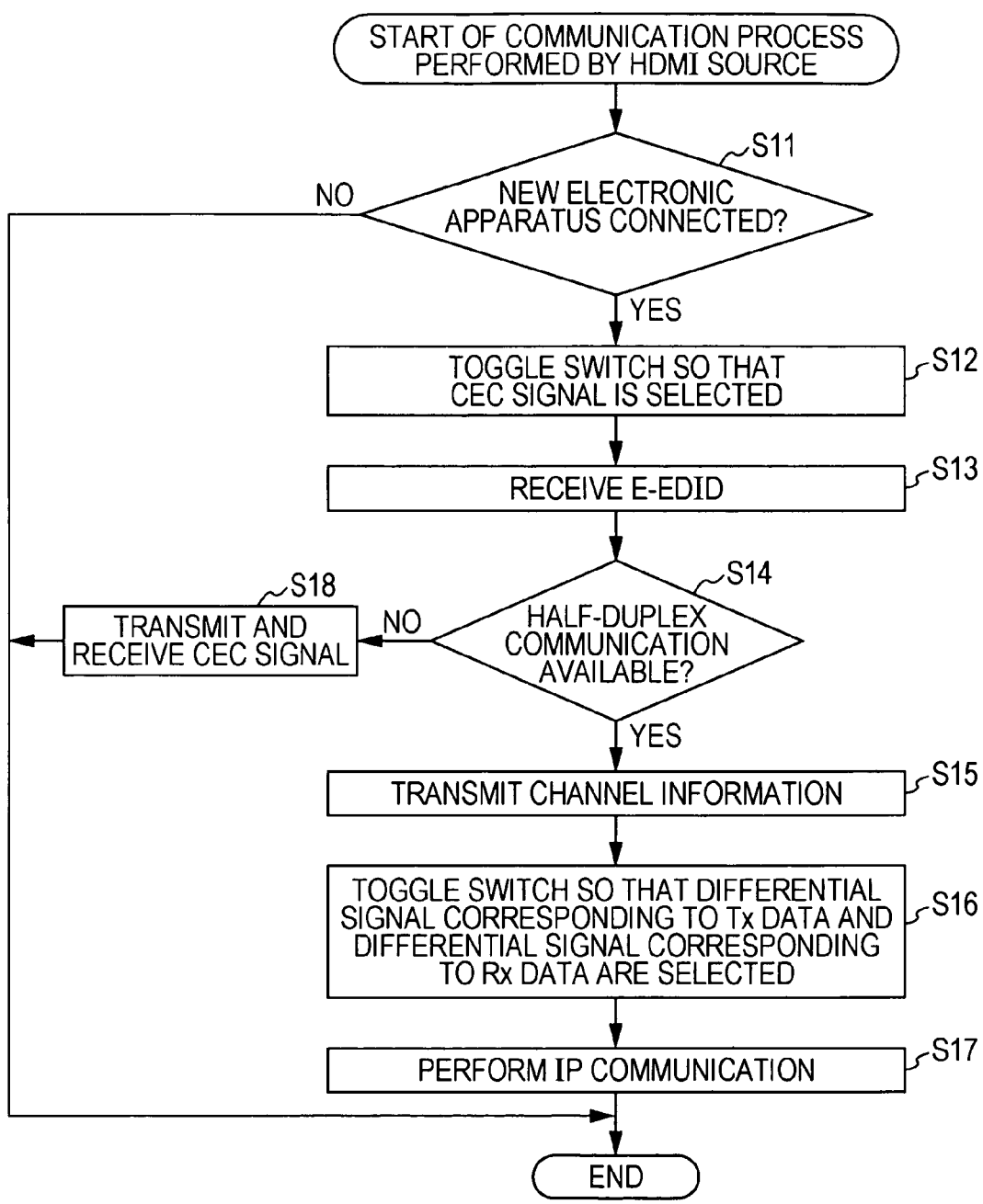
FIG. 17 is a flowchart of a communication process performed by the source device.

The communication process performed by the source device shown in FIG. 13 is described below with reference to the flowchart shown in FIG. 17.

In step S11, the source device determines whether a new electronic apparatus is connected to the source device. For example, the source device determines whether a new electronic apparatus (the sink device) is connected thereto on the basis of the level of a voltage applied to a pin called "Hot Plug Detect" to which the HPD line 86 is connected.

If, in step S11, it is determined that a new electronic apparatus is not connected, communication is not performed. Accordingly, the communication process is completed. However, if, in step S11, it is determined that a new electronic apparatus is connected, the switching control unit 121, in step S12, controls the switch 133 so that the switch 133 is switched to select the CEC signal from the source device when data is transmitted and select the CEC signal supplied from the sink device when data is received.

In step S13, the source device receives E-EDID transmitted from the sink device via the DDC 83. That is, upon detecting connection of the source device, the sink device reads E-EDID from the EDIDROM 85 and transmits the read E-EDID to the source device via the DDC 83. Accordingly, the source device receives the E-EDID transmitted from the sink device.

In step S14, the source device determines whether it can perform half duplex communication with the sink device.

That is, the source device refers to the E-EDID received from the sink device and determines whether the half duplex flag "Half Duplex" shown in FIG. 16 is set. For example, if the half duplex flag is set, the source device determines that it can perform bi-directional IP communication using a half duplex communication method, i.e., half duplex communication.

If, in step S14, it is determined that half duplex communication is available, the source device, in step S15, transmits a signal indicating that IP communication based on a half duplex communication method is to be performed using the CEC line 84 and the reserve line 88, as channel information representative of a channel to be used for the bi-directional communication, to the sink device via the switch 133 and CEC line 84.

That is, if the half duplex flag is set, the source device can know that the sink device has the configuration shown in FIG. 13 and that it can perform half duplex communication using the CEC line 84 and the reserve line 88. Thus, the source device transmits the channel information to the sink device, so that the sink device is informed that half duplex communication is to be performed.

In step S16, the switching control unit 121 controls the switch 133 so that the switch 133 is switched to select the differential signal corresponding to Tx data supplied from the conversion unit 131 when data is transmitted and select the differential signal corresponding to Rx data supplied from the sink device when data is received.

In step S17, each component of the source device performs bi-directional IP communication with the sink device using the half duplex communication method. Thereafter, the communication process is completed. That is, when data is transmitted, the converting unit 131 converts the Tx data supplied from the control unit (the CPU) into a differential signal and supplies one of constituent signals forming the differential signal obtained through the conversion to the switch 133 and the other constituent signal to the sink device via the reserve line 88. The switch 133 transmits the constituent signal supplied from the conversion unit 131 to the sink device via the CEC line 84. In this manner, the differential signal corresponding to the Tx data is transmitted from the source device to the sink device.

In addition, when data is received, the decoding unit 132 receives a differential signal corresponding to the Rx data transmitted from the sink device. That is, the switch 133 receives the constituent signal of the differential signal corresponding to the Rx data transmitted from the sink device via the CEC line 84 and supplies the received constituent signal to the decoding unit 132. Under the control of the timing control unit 122, the decoding unit 132 decodes the differential signal formed from the constituent signal supplied from the switch 133 and the constituent signal supplied from the sink device via the reserve line 88 into the original Rx data. The decoding unit 132 then outputs the original Rx data to the control unit (the CPU).

In this way, the source device exchanges various data, such as control data, pixel data, and audio data, with the sink device.

However, if, in step S14, it is determined that half duplex communication cannot be performed, the source device, in step S18, performs bi-directional communication with the sink device by receiving and transmitting the CEC signal from and to the sink device. Thereafter, the communication process is completed.

That is, when data is transmitted, the source device transmits the CEC signal to the sink device via the switch 133 and the CEC line 84. When data is received, the source device receives the CEC signal transmitted from the sink device via the switch 133 and the CEC line 84. In this way, the source device exchanges the control data with the sink device.

In this manner, the source device refers to the half duplex flag and performs half duplex communication with the sink device capable of performing half duplex communication by using the CEC line 84 and the reserve line 88.

As described above, by switching the switch 133 to select one of transmission data and reception data and performing half duplex communication with the sink device using the CEC line 84 and the reserve line, i.e., IP communication using a half duplex communication method, high-speed bi-directional communication can be performed while maintaining compatibility with existing HDMI.

In addition, like the source device, when the sink device is powered on, the sink device starts a communication process and performs bi-directional communication with the source device.

Figure 18:
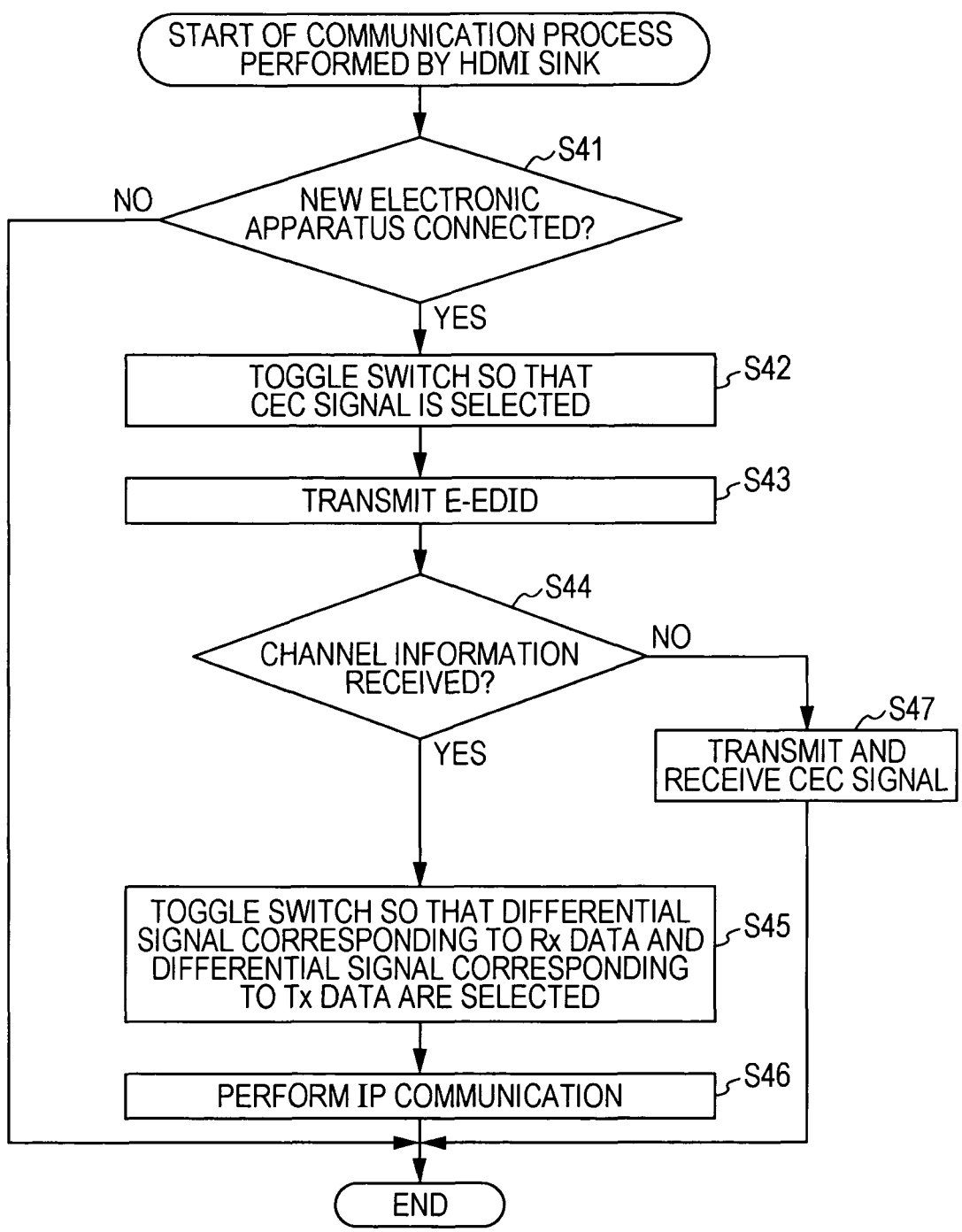
FIG. 18 is a flowchart of a communication process performed by the sink device.

A communication process performed by the sink device shown in FIG. 13 is described below with reference to the flowchart of FIG. 18.

In step S41, the sink device determines whether a new electronic apparatus (a source device) is connected to the sink device. For example, the sink device determines whether a new electronic apparatus is connected on the basis of the level of a voltage applied to the pin called "Hot Plug Detect" and to which the HPD line 86 is connected.

If, in step S41, it is determined that a new electronic apparatus is not connected, communication is not performed. Thereafter, the communication process is completed. However, if, in step S41, it is determined that a new electronic apparatus is connected, the switching control unit 124, in step S42, controls the switch 135 so that the switch 135 is switched to select the CEC signal received from the control unit (the CPU) of the sink device when data is transmitted and select the CEC signal received from the source device when data is received.

In step S43, the sink device reads the E-EDID from the EDIDROM 85 and transmits the readout E-EDID to the source device via the DDC 83.

In step S44, the sink device determines whether channel information transmitted from the source device has been received.

That is, channel information indicating a bi-directional communication channel is transmitted from the source device in accordance with the capabilities of the source device and the sink device. For example, if the source device has the configuration shown in FIG. 13, the source device and sink device can perform half duplex communication using the CEC line 84 and the reserve line 88. Therefore, the channel information indicating that IP communication is performed using the CEC line 84 and the reserve line 88 is transmitted from the source device to the sink device. The sink device receives the channel information transmitted from the source device via the switch 135 and the CEC line 84 and determines that the channel information is received.

In contrast, if the source device lacks half duplex communication capability, the channel information is not transmitted from the source device to the sink device. Accordingly, the sink device determines that the channel information is not received.

If, in step S44, it is determined that the channel information is received, the processing proceeds to step S45, where the switching control unit 124 controls the switch 135 so that the switch 135 is switched to select the differential signal corresponding to the Rx data supplied from the conversion unit 134 when data is transmitted and select the differential signal corresponding to the Tx data supplied from the source device when data is received.

In step S46, the sink device performs bi-directional IP communication with the source device using the half duplex communication method. Thereafter, the communication process is completed. That is, when data is transmitted, under the control of the timing control unit 123, the conversion unit 134 converts the Rx data supplied from the control unit (the CPU) of the sink device into a differential signal. The conversion unit 134 then supplies one of constituent signals forming the differential signal obtained through the conversion to the switch 135 and the other constituent signal to the source device via the reserve line 88. The switch 135 transmits the constituent signal supplied from the conversion unit 134 to the source device via the CEC line 84. In this way, the differential signal corresponding to the Rx data is transmitted from the sink device to the source device.

In addition, when data is received, the decoding unit 136 receives a differential signal corresponding to the Tx data transmitted from the source device. That is, the switch 135 receives the constituent signal of the differential signal corresponding to the Tx data transmitted from the source device via the CEC line 84. The switch 135 then supplies the received constituent signal to the decoding unit 136. The decoding unit 136 decodes the differential signal formed from the constituent signal supplied from the switch 135 and the constituent signal supplied from the source device via the reserve line 88 into the original Tx data. Thereafter, the decoding unit 136 outputs the original Tx data to the control unit (the CPU).

In this manner, the sink device exchanges various data, such as control data, pixel data, and audio data, with the source device.

However, if, in step S44, it is determined that the channel information is not received, the sink device, in step S47, performs bi-directional communication with the source device by receiving and transmitting the CEC signal from and to the source device. Thereafter, the communication process is completed.

That is, when data is transmitted, the sink device transmits the CEC signal to the source device via the switch 135 and the CEC line 84. When data is received, the sink device receives the CEC signal transmitted from the source device via the switch 135 and the CEC line 84. In this way, the sink device exchanges the control data with the source device.

In this manner, upon receiving the channel information, the sink device performs half duplex communication with the sink device by using the CEC line 84 and the reserve line 88.

As described above, by switching the switch 135 so that the switch 135 is switched to select one of transmission data and reception data and performing half duplex communication with the source device using the CEC line 84 and the reserve line 88, the sink device can perform high-speed bi-directional communication with the source device while maintaining compatibility with existing HDMI.

In addition, when the source device has the configuration shown in FIG. 14 and the source device performs a communication process, the source device determines whether the sink device has a full duplex communication capability on the basis of the full duplex flag contained in the E-EDID. The source device then performs bi-directional communication in accordance with the determination result.

Figure 19:
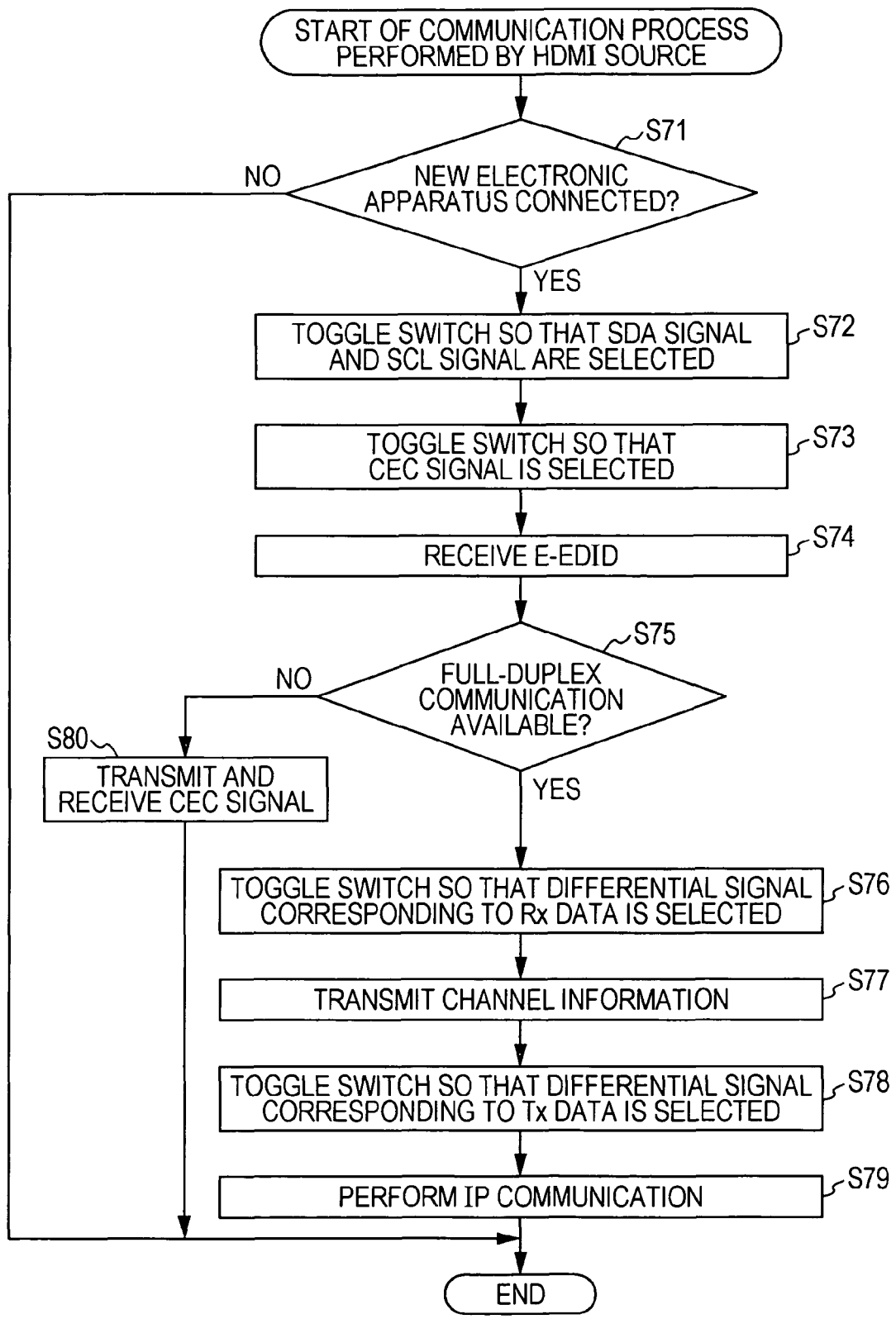
FIG. 19 is a flowchart of a communication process performed by the source device.

A communication process performed by the source device shown in FIG. 14 is described below with reference to the flowchart shown in FIG. 19.

In step S71, the source device determines whether a new electronic apparatus is connected to the source device. If, in step S71, it is determined that a new electronic apparatus is not connected, communication is not performed. Therefore, the communication process is completed.

In contrast, if, in step S71, it is determined that a new electronic apparatus is connected, the switching control unit 171, in step S72, controls the switch 181 and switch 182 so that, when data is transmitted, the switch 181 selects the SDA signal supplied from the control unit (the CPU) of the source device and the switch 182 selects the SCL signal supplied from the control unit (the CPU) of the source device and, when data is received, the switch 181 selects the SDA signal supplied from the sink device.

In step S73, the switching control unit 121 controls the switch 133 so that the switch 133 is switched to select the CEC signal supplied from the control unit (the CPU) of the source device when data is transmitted and select the CEC signal supplied from the sink device when data is received.

In step S74, the source device receives the E-EDID transmitted from the sink device via the SDA line 191 of the DDC 83. That is, upon detecting connection of the source device, the sink device reads the E-EDID from the EDIDROM 85 and transmits the readout E-EDID to the source device via the SDA line 191 of the DDC 83. Accordingly, the source device receives the E-EDID transmitted from the sink device.

In step S75, the source device determines whether it can perform full duplex communication with the sink device. That is, the source device refers to the E-EDID received from the sink device and determines whether the full duplex flag "Full Duplex" shown in FIG. 16 is set. For example, if the full duplex flag is set, the source device determines that it can perform bi-directional IP communication using a full duplex communication method, that is, full duplex communication.

If, in step S75, it is determined that full duplex communication can be performed, the switching control unit 171, in step S76, controls the switches 181 and 182 so that the switches 181 and 182 are switched to select the differential signal corresponding to the Rx data from the sink device when data is received.

That is, when data is received, the switching control unit 171 controls switching of the switches 181 and 182 so that, of the constituent signals forming the differential signal corresponding to the Rx data transmitted from the sink device, the constituent signal transmitted via the SDA line 191 is selected by the switch 181, and the constituent signal transmitted via the SCL line 192 is selected by the switch 182.

After the E-EDID is transmitted from the sink device to the source device, the SDA line 191 and the SCL line 192 forming the DDC 83 are not used, that is, transmission and reception of the SDA signal and the SCL signal via the SDA line 191 and the SCL line 192 are not performed. Therefore, by switching the switches 181 and 182, the SDA line 191 and the SCL line 192 can be used as transmission lines of the Rx data for full duplex communication.

In step S77, as channel information indicating a channel to be used for bi-directional communication, the source device transmits, to the sink device via the switch 133 and the CEC line 84, a signal indicating that IP communication based on a full duplex communication method is to be performed using a pair consisting of the CEC line 84 and the reserve line 88 and a pair consisting of the SDA line 191 and the SCL line 192.

That is, if the full duplex flag is set, the source device can know that the sink device has the configuration shown in FIG. 14 and that full duplex communication can be performed using a pair consisting of the CEC line 84 and the reserve line 88 and a pair consisting of the SDA line 191 and the SCL line 192. Accordingly, the source device transmits the channel information to the sink device in order to inform the sink device that full duplex communication is performed.

In step S78, the switching control unit 121 controls the switch 133 so that the switch 133 is switched to select the differential signal corresponding to the Tx data from the conversion unit 131 when data is transmitted. That is, the switching control unit 121 switches the switch 133 so that the switch 133 selects the constituent signal of the differential signal supplied from the conversion unit 131 and corresponding to the Tx data.

In step S79, the source device performs bi-directional IP communication with the sink device using the full duplex communication method. Thereafter, the communication process is completed. That is, when data is transmitted, the conversion unit 131 converts the Tx data supplied from the control unit (the CPU) of the source device into a differential signal. The converting unit 131 then supplies one of constituent signals forming the differential signal obtained through the conversion to the switch 133 and the other constituent signal to the sink device via the reserve line 88. The switch 133 transmits the constituent signal supplied from the conversion unit 131 to the sink device via the CEC line 84. In this manner, the differential signal corresponding to the Tx data is transmitted from the source device to the sink device.

In addition, when data is received, the decoding unit 183 receives a differential signal corresponding to the Rx data transmitted from the sink device. That is, the switch 181 receives the constituent signal of the differential signal corresponding to the Rx data transmitted from the sink device via the SDA line 191. Thereafter, the switch 181 supplies the received constituent signal to the decoding unit 183. In addition, the switch 182 receives the other constituent signal of the differential signal corresponding to the Rx data transmitted from the sink device via the SCL line 192. Thereafter, the switch 182 supplies the received constituent signal to the decoding unit 183. The decoding unit 183 decodes the differential signal formed from the constituent signals supplied from the switches 181 and 182 into the original Rx data and outputs the original Rx data to the control unit (the CPU).

In this manner, the source device exchanges various data, such as control data, pixel data, and audio data, with the sink device.

However, if, in step S75, it is determined that full duplex communication cannot be performed, the source device, in step S80, performs bi-directional communication with the sink device by receiving and transmitting the CEC signal from and to the sink device. Thereafter, the communication process is completed.

That is, when data is transmitted, the source device transmits the CEC signal to the sink device via the switch 133 and the CEC line 84 and, when data is received, the source device receives the CEC signal transmitted from the sink device via the switch 133 and the CEC line 84. Thus, the source device communicates the control data with the sink device.

In this manner, the source device refers to the full duplex flag and performs full duplex communication with the sink device capable of performing full duplex communication by using the pair consisting of the CEC line 84 and the reserve line 88 and the pair consisting of the SDA line 191 and the SCL line 192.

As described above, by switching the switches 133, 181 and 182, selecting transmission data and reception data, and performing full duplex communication with the sink device by using the pair consisting of the CEC line 84 and the reserve line 88 and the pair consisting of the SDA line 191 and the SCL line 192, high-speed bi-directional communication can be performed while maintaining compatibility with existing HDMI.

As in the case of the sink device shown in FIG. 13, even when the sink device has the configuration shown in FIG. 14, the sink device executes a communication process so as to perform bi-directional communication with the source device.

Figure 20:
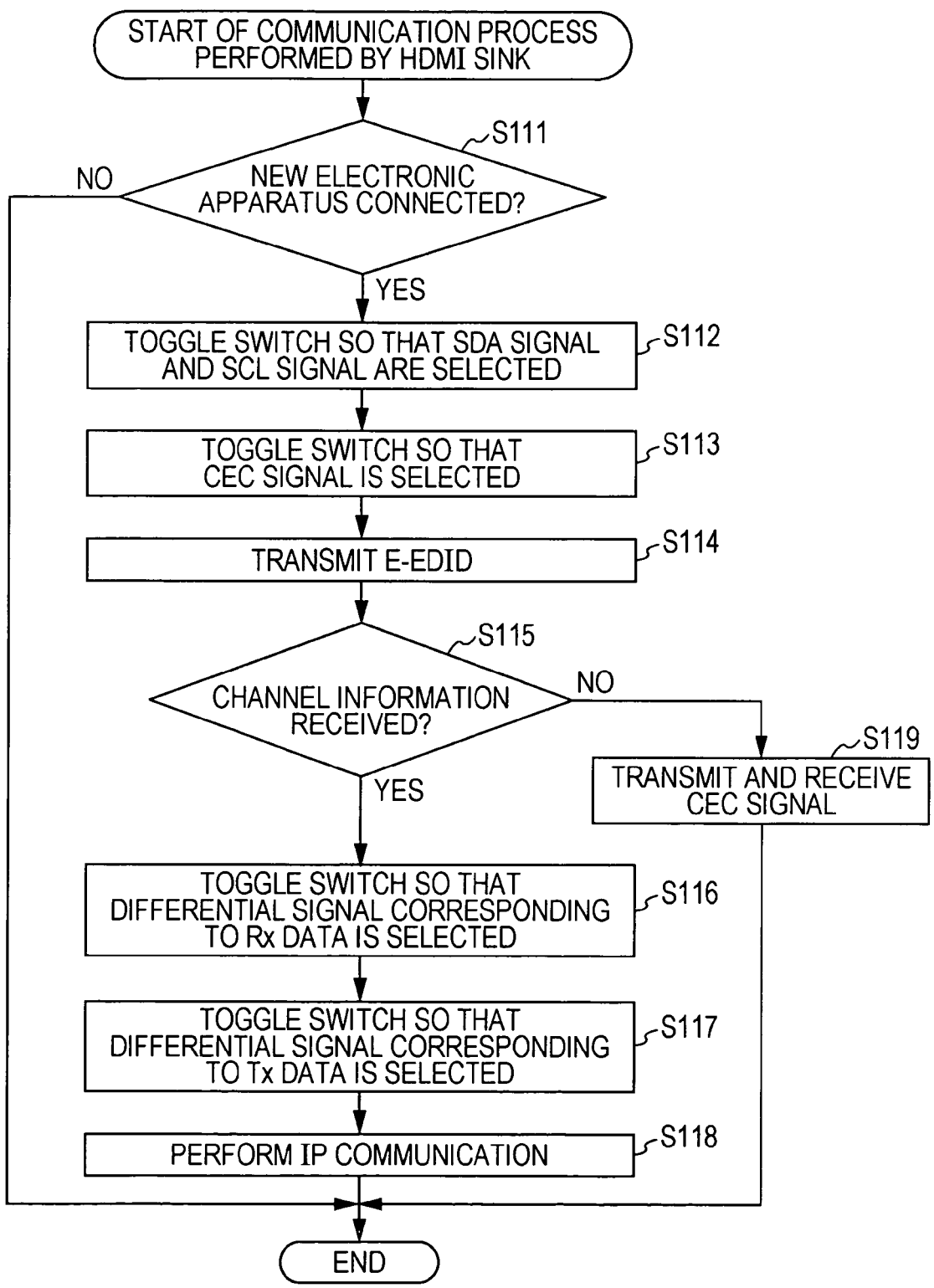
FIG. 20 is a flowchart of a communication process performed by the sink device.

A communication process performed by the sink device shown in FIG. 14 is described below with reference to the flowchart of FIG. 20.

In step S111, the sink device determines whether a new electronic apparatus (a source device) is connected to the sink device. If, in step S111, it is determined that a new electronic apparatus is not connected, communication is not performed. Therefore, the communication process is completed.

In contrast, if, in step S111, it is determined that a new electronic apparatus is connected, the switching control unit 172, in step S112, controls switching of the switches 185 and 186 so that, when data is transmitted, the switch 185 selects the SDA signal supplied from the control unit (the CPU) of the sink device and, when data is received, the switch 185 selects the SDA signal supplied from the source device and the switch 186 selects the SCL signal supplied from the source device.

In step S113, the switching control unit 124 controls the switch 135 so that the switch 135 is switched to select the CEC signal supplied from the control unit (the CPU) of the sink device when data is transmitted and select the CEC signal supplied from the source device when data is received.

In step S114, the sink device reads the E-EDID from the EDIDROM 85 and transmits the readout E-EDID to the source device via the switch 185 and the SDA line 191 of the DDC 83.

In step S115, the sink device determines whether channel information transmitted from the source device has been received.

That is, channel information indicating a bi-directional communication channel is transmitted from the source device in accordance with the capabilities of the source device and sink device. For example, when the source device has the configuration shown in FIG. 13, the source device and sink device can perform full duplex communication. Accordingly, the source device transmits, to the sink device, channel information indicating that IP communication based on a full duplex communication method is to be performed using the pair consisting of the CEC line 84 and the reserve line 88 and the pair consisting of the SDA line 191 and the SCL line 192. Consequently, the sink device receives the channel information transmitted from the source device via the switch 135 and the CEC line 84 and determines that the channel information is received.

However, if the source device does not have the full duplex communication capability, the channel information is not transmitted from the source device to the sink device. Accordingly, the sink device determines that the channel information has not been received.

If, in step S115, it is determined that the channel information has been received, the processing proceeds to step S116, where the switching control unit 172 controls switching of the switches 185 and 186 so that the switches 185 and 186 select the differential signal corresponding to the Rx data supplied from the conversion unit 184 when data is transmitted.

In step S117, the switching control unit 124 controls switching of the switch 135 so that the switch 135 selects the differential signal corresponding to the Tx data supplied from the source device when data is received.

In step S118, the sink device performs bi-directional IP communication with the source device using a full duplex communication method. Thereafter, the communication process is completed. That is, when data is transmitted, the conversion unit 184 converts the Rx data supplied from the control unit (the CPU) of the sink device into a differential signal and supplies one of constituent signals forming the differential signal obtained through the conversion to the switch 185 and supplies the other constituent signal to the switch 186. The switches 185 and 186 transmit the constituent signals supplied from the conversion unit 184 to the source device via the SDA line 191 and the SCL line 192. In this manner, the differential signal corresponding to the Rx data is transmitted from the sink device to the source device.

In addition, when data is received, the decoding unit 136 receives the differential signal corresponding to the Tx data transmitted from the source device. That is, the switch 135 receives the constituent signal of the differential signal corresponding to the Tx data transmitted from the source device via the CEC line 84. Thereafter, the switch 135 supplies the received constituent signal to the decoding unit 136. The decoding unit 136 decodes the differential signal formed from the constituent signal supplied from the switch 135 and the constituent signal supplied from the source device via the reserve line 88 into the original Tx data. Thereafter, the decoding unit 136 outputs the original Tx data to the control unit (the CPU).

In this manner, the sink device exchanges various data, such as control data, pixel data, and audio data, with the source device.

However, if, in step S115, it is determined that the channel information has not been received, the sink device, in step S119, performs bi-directional communication with the source device by receiving and transmitting the CEC signal from and to the source device. Thereafter, the communication process is completed.

In this manner, upon receiving the channel information, the sink device performs full duplex communication with the sink device using the pair consisting of the CEC line 84 and the reserve line 88 and the pair consisting of the SDA line 191 and the SCL line 192.

As described above, by switching the switches 135, 185 and 186 so as to select transmission data and reception data and performing full duplex communication with the source device using the pair consisting of the CEC line 84 and the reserve line 88 and the pair consisting of the SDA line 191 and the SCL line 192, the sink device can perform high-speed bi-directional communication while maintaining compatibility with existing HDMI.

While, in the configuration of the source device shown in FIG. 14, the conversion unit 131 is connected to the CEC line 84 and the reserve line 88 and the decoding unit 183 is connected to the SDA line 191 and the SCL line 192, the configuration may be used in which the decoding unit 183 is connected to the CEC line 84 and the reserve line 88 and the conversion unit 131 is connected to the SDA line 191 and the SCL line 192.

Even in such a case, the switches 181 and 182 are connected to the CEC line 84 and the reserve line 88, respectively. The switches 181 and 182 are further connected to the decoding unit 183. The switch 133 is connected to the SDA line 191, and the switch 133 is further connected to the converting unit 131.

Similarly, in the configuration of the sink device shown in FIG. 14, the conversion unit 184 may be connected to the CEC line 84 and the reserve line 88, and the decoding unit 136 may be connected to the SDA line 191 and the SCL line 192.

In this case, the switches 185 and 186 are connected to the CEC line 84 and the reserve line 88, respectively. The switches 185 and 186 are further connected to the conversion unit 184. The switch 135 is connected to the SDA line 191, and the switch 135 is further connected to the decoding unit 136.

Furthermore, in FIG. 13, the CEC line 84 and the reserve line 88 may serve as the SDA line 191 and the SCL line 192. That is, the conversion unit 131 and the decoding unit 132 of the source device and the conversion unit 134 and decoding unit 136 of the sink device may be connected to the SDA line 191 and the SCL line 192 so that the source device and the sink device perform IP communication using a half duplex communication method. Still furthermore, in such a case, connection of an electronic apparatus may be detected by using the reserve line 88.

Furthermore, each of the source device and the sink device may have the half duplex communication capability and the full duplex communication capability. In such a case, the source device and the sink device can perform IP communication using a half duplex communication method or a full duplex communication method in accordance with the capability of the connected electronic apparatus.

Figure 21:
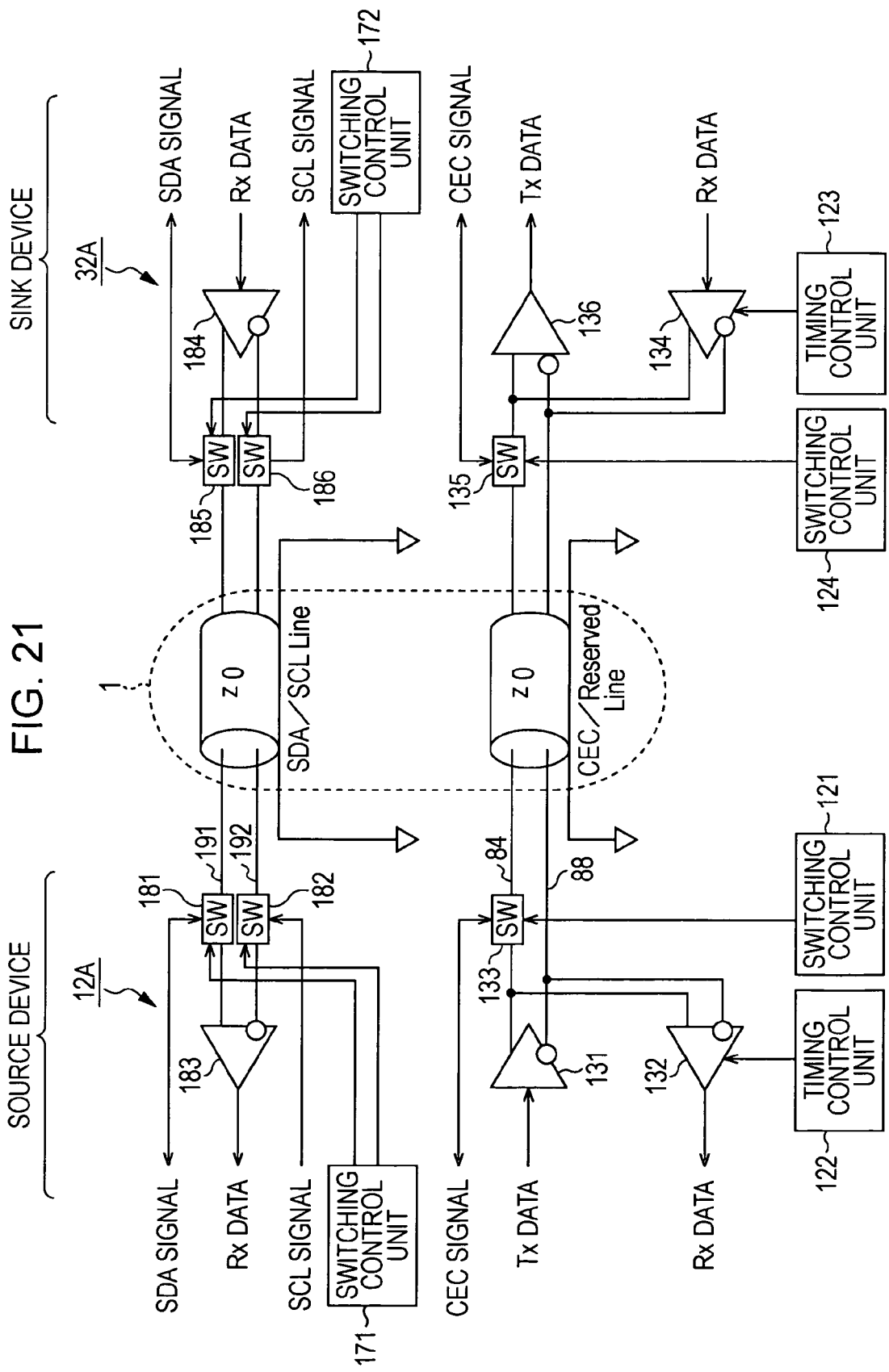
FIG. 21 is a connection diagram illustrating a different example of configurations of the high-speed data line interface of the personal computer and the television receiver.

If each of the source device and the sink device has the half duplex communication capability and the full duplex communication capability, the source device and the sink device are configured, for example, as shown in FIG. 21. Note that the same numbering is used in describing FIG. 21 as was used in describing FIG. 13 or 14, and the description thereof are not repeated where appropriate.

The high-speed data line interface 12A of a source device includes a conversion unit 131, a decoding unit 132, a switch 133, a switch 181, a switch 182, a decoding unit 183, a switching control unit 121, a timing control unit 122, and a switching control unit 171. That is, unlike the high-speed data line interface 12A of the source device shown in FIG. 14, the high-speed data line interface 12A of the source device shown in FIG. 21 further includes the timing control unit 122 and the decoding unit 132 shown in FIG. 13.

In addition, the high-speed data line interface 12A of the sink device shown in FIG. 21 includes a conversion unit 134, a switch 135, a decoding unit 136, a conversion unit 184, a switch 185, a switch 186, a timing control unit 123, a switching control unit 124, and a switching control unit 172. That is, unlike the sink device shown in FIG. 14, the sink device shown in FIG. 21 further includes the timing control unit 123 and the conversion unit 134 shown in FIG. 13.

The communication process performed by the source device and the sink device shown in FIG. 21 is described next.

Figure 22:
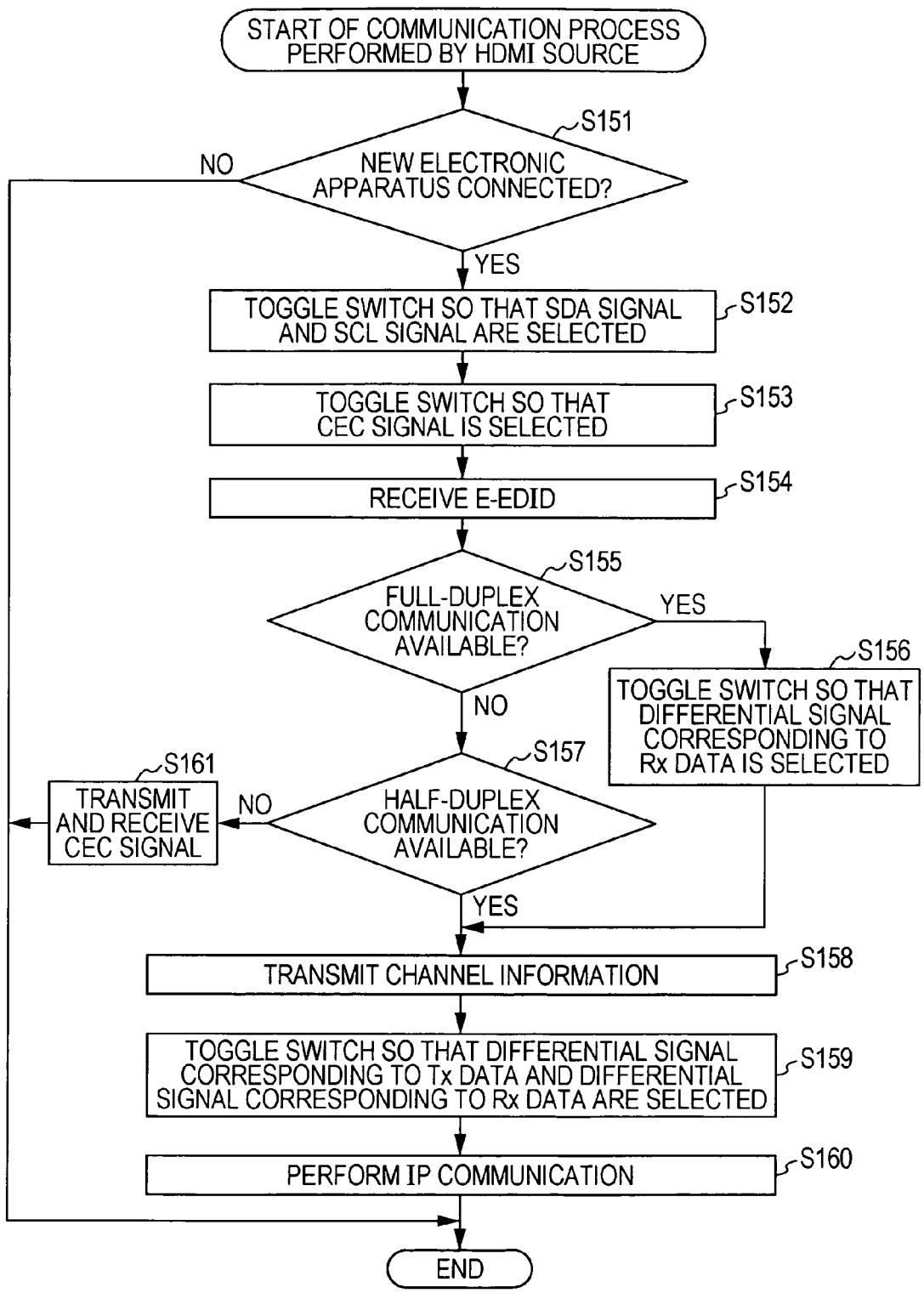
FIG. 22 is a flowchart of a communication process performed by the source device.

The communication process performed by the source device shown in FIG. 21 is described first with reference to a flowchart illustrated in FIG. 22. Note that the processes performed in steps S151 to S154 are the same as those in steps S71 to S74 illustrated in FIG. 19, respectively. Accordingly, the descriptions thereof are not repeated.

In step S155, the source device determines whether it can perform full-duplex communication with the sink device. That is, the source device refers to E-EDID received from the sink device and determines whether the full duplex flag "Full Duplex" as shown in FIG. 16 is set or not.

If, in step S155, it is determined that full-duplex communication can be performed, that is, if it is determined that the sink device shown in FIG. 21 or 14 is connected to the source device, the switching control unit 171, in step S156, controls the switches 181 and 182 so that the switches 181 and 182 are switched to select the differential signal corresponding to Rx data supplied from the sink device when data is received.

However, if, in step S155, it is determined that full-duplex communication cannot be performed, the source device, in step S157, determines whether half-duplex communication can be performed. That is, the source device refers to the received E-EDID and determines whether the half duplex flag "Half Duplex" as shown in FIG. 16 is set or not. That is, the source device determines whether the sink device shown in FIG. 13 is connected to the source device.

If, in step S157, it is determined that half duplex communication can be performed, or if, in step S156, the switches 181 and 182 are switched, the source device, in step S158, transmits channel information to the sink device via the switch 133 and the CEC line 84.

Here, if, in step S155, it is determined that full duplex communication can be performed, the sink device has a full duplex communication capability. Accordingly, the source device transmits, to the source device via the switch 133 and the CEC line 84, a signal indicating that IP communication is to be performed using a pair consisting of the CEC line 84 and the reserve line 88 and a pair consisting of the SDA line 191 and the SCL line 192 as channel information.

However, if, in step S157, it is determined that half duplex communication can be performed, the sink device has a half duplex communication capability although it does not have a full duplex communication capability. Accordingly, the source device transmits, to the sink device via the switch 133 and the CEC line 84, a signal indicating that IP communication is performed using the CEC line 84 and the reserve line 88, as channel information.

In step S159, the switching control unit 121 controls the switch 133 so that the switch 133 is switched to select the differential signal corresponding to the Tx data from the conversion unit 131 when data is transmitted and to select the differential signal corresponding to the Rx data transmitted from the sink device when data is received. Note that when the source device and the sink device perform full duplex communication, the differential signal corresponding to the Rx data is not transmitted from the sink device via the CEC line 84 and the reserve line 88 when the source device receives data. Accordingly, the differential signal corresponding to the Rx data is not supplied to the decoding unit 132.

In step S160, the source device performs bi-directional IP communication with the sink device. Thereafter, the communication process is completed.

That is, when the source device performs full duplex communication and half duplex communication with the sink device, the conversion unit 131 converts the Tx data supplied from the control unit (the CPU) of the source device into a differential signal when data is transmitted. The converting unit 131 then transmits one of constituent signals forming the differential signal obtained through the conversion to the sink device via the switch 133 and the CEC line 84 and transmits the other constituent signal to the sink device via the reserve line 88.

In addition, when the source device performs full duplex communication with the sink device and if data is received, the decoding unit 183 receives the differential signal corresponding to the Rx data transmitted from the sink device and decodes the received differential signal into the original Rx data. Thereafter, the decoding unit 183 outputs the original Rx data to the control unit (the CPU).

In contrast, when the source device performs half duplex communication with the sink device and if data is received, the decoding unit 132 receives the differential signal corresponding to the Rx data transmitted from the sink device under the control of the timing control unit 122. Thereafter, the decoding unit 132 decodes the received differential signal into the original Rx data and outputs the original Rx data to the control unit (the CPU).

In this manner, the source device exchanges various data, such as control data, pixel data, and audio data, with the sink device.

However, if, in step S157, it is determined that half duplex communication cannot be performed, the source device, in step S161, performs bi-directional communication with the sink device by receiving and transmitting the CEC signal via the CEC line 84. Thereafter, the communication process is completed.

In this manner, the source device refers to the full duplex flag and the half duplex flag and performs full or half duplex communication with the sink device in accordance with the capability of the sink device, which is a communication partner.

As described above, by switching the switches 133, 181 and 182 in accordance with the capability of the sink device serving as a communication partner so as to select transmission data and reception data and performing full or half duplex communication with the sink device, a more suitable communication method can be selected and high-speed bi-directional communication can be performed while maintaining compatibility with existing HDMI.

Figure 23:
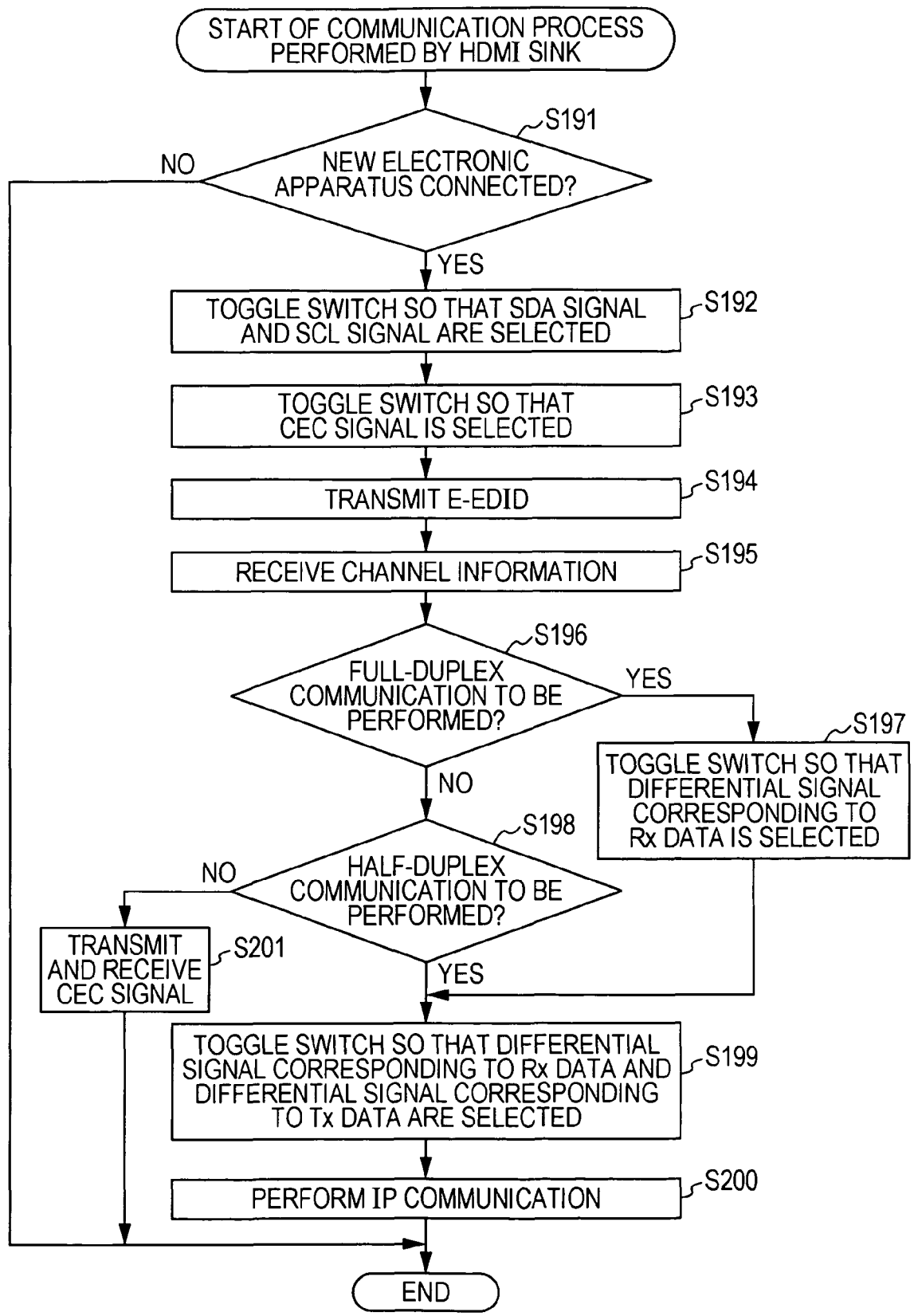
FIG. 23 is a flowchart of a communication process performed by the sink device.

A communication process performed by the sink device shown in FIG. 21 is described next with reference to the flowchart shown in FIG. 23. Note that processes performed in steps S191 to S194 are the same as those performed in steps S111 to S114 shown in FIG. 20, respectively, and therefore, the descriptions thereof are not repeated.

In step S195, the sink device receives channel information transmitted from the source device via the switch 135 and the CEC line 84. If the source device connected to the sink device has neither the full duplex communication capability nor the half duplex communication capability, the channel information is not transmitted from the source device to the sink device. Accordingly, the sink device does not receive the channel information.

In step S196, the sink device determines whether full duplex communication is to be performed or not on the basis of the received channel information. For example, if the sink device receives the channel information indicating that IP communication is to be performed using the pair consisting of the CEC line 84 and the reserve line 88 and the pair consisting of the SDA line 191 and the SCL line 192, the sink device determines that full duplex communication is to be performed.

If, in step S196, it is determined that full duplex communication is to be performed, the switching control unit 172, in step S197, controls the switches 185 and 186 so that the switches 185 and 186 are switched to select the differential signal corresponding to Rx data supplied from the conversion unit 184 when data is transmitted.

However, if, in step S196, it is determined that full duplex communication is not performed, the sink device, in step S198, determines whether half duplex communication is to be performed on the basis of the received channel information. For example, if the sink device receives the channel information indicating that IP communication using the CEC line 84 and the reserve line 88 is performed, the sink device determines that half duplex communication is to be performed.

If, in step S198, it is determined that half duplex communication is to be performed or if, in step S197, the switches 185 and 186 are switched, the switching control unit 124, in step S199, controls the switch 135 so that the switch 135 is switched to select the differential signal corresponding to Rx data supplied from the conversion unit 134 when data is transmitted and select the differential signal corresponding to Tx data supplied from the source device when data is received.

Note that, if the source device and the sink device perform full duplex communication, the differential signal corresponding to Rx data is not transmitted from the conversion unit 134 to the transmitter 81 when data is transmitted in the sink device. Therefore, the differential signal corresponding to Rx data is not supplied to the switch 135.

In step S200, the sink device performs bi-directional IP communication with the source device. Thereafter, the communication process is completed.

That is, when the sink device and the source device perform full duplex communication and if data is transmitted, the conversion unit 184 converts Rx data supplied from the control unit (the CPU) of the sink device into a differential signal. Thereafter, the converting unit 184 supplies one of constituent signals forming the converted differential signal to the source device via the switch 185 and the SDA line 191 and supplies the other constituent signal to the source device via the switch 186 and the SCL line 192.

In addition, when the sink device and the source device perform half duplex communication and if data is transmitted, the conversion unit 134 converts the Rx data supplied from the control unit (the CPU) of the sink device into a differential signal. Thereafter, the conversion unit 134 transmits one of constituent signals forming the converted differential signal to the transmitter 81 via the switch 135 and the CEC line 84 and transmits the other constituent signal to the source device via the reserve line 88.

Furthermore, when the sink device and the source device perform full duplex communication and half duplex communication and if data is received, the decoding unit 136 receives the differential signal corresponding to Tx data transmitted from the source device. Thereafter, the decoding unit 136 decodes the received differential signal into the original Tx data and outputs the original Tx data to the control unit (the CPU).

However, if, in step S198, it is determined that half duplex communication is not performed, that is, if, for example, the channel information is not transmitted, the sink device, in step S201, performs bi-directional communication with the source device by receiving and transmitting the CEC signal from and to the source device. Thereafter, the communication process is completed.

In this manner, the sink device performs full duplex communication or half duplex communication in accordance with the received channel information, that is, in accordance with the capability of the source device, which is the communication partner.

As described above, by switching the switches 135, 185 and 186 so as to select transmission data and reception data in accordance with the capability of the communication partner source device and performing full duplex communication or half duplex communication, a more suitable communication method can be selected and high-speed bi-directional communication can be performed while maintaining compatibility with existing HDMI (R).

In addition, by connecting the source device to the sink device using the HDMI cable 1 which contains the CEC line 84 and the reserve line 88 twisted together to form a shielded differential pair and connected to the ground line and the SDA line 191 and the SCL line 192 twisted together to form a shielded differential pair and connected to the ground line, high-speed bi-directional IP communication based on a half duplex communication method or a full duplex communication method can be performed while maintaining compatibility with an existing HDMI cable.

As described below, the above-described series of processes can be realized by dedicated hardware or software. When the series of processes are realized by software, the program forming the software is installed in, for example, a microcomputer that controls the source device and the sink device.

Figure 24:
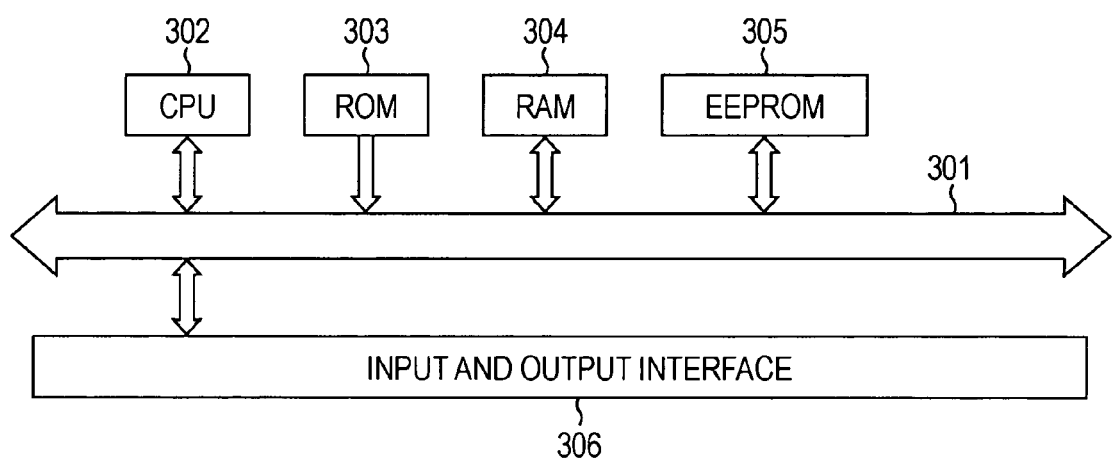
FIG. 24 is a block diagram illustrating an example of the configuration of a computer according to the present invention.

Accordingly, FIG. 24 illustrates an example of the configuration of a computer having a program for executing the above-described series of processes installed therein, according to an embodiment.

The program can be prerecorded in a recording medium, such as an EEPROM (Electrically Erasable Programmable Read-only Memory) 305 or a ROM 303, incorporated in the computer.

Alternatively, the program can be temporarily or perpetually stored (recorded) in a removable recording medium, such as a CD-ROM (Compact Disc Read Only Memory), an MO (Magneto Optical) disc, a DVD (Digital Versatile Disc), a magnetic disk, or a semiconductor memory. Such a removable recording medium can be provided in the form of so-called package software.

Note that, in addition to being installed from the above-described removable recording medium into the computer, the program can be wirelessly transferred from a download site to the computer via an artificial satellite for digital satellite broadcasting or can be transferred wired to the computer via a network, such as a LAN or the Internet. Subsequently, the computer can receive the transferred program using an input and output interface 306 and install the program in a built-in EEPROM 305.

The computer incorporates a CPU (Central Processing Unit) 302. The input and output interface 306 is connected to the CPU 302 via a bus 301. The CPU 302 loads the program stored in a ROM (Read Only Memory) 303 or an EEPROM 305 into a RAM (Random Access Memory) 304. Thereafter, the CPU 302 executes the program. In this way, the CPU 302 executes the processes in accordance with the above-described flowcharts or the processes performed in the configurations shown in the above-described block diagrams.

In this specification, processing steps that describe the program for causing a computer to execute various processes need not be executed in the sequence described in the flowcharts, but may contain processes to be executed in parallel or independently (e.g., parallel processing or a process based on objects). In addition, the program may be executed by a single computer or executed by a plurality of computers in a distributed processing manner.

Figure 25:
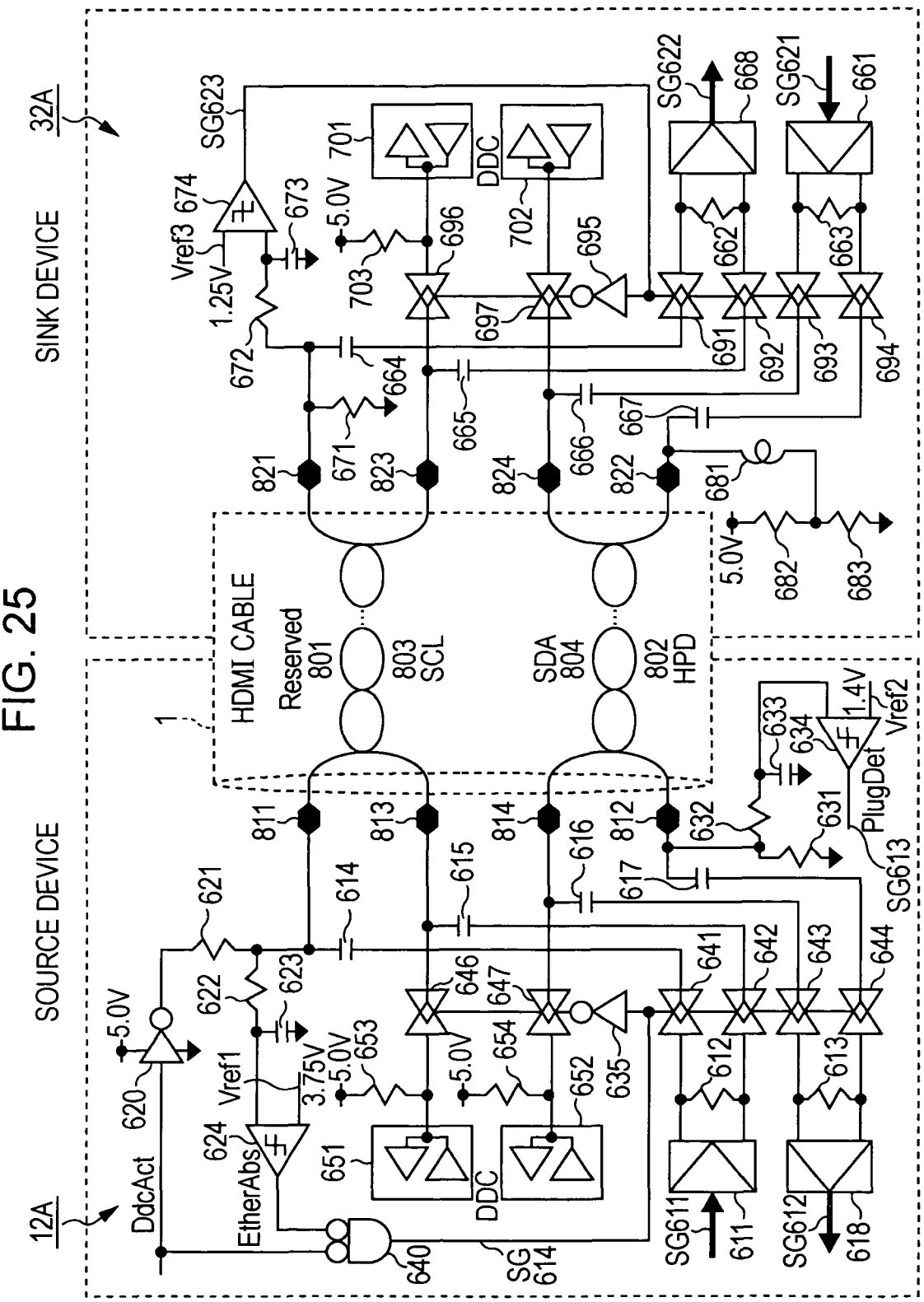
FIG. 25 is a connection diagram illustrating a different example of configurations of the high-speed data line interface of the personal computer and the television receiver.

While the above-described example of the configuration illustrated in FIG. 9 can form a circuit for LAN communication regardless of the electrical specification defined for DDC, FIG. 25 illustrates a different example of the configuration that can provide the same advantage.

The configuration of this example is characterized in that, in an interface that uses a single cable for transmitting video and audio data, exchanging connected device information, authenticating a connected device, communicating device control data, and performing LAN communication, the LAN communication is performed through unidirectional communication via two pairs of differential transmission lines, the connection state of the interface is notified using the bias potential of at least one of the transmission paths, and at least two transmission paths are used for exchange of the connected device information and communication of authentication information in a time multiplexed manner along with the LAN communication.

The source device includes a LAN signal transmitter circuit 611, terminating resistors 612 and 613, AC coupling capacitors 614 to 617, a LAN signal receiver circuit 618, an inverter 620, a resistor 621, a resistor 622 and a capacitor 623 forming a lowpass filter, a comparator 624, a pull-down resistor 631, a resistor 632 and a capacitor 633 forming a lowpass filter, a comparator 634, a NOR gate 640, analog switches 641 to 644, an inverter 645, analog switches 646 and 747, DDC transceivers 651 and 652, and pull-up resistors 653 and 654.

In addition, a sink device 602 includes a LAN signal transmitter circuit 661, terminating resistors 662 and 663, AC coupling capacitors 664 to 667, a LAN signal receiver circuit 668, a pull-down resistor 671, a resistor 672 and a capacitor 673 forming a lowpass filter, a comparator 674, a choke coil 681, resistors 682 and 683 connected in series between the power supply potential and the reference potential, analog switches 691 and 694, an inverter 695, analog switches 696 and 697, DDC transceivers 701 and 702, and pull-up resistors 703 and 704.

An HDMI cable 1 contains a differential transmission line formed from a reserve line 801 and an SCL line 803 and a differential transmission line formed from an SDA line 804 and an HPD line 802. In addition, the HDMI cable 1 has terminals 811 to 814 formed on the source side and terminals 821 to 824 formed on the sink side.

The reserve line 801 and the SCL line 803 are wired so as to form a differential twisted pair. In addition, the SDA line 804 and the HPD line 802 are wired so as to form a differential twisted pair.

In the source device, the terminals 811 and 813 are connected to, via the AC coupling capacitors 614 and 605 and the analog switches 641 and 642, the LAN signal transmitter circuit 611 and the terminating resistor 612 for transmitting a LAN transmission signal SG611 to the sink. The terminals 814 and 812 are connected, via the AC coupling capacitors 616 and 617 and the analog switches 643 and 644, to the receiver circuit 618 and the terminating resistor 613 for receiving a LAN signal from the sink device.

In the sink device, the terminals 821 to 824 are connected, via the AC coupling capacitors 664, 665, 666 and 667 and the analog switches 691 to 694, to the transmitter circuit 661, the receiver circuit 668, and the terminating resistors 662 and 663. The analog switches 641 to 644 and the analog switches 691 to 694 are made conductive when LAN communication is performed and are made open when DDC communication is performed.

The source device connects the terminals 813 and 814 to the DDC transceivers 651 and 652 and the pull-up resistors 653 and 654 via the different analog switches 646 and 647, respectively.

The sink device connects the terminals 823 and 824 to the DDC transceivers 701 and 702 and the pull-up resistor 703 via the analog switches 696 and 697, respectively. The analog switches 646 and 647 are made conductive when DDC communication is performed and are made open when LAN communication is performed.

The recognition mechanism of an e-HDMI compatible apparatus using the potential of the reserve line 801 is basically the same as that of the example illustrated in FIG. 9, except that the resistor 62 of the source device 601 is driven by the inverter 620.

When an input to the inverter 620 is HIGH, the resistor 621 functions as a pull-down resistor providing a 0-V mode from the viewpoint of the sink device 602, as in the case where an e-HDMI incompatible apparatus is connected. As a result, a signal SG623 indicating an e-HDMI compatibility identification result of the sink device becomes LOW so that the analog switches 691 to 694 controlled by the signal SG623 are made open, whereas the analog switches 696 and 697 controlled by a signal obtained by inverting the signal SG623 using the inverter 695 are made conductive. As a result, the sink device 602 enters a mode in which the SCL line 803 and the SDA line 804 are disconnected from the LAN transceiver and are connected to the DDC transceiver.

On the other hand, in the source device, an input to the inverter 620 is also input to the NOR gate 640 so that the output SG614 of the NOR gate 640 becomes LOW. The analog switches 641 to 644 controlled by the output signal SG614 output from the NOR gate 640 are made open, whereas the analog switches 646 and 647 controlled by a signal obtained by inverting the signal SG614 using the inverter 645 are made conductive. As a result, the source device 601 also enters a mode in which the SCL line 803 and the SDA line 804 are disconnected from the LAN transceiver and are connected to the DDC transceiver.

In contrast, when an input to the inverter 620 is LOW, each of the source device and the sink device enters a mode in which the SCL line 803 and the SDA line 804 are disconnected from the DDC transceiver and are connected to the LAN transceiver.

The circuits 631 to 634 and the circuits 681 to 683 used for examining connection using the DC bias potential of the HPD line 802 have the functions that are the same as those of the example shown in FIG. 9. That is, in addition to performing the above-described LAN communication, by using the DC bias level, the HPD Line 802 sends, to the source device, information indicating that the cable 1 is connected to the sink device. When the cable 1 is connected to the sink device, the resistors 682 and 683 and the choke coil 681 in the sink device apply a bias to the HPD line 802 via the terminal 822 so that the HPD line 802 is biased at about 4 V.

The source device extracts the DC bias of the HPD line 802 using the lowpass filter formed from the resistor 632 and the capacitor 633 and compares the DC bias with the reference potential Vref2 (e.g., 1.4 V) using the comparator 634. If the cable 1 is not connected to the sink device, the potential of the terminal 812 is lower than the reference potential Vref2 due to the presence of the pull-down resistor 631. However, if the cable 1 is connected to the sink device, the potential is higher than the reference potential Vref2. Therefore, an output signal SG613 output from the comparator 634 being HIGH indicates that the cable 1 is connected to the sink device. In contrast, the output signal SG613 output from the comparator 634 being LOW indicates that the cable 1 is not connected to the sink device.

As described above, according to the example of the configuration illustrated in FIG. 25, in the interface that uses a single cable for performing data transmission of video data and audio data, exchange and authentication of connected device information, communication of device control data, and LAN communication, the LAN communication is performed through unidirectional communication via two pairs of differential transmission lines, and a connection state of the interface is notified by the DC bias potential of at least one of the transmission lines. Furthermore, at least two transmission lines are used for communication of exchange and authentication of connected device information in a time multiplexed manner along with LAN communication. Accordingly, time multiplexing is available in which the time during which the SCL line and the SDA line are connected to the LAN communication circuit is separated from the time during which the SCL line and the SDA line are connected to the DDC circuit. This division allows a LAN communication circuit to be formed independently from the electrical specifications defined for the DDC, and therefore, stable and reliable LAN communication can be realized at low cost.

Note that, in SDA and SCL, communication is performed at 1.5 KΩ pull-up for H and at a low impedance for L. In addition, in CEC, communication is performed at 27 KΩ pull-up for H and at a low impedance for L. If these functions are maintained in order to maintaining compatibility with existing HDMI, sharing of a LAN function for high-speed data communication that requires impedance matching at terminating ends of a transmission line may be difficult.

The example configurations illustrated in FIGS. 9 and 25 can solve such a problem. That is, in the example configuration illustrated in FIG. 9, full duplex communication is performed by using pair bi-directional communication using a differential pair of the reserve line and the HPD line without using the SDA, SCL and CEC lines. In addition, in the example configuration illustrated in FIG. 25, two differential pairs are formed using the HPD line, the SDA line, the SCL line, and the reserve line. Unidirectional communication is performed by each of the pairs so that two-pair full duplex communication is performed.

FIGS. 26(A) to 26(E) are diagrams illustrating the waveforms of bi-directional communication in the example configurations illustrated in FIG. 9 or 25.

Figure 26:
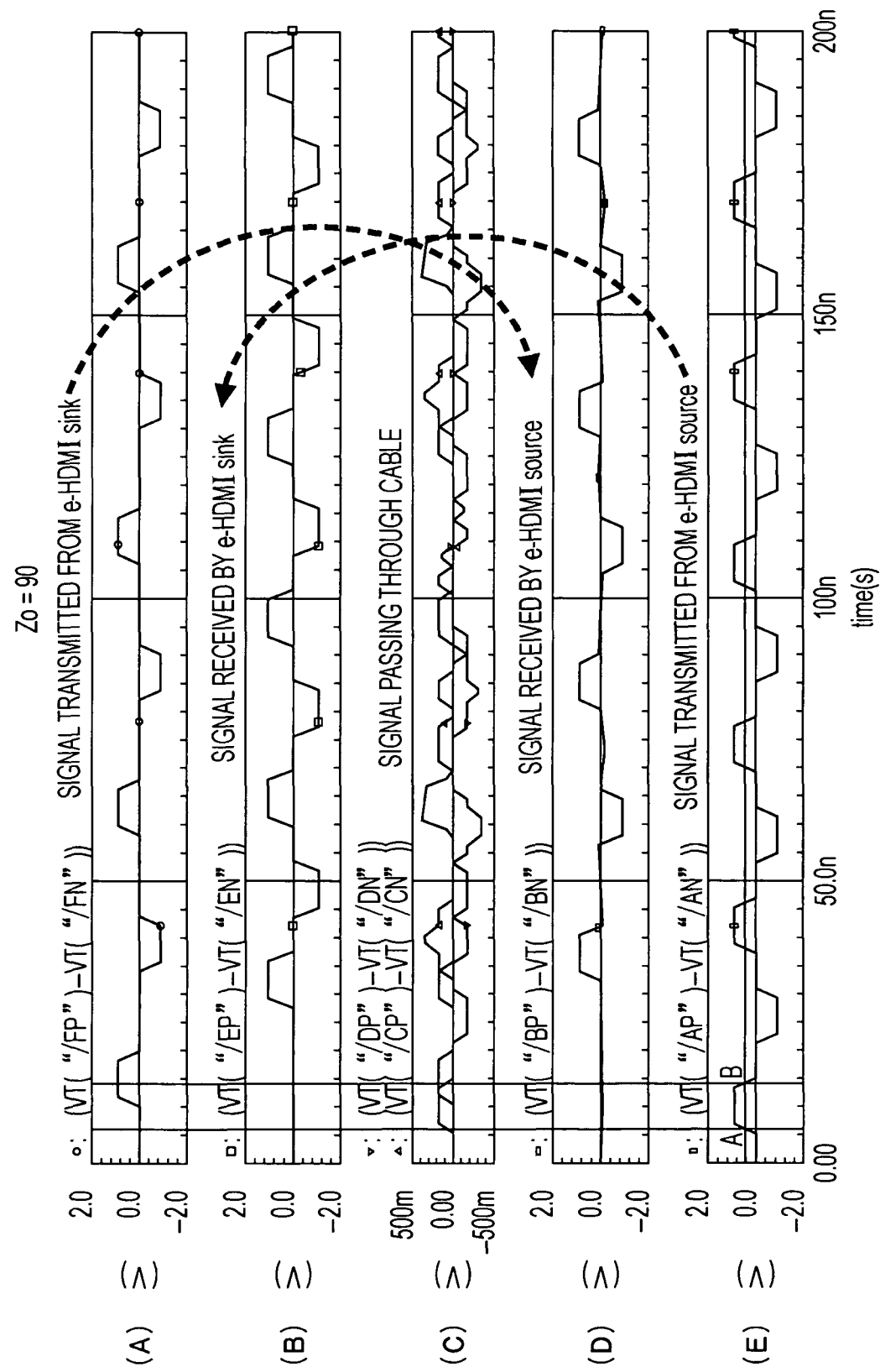
FIG. 26 illustrates the waveforms for performing bi-directional communication.

FIG. 26(A) illustrates the waveform of a signal transmitted from the source device. FIG. 26(B) illustrates the waveform of a signal received by the sink device. FIG. 26(C) illustrates the waveform of a signal passing through the cable. FIG. 26(D) illustrates the waveform of a signal received by the source device. FIG. 26(E) illustrates the waveform of a signal transmitted from the source device. As can be seen from FIG. 26, according to the example configuration illustrated in FIG. 9 or 25, excellent bi-directional communication can be realized.

Note that, while, in the foregoing embodiments, descriptions have been made with reference to a transmission path that connects a personal computer (a source device) to a television receiver (a sink device) based on an HDMI standard interface, the transmission path can be applied to a similar transmission standard. In addition, while the descriptions have been made with reference to the example in which the personal computer 10 serves as a source device while the television receiver 30 serves as a sink device, the present invention can be similarly applied to an AV system including different electronic apparatuses.

In addition, while the foregoing embodiments have been described with reference to the example in which bi-directional IP communication is performed between a source device and a sink device, the bi-directional communication can be performed using a protocol other than the IP protocol. Furthermore, while the foregoing embodiments have been described with reference to the example in which electronic apparatuses are connected to each other using an HDMI cable, the present invention can be similarly applied to the case in which electronic apparatuses are wirelessly connected to each other.

INDUSTRIAL APPLICABILITY

According to the present invention, the connectivity can be maintained without decreasing the security level, and the usability can be increased for users. For example, the present invention is applicable to an AV system in which a television receiver is connected to a personal computer using an HDMI cable.

The invention claimed is:

1. An electronic apparatus, comprising:
a signal receiver configured to receive a video signal from an external apparatus via a transmission path using a plurality of channels and a differential signal;
a communication network interface configured to perform bi-directional communication using predetermined lines forming the transmission path;
a command transmitting circuitry configured to transmit, over a control data line other than the predetermined lines to the external apparatus, in response to a determination using a first line of the predetermined lines that the electronic apparatus is connected to the external apparatus, a firewall turn-off command for requesting turning off of a firewall against the communication unit, wherein the firewall turn-off command is transmitted using the control data line of the transmission path; and wherein the firewall turn-off command contains an internet protocol address, a port number, a MAC address and a vendor specific command, and the firewall against the communication unit is automatically turned off at the external apparatus by a firewall open process in response to receipt of the firewall turn-off command at the external apparatus; and
a response receiving circuitry configured to receive, from the external apparatus over the control data line other than the predetermined lines, a firewall turn-off response indicating that the firewall against the communication network interface is turned off,
wherein in response to the firewall turn-off response being received over the control data line other than the predetermined lines by the response receiving circuitry, the communication network interface recognizes that the bi-directional communication using the predetermined lines forming the transmission path is now enabled and then performs the bi-directional communication with the external apparatus, wherein the communication unit network interface that performs bi-directional communication is formed using a reserve line representing Ether-line and an HDP line representing Ether+ line of an HDMI cable.

2. The electronic apparatus according to claim 1, wherein the predetermined lines are a reserve line and an HPD line as the first line forming the HDMI cable.

3. The electronic apparatus according to claim 1, further comprising:
a connection detector configured to detect that the electronic apparatus is connected to the external apparatus via the transmission path.

4. The electronic apparatus according to claim 3, wherein in response to a power-off operation being performed, the command transmitting unit transmits, over the control data line other than the predetermined lines to the external apparatus, a firewall turn-off completion command for requesting completion of the turning off of the firewall against the communication unit.

5. The electronic apparatus according to claim 1, wherein the command transmitting unit transmits the firewall turn-off command to the external apparatus in response to a request for the electronic apparatus to perform data transmission using the communication unit, and the command transmitting unit transmits, to the external apparatus, a firewall turn-off completion command for requesting completion of turning off of the firewall against the communication unit in response to the data transmission being completed.

6. A method for turning off a firewall performed by an electronic apparatus, the electronic apparatus including a signal receiver configured to receive a video signal from an external apparatus via a transmission path using a plurality of channels and a differential signal and a communication network interface to perform bi-directional communication using predetermined lines forming the transmission path, the method comprising:
transmitting, over a control data line other than the predetermined lines to the external apparatus, in response to a determination using a first line of the predetermined lines that the electronic apparatus is connected to the external apparatus, a firewall turn-off command for requesting turning off of a firewall against the network interface in respect to the electronic apparatus being connected to the external apparatus via the transmission path; wherein the firewall turn-off command is transmitted using the control data line of the transmission path, and wherein the firewall turn-off command contains an internet protocol address, a port number, a MAC address and a vendor specific command; and the firewall against the communication network interface is automatically turned off at the external apparatus by a firewall open process in response to receipt of the firewall turn-off command at the external apparatus;
receiving, from the external apparatus over the control data line other than the predetermined lines, a firewall turn-off response indicating that the firewall against the communication network interface is turned off; and
in response to the firewall turn-off response being received over the control data line other than the predetermined lines, recognizing that the bi-directional communication using the predetermined lines forming the transmission path is now enabled and then performing the bi-directional communication with the external apparatus, wherein the communication network interface that performs bi-directional communication is formed using a reserve line representing Ether-line and an HDP line representing Ether+ line of an HDMI cable.

7. The method for turning off a firewall performed by an electronic apparatus according to claim 6, wherein the predetermined lines are a reserve line and an HPD line as the first line forming the HDMI cable.

8. A method for turning off a firewall performed by an electronic apparatus, the electronic apparatus including a receiver configured to receive a video signal from an external apparatus via a transmission path using a plurality of channels and a differential signal and a network interface configured to perform bi-directional communication using predetermined lines forming the transmission path, the method comprising:
transmitting, over a control data line other than the predetermined lines to the external apparatus, when a determination using a first line of the predetermined lines is that the electronic apparatus is connected to the external apparatus, a firewall turn-off command for requesting turning off of a firewall against the communication network interface in response to a request for the electronic apparatus to perform data transmission using the communication network interface, wherein the firewall turn-off command is transmitted using the control data line of the transmission path; and wherein the firewall turn-off command contain an internet protocol address, a port number, MAC address and a vendor specific command; and the firewall against the communication network interface is automatically turned off at the external apparatus by a firewall open process in response to receipt of the firewall turn-off command at the external apparatus;
receiving, from the external apparatus over the control data line other than the predetermined lines, a firewall turn-off response indicating that the firewall against the communication network interface is turned off; and in response to the firewall turn-off response being received over the control data line other than the predetermined lines, recognizing that the bi-directional communication using the predetermined lines forming the transmission path is now enabled and then performing the bi-directional communication with the external apparatus; wherein the communication network interface that performs bi-directional communication is formed using a reserve line representing Ether-line and an HDP line representing Ether+ line of an HDMI cable.

9. The method for turning off a firewall performed by an electronic apparatus according to claim 8, wherein the predetermined lines are a reserve line and an HPD line as the first line forming an HDMI cable.

10. An electronic apparatus, comprising:
a transmitter configured to transmit a video signal to an external apparatus via a transmission path using a plurality of channels and a differential signal;
a communication network interface configured to perform bi-directional communication using predetermined lines forming the transmission path;
a firewall setting circuitry for setting up a firewall;
a command receiving circuitry configured to receive a command from the external apparatus over a control data line other than the predetermined lines, wherein the firewall turn-off command is transmitted using the control data line of the transmission path; and
wherein the firewall setting circuitry automatically turns off the firewall against the external apparatus by a firewall open process in response to a firewall turn-off command being received by the command receiving unit over the control data line other than the predetermined lines, the firewall turn-off command transmitted from the external apparatus in response to a determination using a first line of the predetermined lines that the electronic apparatus is connected to the external apparatus, the firewall turn-off command containing an internet protocol address, a port number, MAC address and a vendor specific command; and
a response transmitting circuitry configured to transmit, over the control data line other than the predetermined lines to the external apparatus, a firewall turn-off response indicating that the firewall against the external apparatus is turned off,
wherein the external apparatus recognizes that the bi-directional communication using the predetermined lines forming the transmission path is now enabled and then performs the bi-directional communication with the communication unit in response to the firewall turn-off response being received over the control data line other than the predetermined lines by the external apparatus, and the firewall setting circuitry cancels the turning off of the firewall against the external apparatus in response to a firewall turn-off completion command being received over the control data line other than the predetermined lines by the command receiving circuitry; wherein the communication network interface that performs bi-directional communication is formed using a reserve line representing Ether-line and an HDP line representing Ether+ line of an HDMI cable.

11. The electronic apparatus according to claim 10, wherein the predetermined lines are a reserve line and an HPD line as the first line forming an HDMI cable.

12. The electronic apparatus according to claim 10, further comprising:
a connection detecting unit configured to detect whether the external apparatus is connected to the electronic apparatus via the transmission path;
wherein in response to the firewall being turned off for the external apparatus and the firewall setting unit detecting that the external apparatus is not connected to the electronic apparatus, the firewall setting unit cancels the turning off of the firewall against the external apparatus.

13. The electronic apparatus according to claim 1, wherein the firewall turn-off command includes a null internet protocol address and a null port number, and the firewall turn-off response includes an internet protocol address and a port number set by the external device.

14. The electronic apparatus according to claim 1, wherein the command transmitting circuitry transmits the firewall turn-off command over the control data line other than the predetermined lines to the external apparatus using a CEC line of the HDMI cable.

15. The electronic apparatus according to claim 10, wherein the firewall turn-off command includes a null internet protocol address and a null port number, and the firewall turn-off response includes an internet protocol address and a port number set by the electronic apparatus.

16. The electronic apparatus according to claim 10, wherein the response transmitting circuitry unit transmits the firewall turn-off response over the control data line other than the predetermined lines to the external apparatus using a CEC line of the HDMI cable.

17. The electronic apparatus according to claim 10, wherein the response transmitting circuitry transmits, to the external apparatus, a firewall turn-off completion response in response to the firewall turn-off completion command being received by the command receiving circuitry.

* * * * *